(12) United States Patent
Jhang et al.

(10) Patent No.: US 10,585,265 B2
(45) Date of Patent: Mar. 10, 2020

(54) OPTICAL IMAGING LENS

(71) Applicant: Genius Electronic Optical (Xiamen) Co., Ltd., Xiamen, Fujian (CN)

(72) Inventors: Jia-Sin Jhang, Taichung (TW); Yanbin Chen, Fujian (CN); Baina Chen, Fujian (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 15/918,197

(22) Filed: Mar. 12, 2018

(65) Prior Publication Data

US 2019/0204559 A1   Jul. 4, 2019

(30) Foreign Application Priority Data

Dec. 29, 2017 (CN) .......................... 2017 1 1474803

(51) Int. Cl.
| | | |
|---|---|---|
| *G02B 13/18* | (2006.01) | |
| *G02B 9/00* | (2006.01) | |
| *G02B 13/00* | (2006.01) | |
| *G02B 1/04* | (2006.01) | |
| *G02B 9/64* | (2006.01) | |

(52) U.S. Cl.
CPC ......... *G02B 13/0045* (2013.01); *G02B 1/041* (2013.01); *G02B 9/64* (2013.01)

(58) Field of Classification Search
CPC ....... G02B 13/0045; G02B 1/041; G02B 9/64

USPC .......................................... 359/708, 750, 754
See application file for complete search history.

(56) References Cited

U.S. PATENT DOCUMENTS 9,835,822 B2 * 12/2017 Huang ..................... G02B 9/64

FOREIGN PATENT DOCUMENTS

| CN | 204989593 U | 1/2016 |
|---|---|---|
| JP | 2013-231759 A | 11/2013 |
| TW | 201706658 A | 2/2017 |

OTHER PUBLICATIONS

Office Action for Taiwanese Application No. 107101131; dated Nov. 26, 2018; 9 pages.

* cited by examiner

*Primary Examiner* — William Choi
(74) *Attorney, Agent, or Firm* — Huffman Law Group, PC

(57) ABSTRACT

The present disclosure provides for various embodiments of optical imaging lenses. An optical imaging lens may comprise at least eight lens elements positioned in an order from an object side to an image side. By controlling the convex or concave shape of the surfaces of the lens elements and designing parameters satisfying at least an inequality, the optical imaging lens may exhibit improved optical characteristics, the total length of the optical imaging lens may be shortened, and the view angle and f-number may also be improved.

20 Claims, 40 Drawing Sheets

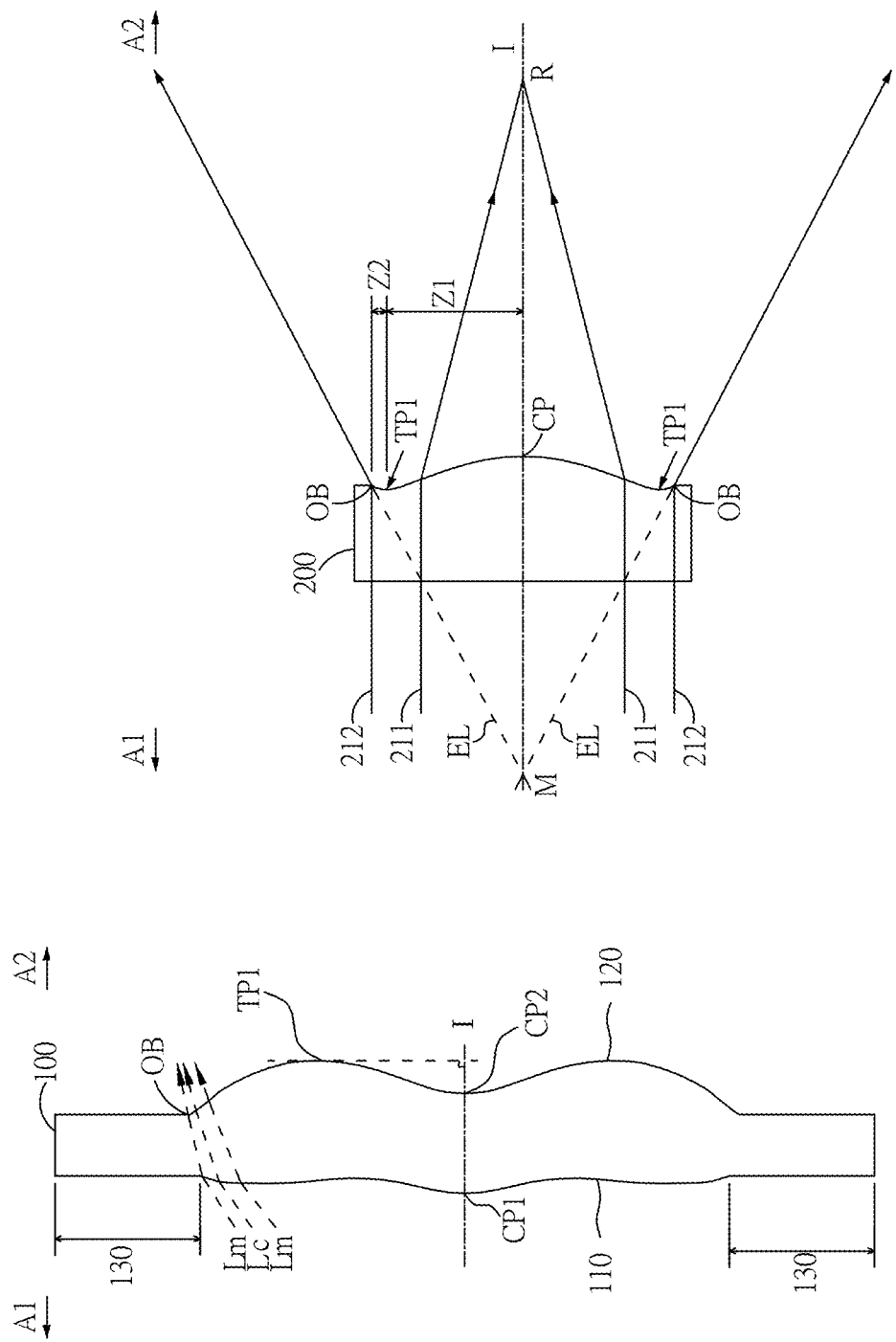

| Surface # | | Radius (mm) | Thickness / air gap (mm) | Refractive index | Abbe number | Focal length (mm) |
|---|---|---|---|---|---|---|
| | EFL = 4.254 mm，HFOV = 36.607deg.，TTL = 5.661 mm，Image height = 3.238 mm，Fno=1.600 | | | | | |
| - | Object | INFINITY | INFINITY | | | |
| 100' | Aperture stop | INFINITY | -0.469 | | | |
| 111 | 1st lens element | 2.058 | 0.687 | 1.545 | 55.987 | 4.074 |
| 112 | | 24.062 | 0.116 | | | |
| 121 | 2nd lens element | 5.595 | 0.223 | 1.661 | 20.373 | -10.067 |
| 122 | | 3.004 | 0.358 | | | |
| 131 | 3rd lens element | 5.415 | 0.291 | 1.661 | 20.373 | -53.082 |
| 132 | | 4.596 | 0.159 | | | |
| 141 | 4th lens element | 167.655 | 0.342 | 1.545 | 55.987 | 68.983 |
| 142 | | -48.574 | 0.090 | | | |
| 151 | 5th lens element | -14.050 | 0.584 | 1.661 | 20.373 | -99.930 |
| 152 | | -18.099 | 0.273 | | | |
| 161 | 6th lens element | 25.000 | 0.320 | 1.545 | 55.987 | 4.930 |
| 162 | | -3.005 | 0.052 | | | |
| 171 | 7th lens element | 2.738 | 0.487 | 1.545 | 55.987 | 14.578 |
| 172 | | 3.910 | 0.303 | | | |
| 181 | 8th lens element | -3.493 | 0.365 | 1.545 | 55.987 | -3.479 |
| 182 | | 4.322 | 0.488 | | | |
| 191 | Filtering unit | INFINITY | 0.210 | 1.517 | 64.167 | |
| 192 | | INFINITY | 0.313 | | | |
| 193 | Image plane | INFINITY | 0.000 | | | |

FIG. 8

| Aspherical parameters | | | | | |
|---|---|---|---|---|---|
| Surface # | K | $a_2$ | $a_4$ | $a_6$ | $a_8$ |
| 111 | 0.000000E+00 | 0.000000E+00 | 2.373088E-03 | 2.246025E-03 | -1.549297E-03 |
| 112 | 0.000000E+00 | 0.000000E+00 | 3.890472E-03 | -5.138354E-03 | 3.208447E-03 |
| 121 | 0.000000E+00 | 0.000000E+00 | -3.132378E-02 | 8.073082E-03 | 1.521347E-03 |
| 122 | 0.000000E+00 | 0.000000E+00 | -4.273683E-02 | 5.805469E-03 | 5.599440E-03 |
| 131 | 0.000000E+00 | 0.000000E+00 | -6.749086E-02 | -2.614999E-02 | -3.017449E-03 |
| 132 | 0.000000E+00 | 0.000000E+00 | -5.804416E-02 | -1.577279E-02 | -9.431659E-03 |
| 141 | 0.000000E+00 | 0.000000E+00 | -3.617139E-02 | -5.866222E-03 | -7.063911E-03 |
| 142 | 0.000000E+00 | 0.000000E+00 | -7.760688E-02 | -4.661837E-02 | 2.478311E-02 |
| 151 | 0.000000E+00 | 0.000000E+00 | -1.137150E-01 | -1.343591E-03 | 1.659491E-02 |
| 152 | 0.000000E+00 | 0.000000E+00 | -1.593682E-01 | 6.140169E-02 | -8.118714E-03 |
| 161 | 0.000000E+00 | 0.000000E+00 | -2.475342E-02 | 1.464521E-02 | -1.317686E-02 |
| 162 | 0.000000E+00 | 0.000000E+00 | 8.974056E-02 | -1.281200E-02 | -3.666264E-03 |
| 171 | 0.000000E+00 | 0.000000E+00 | -9.579496E-02 | -3.942954E-03 | 4.955002E-03 |
| 172 | 0.000000E+00 | 0.000000E+00 | -8.230709E-02 | 5.125726E-03 | 1.043220E-04 |
| 181 | 0.000000E+00 | 0.000000E+00 | 8.351704E-03 | -2.012452E-04 | 3.676057E-04 |
| 182 | 0.000000E+00 | 0.000000E+00 | -3.664896E-02 | 7.414443E-03 | -1.039839E-03 |
| Surface # | $a_{10}$ | $a_{12}$ | $a_{14}$ | $a_{16}$ | |
| 111 | 3.153274E-05 | 4.203976E-04 | -3.735379E-05 | -9.631818E-05 | |
| 112 | -5.319575E-05 | -1.002286E-03 | 1.414064E-04 | 6.474600E-05 | |
| 121 | 2.840119E-03 | -4.447933E-04 | -2.443389E-03 | 1.305382E-03 | |
| 122 | -4.931998E-04 | -2.073940E-03 | -1.405341E-03 | 1.195971E-03 | |
| 131 | -2.630236E-03 | -1.176088E-03 | 1.454326E-03 | -1.967513E-04 | |
| 132 | 1.693836E-03 | 1.551744E-03 | 5.032658E-04 | -5.191467E-04 | |
| 141 | 1.856515E-03 | 1.392253E-03 | -5.385894E-04 | -9.753726E-04 | |
| 142 | 9.840001E-03 | -3.764493E-03 | -2.957272E-03 | 6.867146E-04 | |
| 151 | 1.588555E-03 | -8.445617E-04 | -1.912649E-04 | -1.376574E-04 | |
| 152 | -2.458105E-03 | 5.436900E-04 | 6.513342E-04 | -1.532147E-04 | |
| 161 | 3.312161E-03 | -3.828545E-04 | -4.714656E-04 | 1.417117E-04 | |
| 162 | 3.669139E-04 | 1.062395E-04 | 2.565704E-05 | -9.452745E-06 | |
| 171 | 3.683024E-04 | -2.542611E-04 | -1.840524E-05 | 6.518768E-06 | |
| 172 | 8.554324E-05 | -1.318956E-05 | -9.356849E-07 | 2.864988E-07 | |
| 181 | 1.801124E-06 | -3.137676E-06 | -7.587661E-07 | 7.813637E-08 | |
| 182 | 5.082994E-05 | 1.336874E-06 | -7.000481E-08 | -7.086206E-09 | |

FIG. 9

| \multicolumn{6}{c}{EFL = 4.141 mm, HFOV = 37.287deg., TTL = 5.631 mm, Image height = 3.238 mm, Fno=1.600} |
|---|---|---|---|---|---|
| Surface # | | Radius (mm) | Thickness / air gap (mm) | Refractive index | Abbe number | Focal length (mm) |
| - | Object | INFINITY | INFINITY | | | |
| 200' | Aperture stop | INFINITY | -0.438 | | | |
| 211' | 1st lens element | 2.057 | 0.669 | 1.545 | 55.987 | 4.069 |
| 212' | | 24.456 | 0.093 | | | |
| 221 | 2nd lens element | 5.490 | 0.230 | 1.661 | 20.373 | -9.538 |
| 222 | | 2.898 | 0.294 | | | |
| 231 | 3rd lens element | 3.918 | 0.293 | 1.661 | 20.373 | -45.331 |
| 232 | | 3.365 | 0.095 | | | |
| 241 | 4th lens element | 9.879 | 0.705 | 1.545 | 55.987 | 26.691 |
| 242 | | 29.864 | 0.090 | | | |
| 251 | 5th lens element | 796.285 | 0.347 | 1.661 | 20.373 | -25.522 |
| 252 | | 16.667 | 0.054 | | | |
| 261 | 6th lens element | 15.823 | 0.646 | 1.545 | 55.987 | 3.195 |
| 262 | | -1.933 | 0.037 | | | |
| 271 | 7th lens element | 6.308 | 0.450 | 1.545 | 55.987 | 22.250 |
| 272 | | 12.784 | 0.195 | | | |
| 281 | 8th lens element | -2.841 | 0.459 | 1.545 | 55.987 | -2.659 |
| 282 | | 3.143 | 0.488 | | | |
| 291 | Filtering unit | INFINITY | 0.210 | 1.517 | 64.167 | |
| 292 | | INFINITY | 0.278 | | | |
| 293 | Image plane | INFINITY | 0.000 | | | |

FIG. 12

| Aspherical parameters | | | | | |
|---|---|---|---|---|---|
| Surface # | K | $a_2$ | $a_4$ | $a_6$ | $a_8$ |
| 211' | 0.000000E+00 | 0.000000E+00 | 1.329958E-03 | 1.858705E-03 | -1.517514E-03 |
| 212' | 0.000000E+00 | 0.000000E+00 | 3.228616E-03 | -4.859322E-03 | 3.252959E-03 |
| 221 | 0.000000E+00 | 0.000000E+00 | -2.938545E-02 | 8.018940E-03 | 1.663361E-03 |
| 222 | 0.000000E+00 | 0.000000E+00 | -4.450171E-02 | 4.475081E-03 | 3.974758E-03 |
| 231 | 0.000000E+00 | 0.000000E+00 | -6.997181E-02 | -2.838780E-02 | -2.436647E-03 |
| 232 | 0.000000E+00 | 0.000000E+00 | -6.014233E-02 | -1.410211E-02 | -6.528672E-03 |
| 241 | 0.000000E+00 | 0.000000E+00 | -2.754560E-02 | 4.250273E-03 | -3.421609E-03 |
| 242 | 0.000000E+00 | 0.000000E+00 | -7.639807E-02 | -5.346718E-02 | 2.113430E-02 |
| 251 | 0.000000E+00 | 0.000000E+00 | -1.291770E-01 | -6.737773E-03 | 1.606945E-02 |
| 252 | 0.000000E+00 | 0.000000E+00 | -1.558759E-01 | 5.715362E-02 | -1.147416E-02 |
| 261 | 0.000000E+00 | 0.000000E+00 | -2.811904E-02 | 4.677428E-03 | -1.424815E-02 |
| 262 | 0.000000E+00 | 0.000000E+00 | 5.659419E-02 | -8.429207E-03 | -1.937063E-03 |
| 271 | 0.000000E+00 | 0.000000E+00 | -1.435045E-01 | -1.032975E-02 | 7.698860E-03 |
| 272 | 0.000000E+00 | 0.000000E+00 | -7.146400E-02 | 1.041025E-02 | 5.131601E-05 |
| 281 | 0.000000E+00 | 0.000000E+00 | 2.432475E-02 | -1.112811E-03 | 3.400700E-04 |
| 282 | 0.000000E+00 | 0.000000E+00 | -6.034308E-02 | 1.045897E-02 | -1.222870E-03 |
| Surface # | $a_{10}$ | $a_{12}$ | $a_{14}$ | $a_{16}$ | |
| 211' | 1.086177E-05 | 4.021784E-04 | -4.016446E-05 | -9.011560E-05 | |
| 212' | -3.304900E-05 | -9.767255E-04 | 1.565421E-04 | 6.745535E-05 | |
| 221 | 2.705374E-03 | -6.193471E-04 | -2.499773E-03 | 1.379523E-03 | |
| 222 | -1.021712E-03 | -2.029827E-03 | -1.453288E-03 | 9.461612E-04 | |
| 231 | -2.450115E-03 | -1.359850E-03 | 1.279071E-03 | -1.960965E-04 | |
| 232 | 4.102255E-03 | 2.634509E-03 | 7.222044E-04 | -7.194709E-04 | |
| 241 | 2.574653E-03 | 1.836959E-03 | -2.013130E-04 | -6.163163E-04 | |
| 242 | 1.007857E-02 | -2.960111E-03 | -2.518093E-03 | 6.576975E-04 | |
| 251 | 7.681087E-04 | -1.388146E-03 | -2.361025E-04 | 1.341130E-04 | |
| 252 | -3.228395E-03 | 5.787300E-04 | 7.549244E-04 | -1.040779E-04 | |
| 261 | 3.537759E-03 | -2.102752E-04 | -4.467347E-04 | 1.221731E-04 | |
| 262 | 7.463912E-04 | 1.552385E-04 | 2.562444E-05 | -1.326171E-05 | |
| 271 | 8.372316E-04 | -2.166364E-04 | -2.279958E-05 | 3.361808E-06 | |
| 272 | 5.403948E-05 | -1.832217E-05 | -1.552420E-06 | 2.088961E-07 | |
| 281 | 1.718543E-06 | -2.948234E-06 | -7.146793E-07 | 8.411669E-08 | |
| 282 | 4.507460E-05 | 1.261764E-06 | -6.488300E-08 | -5.679525E-09 | |

FIG. 13

| \multicolumn{6}{c|}{EFL = 4.338 mm, HFOV = 36.219deg., TTL = 5.513 mm, Image height = 3.238 mm, Fno=1.600} |

| Surface # | | Radius (mm) | Thickness / air gap (mm) | Refractive index | Abbe number | Focal length (mm) |
|---|---|---|---|---|---|---|
| - | Object | INFINITY | INFINITY | | | |
| 300' | Aperture stop | INFINITY | -0.515 | | | |
| 311 | 1st lens element | 1.991 | 0.758 | 1.545 | 55.987 | 4.013 |
| 312 | | 18.767 | 0.186 | | | |
| 321 | 2nd lens element | 11.788 | 0.221 | 1.661 | 20.373 | -9.005 |
| 322 | | 3.950 | 0.308 | | | |
| 331 | 3rd lens element | 5.796 | 0.282 | 1.661 | 20.373 | -28.011 |
| 332 | | 4.338 | 0.061 | | | |
| 341 | 4th lens element | 8.241 | 0.580 | 1.545 | 55.987 | 19.985 |
| 342 | | 32.777 | 0.081 | | | |
| 351 | 5th lens element | 27.190 | 0.299 | 1.661 | 20.373 | -82.072 |
| 352 | | 18.088 | 0.200 | | | |
| 361 | 6th lens element | 12.314 | 0.487 | 1.545 | 55.987 | 3.532 |
| 362 | | -2.256 | 0.334 | | | |
| 371 | 7th lens element | 22.851 | 0.293 | 1.545 | 55.987 | 229.391 |
| 372 | | 27.820 | 0.166 | | | |
| 381 | 8th lens element | -2.761 | 0.312 | 1.545 | 55.987 | -2.852 |
| 382 | | 3.721 | 0.488 | | | |
| 391 | Filtering unit | INFINITY | 0.210 | 1.517 | 64.167 | |
| 392 | | INFINITY | 0.247 | | | |
| 393 | Image plane | INFINITY | 0.000 | | | |

FIG. 16

| Aspherical parameters | | | | | |
|---|---|---|---|---|---|
| Surface # | K | $a_2$ | $a_4$ | $a_6$ | $a_8$ |
| 311 | 0.000000E+00 | 0.000000E+00 | 1.153275E-03 | 2.441225E-03 | -1.505125E-03 |
| 312 | 0.000000E+00 | 0.000000E+00 | 3.221931E-03 | -5.027267E-03 | 3.235101E-03 |
| 321 | 0.000000E+00 | 0.000000E+00 | -2.893608E-02 | 9.674078E-03 | 2.051550E-03 |
| 322 | 0.000000E+00 | 0.000000E+00 | -3.904976E-02 | 7.053254E-03 | 5.840350E-03 |
| 331 | 0.000000E+00 | 0.000000E+00 | -6.561373E-02 | -2.832107E-02 | -3.060618E-03 |
| 332 | 0.000000E+00 | 0.000000E+00 | -5.740554E-02 | -1.590956E-02 | -8.017181E-03 |
| 341 | 0.000000E+00 | 0.000000E+00 | -3.852004E-02 | 7.377487E-04 | -4.246488E-03 |
| 342 | 0.000000E+00 | 0.000000E+00 | -7.030322E-02 | -5.381317E-02 | 2.153988E-02 |
| 351 | 0.000000E+00 | 0.000000E+00 | -1.314456E-01 | -4.511013E-03 | 1.536026E-02 |
| 352 | 0.000000E+00 | 0.000000E+00 | -1.569503E-01 | 5.623952E-02 | -1.020128E-02 |
| 361 | 0.000000E+00 | 0.000000E+00 | -5.127637E-02 | 1.333592E-02 | -1.398958E-02 |
| 362 | 0.000000E+00 | 0.000000E+00 | 5.682891E-02 | -9.148180E-03 | -2.128593E-03 |
| 371 | 0.000000E+00 | 0.000000E+00 | -1.242958E-01 | -1.010341E-02 | 7.381532E-03 |
| 372 | 0.000000E+00 | 0.000000E+00 | -8.728956E-02 | 1.065904E-02 | 8.599466E-05 |
| 381 | 0.000000E+00 | 0.000000E+00 | 2.099388E-02 | -1.213615E-03 | 3.343339E-04 |
| 382 | 0.000000E+00 | 0.000000E+00 | -5.709592E-02 | 1.029059E-02 | -1.211434E-03 |
| Surface # | $a_{10}$ | $a_{12}$ | $a_{14}$ | $a_{16}$ | |
| 311 | 1.219890E-05 | 4.266385E-04 | -1.895065E-05 | -7.969640E-05 | |
| 312 | -4.491039E-05 | -9.854071E-04 | 1.541562E-04 | 6.851508E-05 | |
| 321 | 2.731234E-03 | -6.402449E-04 | -2.512631E-03 | 1.371738E-03 | |
| 322 | -1.436524E-04 | -1.772000E-03 | -1.423391E-03 | 9.803209E-04 | |
| 331 | -2.302175E-03 | -8.843814E-04 | 1.465509E-03 | -6.235776E-04 | |
| 332 | 3.219986E-03 | 2.232463E-03 | 6.832830E-04 | -5.346117E-04 | |
| 341 | 2.543569E-03 | 1.968676E-03 | -9.673028E-05 | -5.589356E-04 | |
| 342 | 9.883735E-03 | -3.184143E-03 | -2.554790E-03 | 7.178171E-04 | |
| 351 | 4.681434E-04 | -1.373926E-03 | -1.977301E-04 | 1.539640E-04 | |
| 352 | -2.877685E-03 | 5.870181E-04 | 7.339360E-04 | -1.113137E-04 | |
| 361 | 3.058174E-03 | -3.423933E-04 | -4.600957E-04 | 1.398400E-04 | |
| 362 | 6.559906E-04 | 1.342978E-04 | 2.284254E-05 | -1.287557E-05 | |
| 371 | 7.798230E-04 | -2.226279E-04 | -2.291279E-05 | 3.546503E-06 | |
| 372 | 5.741167E-05 | -1.742339E-05 | -1.389316E-06 | 2.315120E-07 | |
| 381 | 3.162192E-06 | -2.462554E-06 | -6.133423E-07 | 1.015895E-07 | |
| 382 | 4.314464E-05 | 1.118290E-06 | -5.970892E-08 | -3.389826E-09 | |

FIG. 17

| EFL = 4.415 mm, HFOV = 35.989deg., TTL = 5.768 mm, Image height = 3.238 mm, Fno=1.600 ||||||
|---|---|---|---|---|---|
| Surface # | | Radius (mm) | Thickness / air gap (mm) | Refractive index | Abbe number | Focal length (mm) |
| - | Object | INFINITY | INFINITY | | | |
| 400' | Aperture stop | INFINITY | -0.576 | | | |
| 411 | 1st lens element | 1.937 | 0.811 | 1.545 | 55.987 | 3.854 |
| 412 | | 20.710 | 0.048 | | | |
| 421 | 2nd lens element | 5.269 | 0.206 | 1.661 | 20.373 | -9.632 |
| 422 | | 2.850 | 0.397 | | | |
| 431 | 3rd lens element | 5.484 | 0.270 | 1.661 | 20.373 | -52.299 |
| 432 | | 4.646 | 0.178 | | | |
| 441 | 4th lens element | -232.733 | 0.229 | 1.545 | 55.987 | -59.705 |
| 442 | | 37.944 | 0.124 | | | |
| 451 | 5th lens element | -20.083 | 0.413 | 1.661 | 20.373 | -25.429 |
| 452 | | 110.133 | 0.159 | | | |
| 461 | 6th lens element | 15.823 | 0.557 | 1.545 | 55.987 | 3.203 |
| 462 | | -1.943 | 0.049 | | | |
| 471 | 7th lens element | 4.367 | 0.294 | 1.545 | 55.987 | 25.799 |
| 472 | | 6.178 | 0.185 | | | |
| 481 | 8th lens element | -3.480 | 0.829 | 1.545 | 55.987 | -2.968 |
| 482 | | 3.290 | 0.488 | | | |
| 491 | Filtering unit | INFINITY | 0.210 | 1.517 | 64.167 | |
| 492 | | INFINITY | 0.323 | | | |
| 493 | Image plane | INFINITY | 0.000 | | | |

FIG. 20

| Aspherical parameters | | | | | |
|---|---|---|---|---|---|
| Surface # | K | $a_2$ | $a_4$ | $a_6$ | $a_8$ |
| 411 | 0.000000E+00 | 0.000000E+00 | 3.716747E-03 | 2.157554E-03 | -1.355373E-03 |
| 412 | 0.000000E+00 | 0.000000E+00 | 6.052429E-03 | -4.532213E-03 | 3.049391E-03 |
| 421 | 0.000000E+00 | 0.000000E+00 | -3.069685E-02 | 8.583635E-03 | 2.102098E-03 |
| 422 | 0.000000E+00 | 0.000000E+00 | -3.995890E-02 | 8.098872E-03 | 5.841336E-03 |
| 431 | 0.000000E+00 | 0.000000E+00 | -6.628853E-02 | -2.651243E-02 | -2.739193E-03 |
| 432 | 0.000000E+00 | 0.000000E+00 | -5.421845E-02 | -1.876281E-02 | -9.745630E-03 |
| 441 | 0.000000E+00 | 0.000000E+00 | -5.584007E-02 | -7.399969E-03 | -6.935580E-03 |
| 442 | 0.000000E+00 | 0.000000E+00 | -6.994620E-02 | -4.837176E-02 | 2.468474E-02 |
| 451 | 0.000000E+00 | 0.000000E+00 | -1.145117E-01 | 6.089310E-04 | 1.643455E-02 |
| 452 | 0.000000E+00 | 0.000000E+00 | -1.624259E-01 | 5.685846E-02 | -8.801905E-03 |
| 461 | 0.000000E+00 | 0.000000E+00 | -3.380235E-02 | 1.254902E-02 | -1.137105E-02 |
| 462 | 0.000000E+00 | 0.000000E+00 | 7.553754E-02 | -5.675811E-03 | -1.574909E-03 |
| 471 | 0.000000E+00 | 0.000000E+00 | -1.209580E-01 | -2.367221E-03 | 6.249637E-03 |
| 472 | 0.000000E+00 | 0.000000E+00 | -8.894564E-02 | 9.669563E-03 | 8.238848E-05 |
| 481 | 0.000000E+00 | 0.000000E+00 | 1.777025E-02 | -8.262033E-04 | 3.080277E-04 |
| 482 | 0.000000E+00 | 0.000000E+00 | -5.253453E-02 | 8.968065E-03 | -1.071155E-03 |
| Surface # | $a_{10}$ | $a_{12}$ | $a_{14}$ | $a_{16}$ | |
| 411 | 1.669509E-04 | 4.835159E-04 | -2.256570E-05 | -1.040866E-04 | |
| 412 | -1.867212E-04 | -1.027515E-03 | 1.609926E-04 | 8.809634E-05 | |
| 421 | 2.858300E-03 | -6.179992E-04 | -2.532444E-03 | 1.367407E-03 | |
| 422 | -3.558685E-04 | -1.829812E-03 | -1.323005E-03 | 1.141251E-03 | |
| 431 | -2.888779E-03 | -1.250257E-03 | 1.718516E-03 | 1.205351E-04 | |
| 432 | 2.655518E-03 | 1.974385E-03 | 7.242915E-04 | 6.936820E-06 | |
| 441 | 2.708006E-03 | 3.169639E-03 | 7.825662E-04 | -6.082941E-04 | |
| 442 | 1.082415E-02 | -3.225614E-03 | -2.559632E-03 | 1.190214E-03 | |
| 451 | 9.376400E-04 | -8.877796E-04 | 4.587578E-05 | 2.811181E-05 | |
| 452 | -2.081388E-03 | 7.882497E-04 | 6.984172E-04 | -1.865031E-04 | |
| 461 | 3.743602E-03 | -3.783053E-04 | -4.973040E-04 | 1.423464E-04 | |
| 462 | 5.550498E-04 | 7.860155E-05 | 1.717397E-05 | -1.036114E-05 | |
| 471 | 5.994350E-04 | -2.347639E-04 | -2.491133E-05 | 2.758980E-06 | |
| 472 | 2.501032E-05 | -2.217089E-05 | -1.016663E-06 | 5.855085E-07 | |
| 481 | -2.461479E-06 | -3.138042E-06 | -6.882877E-07 | 8.921422E-08 | |
| 482 | 4.732886E-05 | 1.080157E-06 | -6.805615E-08 | -5.621738E-09 | |

FIG. 21

| EFL = 4.326 mm , HFOV = 36.719deg. , TTL = 6.601 mm , Image height = 3.238 mm , Fno=1.600 ||||||
|---|---|---|---|---|---|---|
| Surface # | | Radius (mm) | Thickness / air gap (mm) | Refractive index | Abbe number | Focal length (mm) |
| - | Object | INFINITY | INFINITY | | | |
| 500' | Aperture stop | INFINITY | -0.492 | | | |
| 511 | 1st lens element | 2.007 | 0.744 | 1.545 | 55.987 | 4.253 |
| 512 | | 12.787 | 0.152 | | | |
| 521 | 2nd lens element | 9.958 | 0.230 | 1.661 | 20.373 | -9.295 |
| 522 | | 3.786 | 0.209 | | | |
| 531 | 3rd lens element | 3.581 | 0.291 | 1.661 | 20.373 | 66.083 |
| 532 | | 3.771 | 0.204 | | | |
| 541 | 4th lens element | 18.692 | 0.624 | 1.545 | 55.987 | 14.010 |
| 542 | | -12.807 | 0.135 | | | |
| 551 | 5th lens element | -5.334 | 0.416 | 1.661 | 20.373 | -14.469 |
| 552 | | -12.293 | 0.107 | | | |
| 561 | 6th lens element | 16.064 | 0.477 | 1.545 | 55.987 | 3.763 |
| 562 | | -2.333 | 0.058 | | | |
| 571 | 7th lens element | 3.426 | 0.300 | 1.545 | 55.987 | -886.372 |
| 572 | | 3.297 | 0.395 | | | |
| 581 | 8th lens element | -2.956 | 0.320 | 1.545 | 55.987 | -3.058 |
| 582 | | 3.987 | 0.488 | | | |
| 591 | Filtering unit | INFINITY | 0.210 | 1.517 | 64.167 | |
| 592 | | INFINITY | 0.243 | | | |
| 593 | Image plane | INFINITY | 0.000 | | | |

FIG. 24

| Aspherical parameters | | | | | |
|---|---|---|---|---|---|
| Surface # | K | $a_2$ | $a_4$ | $a_6$ | $a_8$ |
| 511 | 0.000000E+00 | 0.000000E+00 | 4.668763E-04 | 2.075348E-03 | -1.533620E-03 |
| 512 | 0.000000E+00 | 0.000000E+00 | -5.390128E-03 | -5.265162E-03 | 3.679113E-03 |
| 521 | 0.000000E+00 | 0.000000E+00 | -2.870175E-02 | 7.976324E-03 | 8.509272E-04 |
| 522 | 0.000000E+00 | 0.000000E+00 | -3.923686E-02 | 1.810509E-03 | 5.609240E-03 |
| 531 | 0.000000E+00 | 0.000000E+00 | -7.043653E-02 | -2.608207E-02 | -2.454216E-03 |
| 532 | 0.000000E+00 | 0.000000E+00 | -5.582787E-02 | -1.475597E-02 | -4.253629E-03 |
| 541 | 0.000000E+00 | 0.000000E+00 | -4.388634E-02 | 1.008184E-03 | -7.390815E-03 |
| 542 | 0.000000E+00 | 0.000000E+00 | -9.356026E-02 | -4.881580E-02 | 1.795230E-02 |
| 551 | 0.000000E+00 | 0.000000E+00 | -1.218290E-01 | -9.303997E-03 | 1.828395E-02 |
| 552 | 0.000000E+00 | 0.000000E+00 | -1.499711E-01 | 6.187119E-02 | -8.759670E-03 |
| 561 | 0.000000E+00 | 0.000000E+00 | -2.885784E-02 | 7.896234E-03 | -1.255980E-02 |
| 562 | 0.000000E+00 | 0.000000E+00 | 8.359687E-02 | -2.048086E-02 | -1.598628E-03 |
| 571 | 0.000000E+00 | 0.000000E+00 | -1.331266E-01 | 2.068413E-03 | 4.113043E-03 |
| 572 | 0.000000E+00 | 0.000000E+00 | -9.043979E-02 | 9.697698E-03 | -3.057508E-04 |
| 581 | 0.000000E+00 | 0.000000E+00 | 1.391873E-02 | -2.286822E-04 | 3.759641E-04 |
| 582 | 0.000000E+00 | 0.000000E+00 | -5.932917E-02 | 1.105439E-02 | -1.196794E-03 |

| Surface # | $a_{10}$ | $a_{12}$ | $a_{14}$ | $a_{16}$ | |
|---|---|---|---|---|---|
| 511 | 9.266576E-06 | 3.758350E-04 | -5.326943E-05 | -8.842164E-05 | |
| 512 | 2.744128E-05 | -1.052164E-03 | 1.071295E-04 | 7.769563E-05 | |
| 521 | 3.107765E-03 | 1.319388E-05 | -2.290023E-03 | 1.098874E-03 | |
| 522 | 2.163729E-04 | -1.518610E-03 | -1.460420E-03 | 9.138596E-04 | |
| 531 | -1.096273E-03 | -5.618447E-05 | 1.565915E-03 | -8.964990E-04 | |
| 532 | 3.821961E-03 | 1.489306E-03 | 2.943821E-04 | -2.134662E-04 | |
| 541 | 4.129056E-04 | 8.495111E-04 | -5.040861E-04 | -1.602202E-04 | |
| 542 | 7.043053E-03 | -2.050440E-03 | -1.288092E-03 | 1.224501E-04 | |
| 551 | 3.246008E-03 | -1.542988E-03 | -8.378133E-04 | 2.900774E-04 | |
| 552 | -2.752662E-03 | 2.464651E-04 | 5.295239E-04 | -7.463066E-05 | |
| 561 | 2.490039E-03 | -3.275899E-04 | -3.124296E-04 | 1.293146E-04 | |
| 562 | 8.155645E-04 | 1.560505E-04 | 2.032275E-05 | -1.667274E-05 | |
| 571 | 7.143540E-04 | -2.559935E-04 | -4.072897E-05 | 7.344557E-06 | |
| 572 | -1.957010E-05 | -1.301413E-05 | 1.099995E-06 | 2.477422E-07 | |
| 581 | -6.011715E-08 | -3.281129E-06 | -7.105147E-07 | 9.711040E-08 | |
| 582 | 3.687342E-05 | 1.441927E-06 | 4.319090E-08 | -7.629235E-09 | |

FIG. 25

| Surface # | | Radius (mm) | Thickness / air gap (mm) | Refractive index | Abbe number | Focal length (mm) |
|---|---|---|---|---|---|---|
| | EFL = 4.325 mm, HFOV = 36.443deg., TTL = 5.706 mm, Image height = 3.2 mm, Fno=1.600 | | | | | |
| - | Object | INFINITY | INFINITY | | | |
| 600 | Aperture stop | INFINITY | -0.544 | | | |
| 611 | 1st lens element | 1.917 | 0.783 | 1.545 | 55.987 | 3.814 |
| 612 | | 20.467 | 0.143 | | | |
| 621 | 2nd lens element | 7.256 | 0.230 | 1.661 | 20.373 | -8.985 |
| 622 | | 3.241 | 0.378 | | | |
| 631 | 3rd lens element | 16.684 | 0.519 | 1.661 | 20.373 | -85.779 |
| 632 | | 12.757 | 0.077 | | | |
| 641 | 4th lens element | 35.382 | 0.293 | 1.545 | 55.987 | -15.557 |
| 642 | | 6.832 | 0.062 | | | |
| 651 | 5th lens element | 7.009 | 0.301 | 1.661 | 20.373 | -45.593 |
| 652 | | 5.599 | 0.060 | | | |
| 661 | 6th lens element | 13.991 | 0.677 | 1.545 | 55.987 | 3.118 |
| 662 | | -1.906 | 0.055 | | | |
| 671 | 7th lens element | 6.028 | 0.573 | 1.545 | 55.987 | 23.925 |
| 672 | | 10.812 | 0.262 | | | |
| 681 | 8th lens element | -2.901 | 0.313 | 1.545 | 55.987 | -3.044 |
| 682 | | 4.045 | 0.488 | | | |
| 691 | Filtering unit | INFINITY | 0.210 | 1.517 | 64.167 | |
| 692 | | INFINITY | 0.282 | | | |
| 693 | Image plane | INFINITY | 0.000 | | | |

FIG. 28

| Aspherical parameters | | | | | |
|---|---|---|---|---|---|
| Surface # | K | $a_2$ | $a_4$ | $a_6$ | $a_8$ |
| 611 | 0.000000E+00 | 0.000000E+00 | 2.294799E-03 | 2.271000E-03 | -1.527256E-03 |
| 612 | 0.000000E+00 | 0.000000E+00 | 5.908016E-03 | -4.833824E-03 | 3.036107E-03 |
| 621 | 0.000000E+00 | 0.000000E+00 | -2.504658E-02 | 1.043312E-02 | 1.066121E-03 |
| 622 | 0.000000E+00 | 0.000000E+00 | -3.223042E-02 | 6.658311E-03 | 6.223260E-03 |
| 631 | 0.000000E+00 | 0.000000E+00 | -5.062479E-02 | -2.269439E-02 | -3.907082E-03 |
| 632 | 0.000000E+00 | 0.000000E+00 | -3.811294E-02 | -1.498785E-02 | -6.886673E-03 |
| 641 | 0.000000E+00 | 0.000000E+00 | -5.345636E-02 | 2.419258E-03 | -2.136773E-03 |
| 642 | 0.000000E+00 | 0.000000E+00 | -7.228190E-02 | -4.782156E-02 | 2.319241E-02 |
| 651 | 0.000000E+00 | 0.000000E+00 | -1.175262E-01 | 3.956206E-04 | 1.653291E-02 |
| 652 | 0.000000E+00 | 0.000000E+00 | -1.449554E-01 | 6.205221E-02 | -9.462302E-03 |
| 661 | 0.000000E+00 | 0.000000E+00 | -1.752391E-02 | 9.127648E-03 | -1.152420E-02 |
| 662 | 0.000000E+00 | 0.000000E+00 | 5.475100E-02 | -3.690834E-03 | 1.571657E-04 |
| 671 | 0.000000E+00 | 0.000000E+00 | -8.756439E-02 | -9.479566E-03 | 5.700124E-03 |
| 672 | 0.000000E+00 | 0.000000E+00 | -5.685737E-02 | 6.059516E-03 | -5.491859E-05 |
| 681 | 0.000000E+00 | 0.000000E+00 | 1.822404E-02 | -5.333574E-04 | 3.607965E-04 |
| 682 | 0.000000E+00 | 0.000000E+00 | -4.364818E-02 | 7.832482E-03 | -1.004769E-03 |
| Surface # | $a_{10}$ | $a_{12}$ | $a_{14}$ | $a_{16}$ | |
| 611 | 9.846738E-05 | 4.714438E-04 | -2.664326E-05 | -1.103395E-04 | |
| 612 | -1.654428E-04 | -1.025132E-03 | 1.500331E-04 | 7.520389E-05 | |
| 621 | 2.494488E-03 | -4.513208E-04 | -2.329148E-03 | 1.416219E-03 | |
| 622 | -6.797110E-04 | -2.502134E-03 | -1.531180E-03 | 1.794494E-03 | |
| 631 | -3.423407E-03 | -8.951177E-04 | 2.027061E-03 | -4.949500E-04 | |
| 632 | 4.669710E-03 | 2.182327E-03 | -1.665024E-04 | -5.576180E-04 | |
| 641 | 3.392289E-03 | 1.741179E-03 | -5.141657E-04 | -8.615773E-04 | |
| 642 | 9.096561E-03 | -3.242672E-03 | -2.408433E-03 | 7.167670E-04 | |
| 651 | 7.337347E-04 | -1.443886E-03 | -2.838734E-04 | 6.085717E-05 | |
| 652 | -2.829833E-03 | 4.939706E-04 | 6.444691E-04 | -1.595394E-04 | |
| 661 | 3.978590E-03 | -2.385241E-04 | -4.689302E-04 | 1.271338E-04 | |
| 662 | 8.257389E-04 | 4.813459E-05 | -4.620442E-06 | -1.206853E-05 | |
| 671 | 6.961896E-04 | -1.983609E-04 | -1.935153E-05 | 2.271791E-06 | |
| 672 | 4.403314E-05 | -1.710788E-05 | -7.169546E-07 | 4.039918E-07 | |
| 681 | 2.642049E-06 | -2.807546E-06 | -6.757672E-07 | 9.255064E-08 | |
| 682 | 5.249520E-05 | 1.208995E-06 | -7.165930E-08 | -6.785381E-09 | |

FIG. 29

| EFL = 4.221 mm, HFOV = 37.167deg., TTL = 5.488 mm, Image height = 3.238 mm, Fno=1.600 ||||||
|---|---|---|---|---|---|---|
| Surface # | | Radius (mm) | Thickness / air gap (mm) | Refractive index | Abbe number | Focal length (mm) |
| - | Object | INFINITY | INFINITY | | | |
| 700 | Aperture stop | INFINITY | -0.481 | | | |
| 711 | 1st lens element | 1.975 | 0.738 | 1.545 | 55.987 | 3.973 |
| 712 | | 19.025 | 0.068 | | | |
| 721 | 2nd lens element | 5.515 | 0.216 | 1.661 | 20.373 | -9.051 |
| 722 | | 2.837 | 0.401 | | | |
| 731 | 3rd lens element | 4.758 | 0.322 | 1.661 | 20.373 | 7758.871 |
| 732 | | 4.634 | 0.135 | | | |
| 741 | 4th lens element | 1107.244 | 0.538 | 1.545 | 55.987 | -5668.698 |
| 742 | | 815.473 | 0.075 | | | |
| 751 | 5th lens element | 11.885 | 0.336 | 1.661 | 20.373 | 948525916.281 |
| 752 | | 11.751 | 0.137 | | | |
| 761 | 6th lens element | 18.253 | 0.539 | 1.545 | 55.987 | 3.326 |
| 762 | | -1.997 | 0.105 | | | |
| 771 | 7th lens element | 4.665 | 0.291 | 1.545 | 55.987 | -70.701 |
| 772 | | 4.071 | 0.335 | | | |
| 781 | 8th lens element | -2.756 | 0.312 | 1.545 | 55.987 | -2.891 |
| 782 | | 3.847 | 0.488 | | | |
| 791 | Filtering unit | INFINITY | 0.210 | 1.517 | 64.167 | |
| 792 | | INFINITY | 0.241 | | | |
| 793 | Image plane | INFINITY | 0.000 | | | |

FIG. 32

| Aspherical parameters | | | | | |
|---|---|---|---|---|---|
| Surface # | K | $a_2$ | $a_4$ | $a_6$ | $a_8$ |
| 711 | 0.000000E+00 | 0.000000E+00 | 1.836386E-03 | 2.124133E-03 | -1.428391E-03 |
| 712 | 0.000000E+00 | 0.000000E+00 | 5.339309E-03 | -5.559311E-03 | 2.850949E-03 |
| 721 | 0.000000E+00 | 0.000000E+00 | -3.040434E-02 | 9.465432E-03 | 2.340899E-03 |
| 722 | 0.000000E+00 | 0.000000E+00 | -3.825309E-02 | 8.027062E-03 | 5.661254E-03 |
| 731 | 0.000000E+00 | 0.000000E+00 | -7.055039E-02 | -3.210813E-02 | -5.471686E-03 |
| 732 | 0.000000E+00 | 0.000000E+00 | -6.083173E-02 | -1.681804E-02 | -9.000395E-03 |
| 741 | 0.000000E+00 | 0.000000E+00 | -2.888920E-02 | 3.575849E-03 | -2.888568E-03 |
| 742 | 0.000000E+00 | 0.000000E+00 | -7.405290E-02 | -5.266876E-02 | 2.175522E-02 |
| 751 | 0.000000E+00 | 0.000000E+00 | -1.282516E-01 | -5.984288E-03 | 1.597032E-02 |
| 752 | 0.000000E+00 | 0.000000E+00 | -1.599903E-01 | 5.661404E-02 | -1.087705E-02 |
| 761 | 0.000000E+00 | 0.000000E+00 | -3.311179E-02 | 7.830036E-03 | -1.292850E-02 |
| 762 | 0.000000E+00 | 0.000000E+00 | 7.044632E-02 | -6.380726E-03 | -1.953160E-03 |
| 771 | 0.000000E+00 | 0.000000E+00 | -1.333979E-01 | -9.691029E-03 | 7.454850E-03 |
| 772 | 0.000000E+00 | 0.000000E+00 | -8.698321E-02 | 9.694486E-03 | 4.966534E-05 |
| 781 | 0.000000E+00 | 0.000000E+00 | 2.441103E-02 | -1.079386E-03 | 3.248707E-04 |
| 782 | 0.000000E+00 | 0.000000E+00 | -6.309355E-02 | 1.193388E-02 | -1.273565E-03 |
| Surface # | $a_{10}$ | $a_{12}$ | $a_{14}$ | $a_{16}$ | |
| 711 | 4.212770E-05 | 4.025547E-04 | -5.482639E-05 | -1.084687E-04 | |
| 712 | -9.575561E-05 | -9.492948E-04 | 1.740639E-04 | 6.030787E-05 | |
| 721 | 2.822213E-03 | -6.311218E-04 | -2.467828E-03 | 1.476555E-03 | |
| 722 | -1.994641E-04 | -1.585714E-03 | -1.186976E-03 | 1.102092E-03 | |
| 731 | -4.124868E-03 | -1.971780E-03 | 1.268268E-03 | 3.917346E-05 | |
| 732 | 2.955826E-03 | 2.401447E-03 | 8.593039E-04 | -5.214749E-04 | |
| 741 | 2.727820E-03 | 1.689570E-03 | -3.563293E-04 | -6.631940E-04 | |
| 742 | 1.026871E-02 | -2.982763E-03 | -2.567421E-03 | 6.166505E-04 | |
| 751 | 7.248482E-04 | -1.316068E-03 | -1.482373E-04 | 2.078600E-04 | |
| 752 | -2.902965E-03 | 6.890610E-04 | 7.842011E-04 | -9.921152E-05 | |
| 761 | 3.453040E-03 | -3.847342E-04 | -4.772405E-04 | 1.523826E-04 | |
| 762 | 6.842393E-04 | 1.332479E-04 | 2.034716E-05 | -1.407334E-05 | |
| 771 | 7.817809E-04 | -2.237768E-04 | -2.365019E-05 | 3.202419E-06 | |
| 772 | 5.542154E-05 | -1.733392E-05 | -1.231630E-06 | 2.860613E-07 | |
| 781 | 1.478619E-06 | -2.631472E-06 | -6.209549E-07 | 1.033001E-07 | |
| 782 | 3.292870E-05 | 6.963319E-07 | -1.840112E-08 | 8.606878E-09 | |

FIG. 33

| EFL = 4.434 mm, HFOV = 36.188deg., TTL = 5.800 mm, Image height = 3.2 mm, Fno=1.600 ||||||
|---|---|---|---|---|---|---|
| Surface # | | Radius (mm) | Thickness / air gap (mm) | Refractive index | Abbe number | Focal length (mm) |
| - | Object | INFINITY | INFINITY | | | |
| 800 | Aperture stop | INFINITY | -0.557 | | | |
| 811 | 1st lens element | 1.998 | 1.033 | 1.545 | 55.987 | 3.908 |
| 812 | | 25.515 | 0.043 | | | |
| 821 | 2nd lens element | 9.020 | 0.213 | 1.661 | 20.373 | -9.249 |
| 822 | | 3.629 | 0.271 | | | |
| 831 | 3rd lens element | 5.165 | 0.255 | 1.661 | 20.373 | -32.942 |
| 832 | | 4.099 | 0.071 | | | |
| 841 | 4th lens element | 10.398 | 0.835 | 1.545 | 55.987 | 33.780 |
| 842 | | 23.144 | 0.065 | | | |
| 851 | 5th lens element | 30.783 | 0.285 | 1.661 | 20.373 | -30.522 |
| 852 | | 12.210 | 0.049 | | | |
| 861 | 6th lens element | 8.110 | 0.818 | 1.545 | 55.987 | 3.330 |
| 862 | | -2.262 | 0.060 | | | |
| 871 | 7th lens element | 5.573 | 0.293 | 1.545 | 55.987 | 140.708 |
| 872 | | 5.897 | 0.279 | | | |
| 881 | 8th lens element | -2.783 | 0.299 | 1.545 | 55.987 | -2.775 |
| 882 | | 3.455 | 0.488 | | | |
| 891 | Filtering unit | INFINITY | 0.210 | 1.517 | 64.167 | |
| 892 | | INFINITY | 0.235 | | | |
| 893 | Image plane | INFINITY | 0.000 | | | |

FIG. 36

| Aspherical parameters | | | | | |
|---|---|---|---|---|---|
| Surface # | K | $a_2$ | $a_4$ | $a_6$ | $a_8$ |
| 811 | 0.000000E+00 | 0.000000E+00 | 1.198205E-03 | 3.095259E-03 | -1.352025E-03 |
| 812 | 0.000000E+00 | 0.000000E+00 | 4.107165E-03 | -4.543783E-03 | 3.267476E-03 |
| 821 | 0.000000E+00 | 0.000000E+00 | -3.203964E-02 | 7.513308E-03 | 1.391110E-03 |
| 822 | 0.000000E+00 | 0.000000E+00 | -4.213469E-02 | 4.882020E-03 | 4.927884E-03 |
| 831 | 0.000000E+00 | 0.000000E+00 | -6.544644E-02 | -2.385022E-02 | -7.454025E-04 |
| 832 | 0.000000E+00 | 0.000000E+00 | -5.927300E-02 | -1.294907E-02 | -5.603340E-03 |
| 841 | 0.000000E+00 | 0.000000E+00 | -2.864281E-02 | 3.232560E-04 | -5.698398E-03 |
| 842 | 0.000000E+00 | 0.000000E+00 | -7.615130E-02 | -5.286680E-02 | 2.131981E-02 |
| 851 | 0.000000E+00 | 0.000000E+00 | -1.298733E-01 | -4.781326E-03 | 1.668179E-02 |
| 852 | 0.000000E+00 | 0.000000E+00 | -1.501082E-01 | 5.609855E-02 | -1.108548E-02 |
| 861 | 0.000000E+00 | 0.000000E+00 | -4.795281E-02 | 7.291105E-03 | -1.542382E-02 |
| 862 | 0.000000E+00 | 0.000000E+00 | 5.118912E-02 | -1.445273E-02 | -1.796988E-03 |
| 871 | 0.000000E+00 | 0.000000E+00 | -1.425982E-01 | -1.017401E-02 | 7.349587E-03 |
| 872 | 0.000000E+00 | 0.000000E+00 | -8.504280E-02 | 1.142728E-02 | 3.072436E-05 |
| 881 | 0.000000E+00 | 0.000000E+00 | 2.056206E-02 | -9.455983E-04 | 3.726065E-04 |
| 882 | 0.000000E+00 | 0.000000E+00 | -6.706011E-02 | 1.192764E-02 | -1.265963E-03 |
| Surface # | $a_{10}$ | $a_{12}$ | $a_{14}$ | $a_{16}$ | |
| 811 | -2.223442E-07 | 4.213328E-04 | 2.032167E-06 | -4.948573E-05 | |
| 812 | -1.449272E-04 | -1.048265E-03 | 1.875719E-04 | 1.692450E-04 | |
| 821 | 2.675931E-03 | -5.551127E-04 | -2.437397E-03 | 1.405870E-03 | |
| 822 | -4.404666E-04 | -1.840949E-03 | -1.352069E-03 | 1.199594E-03 | |
| 831 | -1.795834E-03 | -1.050922E-03 | 1.327675E-03 | -5.112785E-04 | |
| 832 | 4.010195E-03 | 2.139818E-03 | 4.781072E-04 | -4.430576E-04 | |
| 841 | 2.390388E-03 | 2.403231E-03 | 2.190066E-04 | -5.644327E-04 | |
| 842 | 9.895448E-03 | -2.962846E-03 | -2.426746E-03 | 7.313241E-04 | |
| 851 | 9.871698E-04 | -1.360955E-03 | -2.652835E-04 | 1.085176E-04 | |
| 852 | -2.954859E-03 | 6.594647E-04 | 7.590666E-04 | -1.188043E-04 | |
| 861 | 3.365897E-03 | 1.319643E-06 | -3.733525E-04 | 9.350330E-05 | |
| 862 | 6.935755E-04 | 1.311693E-04 | 2.148259E-05 | -1.341130E-05 | |
| 871 | 8.077051E-04 | -2.126026E-04 | -2.076631E-05 | 3.921958E-06 | |
| 872 | 4.344669E-05 | -1.883149E-05 | -1.387370E-06 | 2.607410E-07 | |
| 881 | 3.036070E-06 | -3.000649E-06 | -7.087394E-07 | 9.183708E-08 | |
| 882 | 3.618497E-05 | 1.008601E-06 | -2.062201E-08 | 2.177406E-09 | |

FIG. 37

| \multicolumn{6}{c|}{EFL = 4.153 mm, HFOV = 36.939deg., TTL = 5.453 mm, Image height = 3.2 mm, Fno=1.600} |
|---|---|---|---|---|---|---|
| Surface # | | Radius (mm) | Thickness / air gap (mm) | Refractive index | Abbe number | Focal length (mm) |
| - | Object | INFINITY | INFINITY | | | |
| 900 | Aperture stop | INFINITY | -0.469 | | | |
| 911 | 1st lens element | 1.960 | 0.768 | 1.545 | 55.987 | 3.931 |
| 912 | | 19.320 | 0.099 | | | |
| 921 | 2nd lens element | 6.059 | 0.227 | 1.661 | 20.373 | -9.315 |
| 922 | | 3.022 | 0.347 | | | |
| 931 | 3rd lens element | 5.826 | 0.274 | 1.661 | 20.373 | -40.230 |
| 932 | | 4.697 | 0.092 | | | |
| 941 | 4th lens element | 14.327 | 0.610 | 1.545 | 55.987 | 14.437 |
| 942 | | -17.281 | 0.089 | | | |
| 951 | 5th lens element | -13.856 | 0.281 | 1.661 | 20.373 | -40.282 |
| 952 | | -28.839 | 0.209 | | | |
| 961 | 6th lens element | 44050.566 | 0.438 | 1.545 | 55.987 | 4.244 |
| 962 | | -2.319 | 0.015 | | | |
| 971 | 7th lens element | 8.872 | 0.581 | 1.545 | 55.987 | -17.944 |
| 972 | | 4.549 | 0.577 | | | |
| 981 | 8th lens element | -3.005 | 0.216 | 1.545 | 55.987 | -3.646 |
| 982 | | 6.058 | 0.300 | | | |
| 991 | Filtering unit | INFINITY | 0.210 | 1.517 | 64.167 | |
| 992 | | INFINITY | 0.121 | | | |
| 993 | Image plane | INFINITY | 0.000 | | | |

FIG. 40

| Aspherical parameters | | | | | |
|---|---|---|---|---|---|
| Surface # | K | $a_2$ | $a_4$ | $a_6$ | $a_8$ |
| 911 | 0.000000E+00 | 0.000000E+00 | 1.267186E-03 | 2.257591E-03 | -1.617125E-03 |
| 912 | 0.000000E+00 | 0.000000E+00 | 1.183806E-03 | -5.274175E-03 | 3.233742E-03 |
| 921 | 0.000000E+00 | 0.000000E+00 | -2.788195E-02 | 8.837295E-03 | 1.704026E-03 |
| 922 | 0.000000E+00 | 0.000000E+00 | -2.825027E-02 | 5.637638E-03 | 7.066354E-03 |
| 931 | 0.000000E+00 | 0.000000E+00 | -6.114204E-02 | -2.511835E-02 | -3.315596E-03 |
| 932 | 0.000000E+00 | 0.000000E+00 | -5.374183E-02 | -1.858653E-02 | -7.217339E-03 |
| 941 | 0.000000E+00 | 0.000000E+00 | -2.603397E-02 | -3.507224E-03 | -5.501149E-03 |
| 942 | 0.000000E+00 | 0.000000E+00 | -6.446155E-02 | -4.698776E-02 | 2.001101E-02 |
| 951 | 0.000000E+00 | 0.000000E+00 | -1.256720E-01 | -1.852653E-03 | 1.689268E-02 |
| 952 | 0.000000E+00 | 0.000000E+00 | -1.427084E-01 | 5.508700E-02 | -9.647063E-03 |
| 961 | 0.000000E+00 | 0.000000E+00 | -2.683380E-02 | 1.452998E-02 | -1.555927E-02 |
| 962 | 0.000000E+00 | 0.000000E+00 | 6.068178E-02 | -1.093768E-02 | 3.435660E-05 |
| 971 | 0.000000E+00 | 0.000000E+00 | -7.168944E-02 | -8.155440E-03 | 5.519637E-03 |
| 972 | 0.000000E+00 | 0.000000E+00 | -5.771881E-02 | 6.046312E-03 | -3.319468E-04 |
| 981 | 0.000000E+00 | 0.000000E+00 | 3.572548E-03 | 6.309640E-04 | 3.901450E-04 |
| 982 | 0.000000E+00 | 0.000000E+00 | -4.063905E-02 | 7.488506E-03 | -9.650801E-04 |
| Surface # | $a_{10}$ | $a_{12}$ | $a_{14}$ | $a_{16}$ | |
| 911 | -1.923837E-05 | 3.830731E-04 | -5.402606E-05 | -9.634206E-05 | |
| 912 | -3.691051E-05 | -9.797927E-04 | 1.465260E-04 | 5.026956E-05 | |
| 921 | 3.308849E-03 | -1.061488E-04 | -2.359555E-03 | 1.192814E-03 | |
| 922 | 7.718153E-04 | -1.329630E-03 | -1.335866E-03 | 9.548332E-04 | |
| 931 | -2.167675E-03 | -5.560225E-04 | 1.796505E-03 | -4.840564E-04 | |
| 932 | 3.762354E-03 | 2.159632E-03 | 5.491430E-04 | -1.382917E-04 | |
| 941 | 2.413492E-03 | 2.166482E-03 | 1.180712E-04 | -5.849121E-04 | |
| 942 | 8.887604E-03 | -2.928074E-03 | -2.335878E-03 | 6.746851E-04 | |
| 951 | 8.200411E-04 | -1.514316E-03 | -2.336696E-04 | 1.912834E-04 | |
| 952 | -2.383849E-03 | 6.168902E-04 | 6.601581E-04 | -1.121194E-04 | |
| 961 | 3.009676E-03 | 1.911617E-05 | -3.130060E-04 | 1.125905E-04 | |
| 962 | 5.970880E-04 | 8.073061E-06 | -4.738644E-06 | -6.845491E-06 | |
| 971 | 8.614618E-04 | -4.116905E-04 | -6.812193E-05 | 1.650031E-05 | |
| 972 | 3.167901E-05 | -1.535364E-05 | -5.706176E-07 | 3.825377E-07 | |
| 981 | 2.716285E-06 | -2.954056E-06 | -7.318898E-07 | 8.192595E-08 | |
| 982 | 5.213653E-05 | 1.063994E-06 | -6.623385E-08 | -9.688728E-09 | |

FIG. 41

| EFL = 4.263 mm, HFOV = 36.572deg., TTL = 5.607 mm, Image height = 3.2 mm, Fno=1.600 ||||||
|---|---|---|---|---|---|---|
| Surface # | | Radius (mm) | Thickness / air gap (mm) | Refractive index | Abbe number | Focal length (mm) |
| - | Object | INFINITY | INFINITY | | | |
| 1000 | Aperture stop | INFINITY | -0.497 | | | |
| 1011 | 1st lens element | 2.015 | 0.741 | 1.545 | 55.987 | 3.981 |
| 1012 | | 23.936 | 0.030 | | | |
| 1021 | 2nd lens element | 3.691 | 0.249 | 1.661 | 20.373 | -9.767 |
| 1022 | | 2.293 | 0.374 | | | |
| 1031 | 3rd lens element | 5.574 | 0.250 | 1.661 | 20.373 | -25.941 |
| 1032 | | 4.140 | 0.072 | | | |
| 1041 | 4th lens element | 16.171 | 0.976 | 1.545 | 55.987 | 27.860 |
| 1042 | | -252.944 | 0.081 | | | |
| 1051 | 5th lens element | 96.852 | 0.291 | 1.661 | 20.373 | -30.854 |
| 1052 | | 16.955 | 0.074 | | | |
| 1061 | 6th lens element | 12.945 | 0.492 | 1.545 | 55.987 | 3.278 |
| 1062 | | -2.050 | 0.039 | | | |
| 1071 | 7th lens element | 2.911 | 0.254 | 1.545 | 55.987 | -525.490 |
| 1072 | | 2.793 | 0.425 | | | |
| 1081 | 8th lens element | -2.941 | 0.314 | 1.545 | 55.987 | -2.979 |
| 1082 | | 3.782 | 0.488 | | | |
| 1091 | Filtering unit | INFINITY | 0.210 | 1.517 | 64.167 | |
| 1092 | | INFINITY | 0.247 | | | |
| 1093 | Image plane | INFINITY | 0.000 | | | |

FIG. 44

| Aspherical parameters | | | | | |
|---|---|---|---|---|---|
| Surface # | K | $a_2$ | $a_4$ | $a_6$ | $a_8$ |
| 1011 | 0.000000E+00 | 0.000000E+00 | 2.876686E-03 | 2.910818E-03 | -1.486292E-03 |
| 1012 | 0.000000E+00 | 0.000000E+00 | 4.966793E-03 | -4.684256E-03 | 3.181299E-03 |
| 1021 | 0.000000E+00 | 0.000000E+00 | -3.826281E-02 | 7.154880E-03 | 1.366393E-03 |
| 1022 | 0.000000E+00 | 0.000000E+00 | -4.593311E-02 | 3.815728E-03 | 5.568550E-03 |
| 1031 | 0.000000E+00 | 0.000000E+00 | -7.196829E-02 | -2.644389E-02 | -2.880901E-03 |
| 1032 | 0.000000E+00 | 0.000000E+00 | -6.124771E-02 | -1.479413E-02 | -6.560788E-03 |
| 1041 | 0.000000E+00 | 0.000000E+00 | -1.538546E-02 | 2.762410E-03 | -5.632475E-03 |
| 1042 | 0.000000E+00 | 0.000000E+00 | -7.799391E-02 | -4.819753E-02 | 2.039584E-02 |
| 1051 | 0.000000E+00 | 0.000000E+00 | -1.255887E-01 | -9.564088E-03 | 1.727420E-02 |
| 1052 | 0.000000E+00 | 0.000000E+00 | -1.596392E-01 | 5.837612E-02 | -1.085445E-02 |
| 1061 | 0.000000E+00 | 0.000000E+00 | -3.661487E-02 | 3.165531E-03 | -1.240074E-02 |
| 1062 | 0.000000E+00 | 0.000000E+00 | 7.592090E-02 | -1.385290E-02 | -1.376255E-03 |
| 1071 | 0.000000E+00 | 0.000000E+00 | -1.427444E-01 | 2.847735E-03 | 4.835004E-03 |
| 1072 | 0.000000E+00 | 0.000000E+00 | -9.340916E-02 | 8.604912E-03 | -1.933951E-04 |
| 1081 | 0.000000E+00 | 0.000000E+00 | 1.569181E-02 | -4.553372E-04 | 3.695305E-04 |
| 1082 | 0.000000E+00 | 0.000000E+00 | -6.256703E-02 | 1.134302E-02 | -1.211957E-03 |
| Surface # | $a_{10}$ | $a_{12}$ | $a_{14}$ | $a_{16}$ | |
| 1011 | 7.348498E-05 | 4.424983E-04 | -3.372745E-05 | -1.007629E-04 | |
| 1012 | -1.613388E-04 | -1.046620E-03 | 1.454929E-04 | 8.670245E-05 | |
| 1021 | 2.894866E-03 | -3.955472E-04 | -2.383496E-03 | 1.392599E-03 | |
| 1022 | -6.156897E-04 | -2.153151E-03 | -1.444436E-03 | 1.339673E-03 | |
| 1031 | -2.806770E-03 | -1.478427E-03 | 1.365949E-03 | 1.996585E-04 | |
| 1032 | 3.781500E-03 | 2.408610E-03 | 7.056338E-04 | -5.935285E-04 | |
| 1041 | 1.928521E-03 | 1.730016E-03 | -2.390811E-04 | -5.872225E-04 | |
| 1042 | 9.649127E-03 | -2.781457E-03 | -2.364714E-03 | 7.083977E-04 | |
| 1051 | 1.371687E-03 | -1.265674E-03 | -2.282469E-04 | 1.029958E-04 | |
| 1052 | -2.718039E-03 | 7.090902E-04 | 7.210462E-04 | -1.520754E-04 | |
| 1061 | 3.614543E-03 | -2.793046E-04 | -4.244863E-04 | 1.623650E-04 | |
| 1062 | 9.134747E-04 | 1.399877E-04 | 1.359463E-05 | -1.485696E-05 | |
| 1071 | 1.312158E-04 | -2.395042E-04 | -1.360253E-05 | 4.331365E-06 | |
| 1072 | 1.265934E-05 | -1.817654E-05 | -5.197385E-07 | 4.491082E-07 | |
| 1081 | 1.073939E-06 | -3.160509E-06 | -7.094548E-07 | 9.572475E-08 | |
| 1082 | 3.939159E-05 | 1.349006E-06 | -6.395612E-09 | -5.667407E-09 | |

FIG. 45

| \multicolumn{6}{c}{EFL = 4.223 mm, HFOV = 36.678deg., TTL = 5.521 mm, Image height = 3.2 mm, Fno=1.600} |
|---|---|---|---|---|---|---|
| Surface # | | Radius (mm) | Thickness / air gap (mm) | Refractive index | Abbe number | Focal length (mm) |
| - | Object | INFINITY | INFINITY | | | |
| 11'00 | Aperture stop | INFINITY | -0.492 | | | |
| 11'11 | 1st lens element | 1.975 | 0.733 | 1.545 | 55.987 | 3.936 |
| 11'12 | | 21.106 | 0.071 | | | |
| 11'21 | 2nd lens element | 4.525 | 0.249 | 1.661 | 20.373 | -9.721 |
| 11'22 | | 2.607 | 0.374 | | | |
| 11'31 | 3rd lens element | 6.318 | 0.248 | 1.661 | 20.373 | -26.510 |
| 11'32 | | 4.582 | 0.058 | | | |
| 11'41 | 4th lens element | 11.317 | 0.604 | 1.545 | 55.987 | 18.821 |
| 11'42 | | -110.248 | 0.095 | | | |
| 11'51 | 5th lens element | -22.705 | 0.270 | 1.661 | 20.373 | -25.580 |
| 11'52 | | 69.023 | 0.105 | | | |
| 11'61 | 6th lens element | 11.584 | 0.850 | 1.545 | 55.987 | 3.204 |
| 11'62 | | -2.008 | 0.007 | | | |
| 11'71 | 7th lens element | 3.395 | 0.262 | 1.545 | 55.987 | -2002.955 |
| 11'72 | | 3.292 | 0.372 | | | |
| 11'81 | 8th lens element | -2.822 | 0.263 | 1.545 | 55.987 | -2.771 |
| 11'82 | | 3.374 | 0.488 | | | |
| 11'91 | Filtering unit | INFINITY | 0.210 | 1.517 | 64.167 | |
| 11'92 | | INFINITY | 0.262 | | | |
| 11'93 | Image plane | INFINITY | 0.000 | | | |

FIG. 48

| Aspherical parameters | | | | | |
|---|---|---|---|---|---|
| Surface # | K | $a_2$ | $a_4$ | $a_6$ | $a_8$ |
| 11'11 | 0.000000E+00 | 0.000000E+00 | 2.468242E-03 | 2.233111E-03 | -1.463776E-03 |
| 11'12 | 0.000000E+00 | 0.000000E+00 | 5.291902E-03 | -5.209537E-03 | 2.957099E-03 |
| 11'21 | 0.000000E+00 | 0.000000E+00 | -3.080961E-02 | 8.755112E-03 | 2.063425E-03 |
| 11'22 | 0.000000E+00 | 0.000000E+00 | -3.760057E-02 | 8.166891E-03 | 5.764598E-03 |
| 11'31 | 0.000000E+00 | 0.000000E+00 | -6.876285E-02 | -2.995198E-02 | -4.527059E-03 |
| 11'32 | 0.000000E+00 | 0.000000E+00 | -6.099658E-02 | -1.764982E-02 | -8.746283E-03 |
| 11'41 | 0.000000E+00 | 0.000000E+00 | -2.960901E-02 | 3.576779E-03 | -3.182500E-03 |
| 11'42 | 0.000000E+00 | 0.000000E+00 | -7.311704E-02 | -5.147371E-02 | 2.179581E-02 |
| 11'51 | 0.000000E+00 | 0.000000E+00 | -1.317794E-01 | -6.340784E-03 | 1.645266E-02 |
| 11'52 | 0.000000E+00 | 0.000000E+00 | -1.563575E-01 | 5.707115E-02 | -1.071625E-02 |
| 11'61 | 0.000000E+00 | 0.000000E+00 | -4.427907E-02 | 6.672253E-03 | -1.284557E-02 |
| 11'62 | 0.000000E+00 | 0.000000E+00 | 5.867250E-02 | -8.470802E-03 | -1.625418E-03 |
| 11'71 | 0.000000E+00 | 0.000000E+00 | -1.341096E-01 | -8.821174E-03 | 5.996637E-03 |
| 11'72 | 0.000000E+00 | 0.000000E+00 | -9.208600E-02 | 9.736062E-03 | 2.605539E-05 |
| 11'81 | 0.000000E+00 | 0.000000E+00 | 2.165233E-02 | -9.712601E-04 | 3.427353E-04 |
| 11'82 | 0.000000E+00 | 0.000000E+00 | -6.872248E-02 | 1.171826E-02 | -1.223087E-03 |
| Surface # | $a_{10}$ | $a_{12}$ | $a_{14}$ | $a_{16}$ | |
| 11'11 | 3.502939E-05 | 4.045034E-04 | -5.237596E-05 | -1.065760E-04 | |
| 11'12 | -1.228276E-04 | -9.867881E-04 | 1.592459E-04 | 6.511699E-05 | |
| 11'21 | 2.870205E-03 | -5.198833E-04 | -2.397399E-03 | 1.489916E-03 | |
| 11'22 | -3.597143E-04 | -1.761753E-03 | -1.257587E-03 | 1.175588E-03 | |
| 11'31 | -3.493973E-03 | -1.555682E-03 | 1.468829E-03 | 9.191989E-05 | |
| 11'32 | 3.372551E-03 | 2.689509E-03 | 9.883885E-04 | -4.868917E-04 | |
| 11'41 | 2.612552E-03 | 1.769328E-03 | -2.224410E-04 | -5.969860E-04 | |
| 11'42 | 1.007734E-02 | -3.042657E-03 | -2.539517E-03 | 6.887942E-04 | |
| 11'51 | 1.071468E-03 | -1.184250E-03 | -1.390392E-04 | 1.578588E-04 | |
| 11'52 | -2.819312E-03 | 7.027035E-04 | 7.805160E-04 | -9.943003E-05 | |
| 11'61 | 3.495949E-03 | -3.127180E-04 | -4.252704E-04 | 1.782822E-04 | |
| 11'62 | 7.155965E-04 | 1.368542E-04 | 2.289679E-05 | -1.265904E-05 | |
| 11'71 | 6.100423E-04 | -2.264497E-04 | -2.127149E-05 | 3.526199E-06 | |
| 11'72 | 4.851376E-05 | -1.800681E-05 | -1.219910E-06 | 3.072111E-07 | |
| 11'81 | 2.127954E-06 | -2.737220E-06 | -6.471368E-07 | 1.007526E-07 | |
| 11'82 | 3.560895E-05 | 7.606187E-07 | -2.130833E-08 | 6.217785E-09 | |

FIG. 49

| \multicolumn{7}{c}{EFL = 4.174 mm, HFOV = 37.197deg., TTL = 5.620 mm, Image height = 3.238 mm, Fno=1.600} |

| Surface # | | Radius (mm) | Thickness / air gap (mm) | Refractive index | Abbe number | Focal length (mm) |
|---|---|---|---|---|---|---|
| - | Object | INFINITY | INFINITY | | | |
| 12'00 | Aperture stop | INFINITY | -0.427 | | | |
| 12'11 | 1st lens element | 2.117 | 0.666 | 1.545 | 55.987 | 4.221 |
| 12'12 | | 23.049 | 0.048 | | | |
| 12'21 | 2nd lens element | 4.074 | 0.294 | 1.661 | 20.373 | -10.874 |
| 12'22 | | 2.533 | 0.397 | | | |
| 12'31 | 3rd lens element | 7.989 | 0.396 | 1.661 | 20.373 | -21.504 |
| 12'32 | | 5.030 | 0.073 | | | |
| 12'41 | 4th lens element | 12.420 | 0.552 | 1.545 | 55.987 | 37.035 |
| 12'42 | | 31.666 | 0.083 | | | |
| 12'51 | 5th lens element | 54.197 | 0.300 | 1.661 | 20.373 | -27.412 |
| 12'52 | | 13.643 | 0.060 | | | |
| 12'61 | 6th lens element | 23.742 | 0.540 | 1.545 | 55.987 | 3.309 |
| 12'62 | | -1.941 | 0.053 | | | |
| 12'71 | 7th lens element | 3.587 | 0.516 | 1.545 | 55.987 | -32.506 |
| 12'72 | | 2.832 | 0.456 | | | |
| 12'81 | 8th lens element | -2.932 | 0.311 | 1.545 | 55.987 | -3.819 |
| 12'82 | | 7.502 | 0.488 | | | |
| 12'91 | Filtering unit | INFINITY | 0.210 | 1.517 | 64.167 | |
| 12'92 | | INFINITY | 0.179 | | | |
| 12'93 | Image plane | INFINITY | 0.000 | | | |

FIG. 52

| Aspherical parameters | | | | | |
|---|---|---|---|---|---|
| Surface # | K | $a_2$ | $a_4$ | $a_6$ | $a_8$ |
| 12'11 | 0.000000E+00 | 0.000000E+00 | 2.808499E-03 | 1.961858E-03 | -1.574415E-03 |
| 12'12 | 0.000000E+00 | 0.000000E+00 | 5.965419E-03 | -5.069988E-03 | 2.990593E-03 |
| 12'21 | 0.000000E+00 | 0.000000E+00 | -2.947806E-02 | 7.818137E-03 | 1.456786E-03 |
| 12'22 | 0.000000E+00 | 0.000000E+00 | -4.373283E-02 | 6.097666E-03 | 4.525011E-03 |
| 12'31 | 0.000000E+00 | 0.000000E+00 | -7.016731E-02 | -2.628203E-02 | -2.579717E-03 |
| 12'32 | 0.000000E+00 | 0.000000E+00 | -5.722978E-02 | -1.419694E-02 | -7.224540E-03 |
| 12'41 | 0.000000E+00 | 0.000000E+00 | -2.741032E-02 | 3.882697E-03 | -3.432506E-03 |
| 12'42 | 0.000000E+00 | 0.000000E+00 | -7.651342E-02 | -5.359803E-02 | 2.114177E-02 |
| 12'51 | 0.000000E+00 | 0.000000E+00 | -1.272284E-01 | -7.344742E-03 | 1.547933E-02 |
| 12'52 | 0.000000E+00 | 0.000000E+00 | -1.609088E-01 | 5.797330E-02 | -1.047171E-02 |
| 12'61 | 0.000000E+00 | 0.000000E+00 | -1.848948E-02 | 6.204571E-03 | -1.310970E-02 |
| 12'62 | 0.000000E+00 | 0.000000E+00 | 7.587663E-02 | -5.465618E-03 | -1.423544E-03 |
| 12'71 | 0.000000E+00 | 0.000000E+00 | -1.152915E-01 | -9.905504E-03 | 6.769842E-03 |
| 12'72 | 0.000000E+00 | 0.000000E+00 | -9.576307E-02 | 8.869225E-03 | 7.085675E-06 |
| 12'81 | 0.000000E+00 | 0.000000E+00 | 1.278345E-02 | -2.712752E-04 | 3.670251E-04 |
| 12'82 | 0.000000E+00 | 0.000000E+00 | -3.747660E-02 | 8.765620E-03 | -1.192456E-03 |
| Surface # | $a_{10}$ | $a_{12}$ | $a_{14}$ | $a_{16}$ | |
| 12'11 | 1.510930E-05 | 4.100196E-04 | -4.629319E-05 | -1.044325E-04 | |
| 12'12 | -1.453952E-04 | -1.011962E-03 | 1.488372E-04 | 6.703555E-05 | |
| 12'21 | 2.653614E-03 | -5.897033E-04 | -2.442299E-03 | 1.442235E-03 | |
| 12'22 | -1.136127E-03 | -2.170506E-03 | -1.380110E-03 | 1.219912E-03 | |
| 12'31 | -3.504984E-03 | -2.308876E-03 | 8.856699E-04 | 1.443140E-04 | |
| 12'32 | 3.486630E-03 | 2.205244E-03 | 5.178051E-04 | -6.909084E-04 | |
| 12'41 | 2.648755E-03 | 1.832652E-03 | -2.940966E-04 | -7.603116E-04 | |
| 12'42 | 9.986879E-03 | -2.988005E-03 | -2.473697E-03 | 7.153115E-04 | |
| 12'51 | 7.701922E-04 | -1.224513E-03 | -7.770803E-05 | 2.612821E-04 | |
| 12'52 | -2.773985E-03 | 7.554087E-04 | 8.000314E-04 | -1.097116E-04 | |
| 12'61 | 3.960577E-03 | -2.388999E-04 | -4.691447E-04 | 1.469961E-04 | |
| 12'62 | 7.699164E-04 | 1.307938E-04 | 1.177085E-05 | -1.872888E-05 | |
| 12'71 | 6.584153E-04 | -2.401265E-04 | -2.527668E-05 | 3.174214E-06 | |
| 12'72 | 4.851443E-05 | -1.819584E-05 | -1.331482E-06 | 2.734097E-07 | |
| 12'81 | 2.106196E-06 | -3.022486E-06 | -7.150307E-07 | 8.839495E-08 | |
| 12'82 | 5.028655E-05 | 1.846409E-06 | -2.690863E-08 | -7.112323E-09 | |

FIG. 53

| Embodiment | 1st | 2nd | 3rd | 4th | 5th | 6th |
|---|---|---|---|---|---|---|
| EFL | 4.254 | 4.141 | 4.338 | 4.415 | 4.326 | 4.325 |
| T1 | 0.687 | 0.669 | 0.758 | 0.811 | 0.744 | 0.783 |
| G12 | 0.116 | 0.093 | 0.186 | 0.048 | 0.152 | 0.143 |
| T2 | 0.223 | 0.230 | 0.221 | 0.206 | 0.230 | 0.230 |
| G23 | 0.358 | 0.294 | 0.308 | 0.397 | 0.209 | 0.378 |
| T3 | 0.291 | 0.293 | 0.282 | 0.270 | 0.291 | 0.519 |
| G34 | 0.159 | 0.095 | 0.061 | 0.178 | 0.204 | 0.077 |
| T4 | 0.342 | 0.705 | 0.580 | 0.229 | 0.624 | 0.293 |
| G45 | 0.090 | 0.090 | 0.081 | 0.124 | 0.135 | 0.062 |
| T5 | 0.584 | 0.347 | 0.299 | 0.413 | 0.416 | 0.301 |
| G56 | 0.273 | 0.054 | 0.200 | 0.159 | 0.107 | 0.060 |
| T6 | 0.320 | 0.646 | 0.487 | 0.557 | 0.477 | 0.677 |
| G67 | 0.052 | 0.037 | 0.334 | 0.049 | 0.058 | 0.055 |
| T7 | 0.487 | 0.450 | 0.293 | 0.294 | 0.300 | 0.573 |
| G78 | 0.303 | 0.195 | 0.166 | 0.185 | 0.395 | 0.262 |
| T8 | 0.365 | 0.459 | 0.312 | 0.829 | 0.320 | 0.313 |
| G8F | 0.488 | 0.488 | 0.488 | 0.488 | 0.488 | 0.488 |
| TF | 0.210 | 0.210 | 0.210 | 0.210 | 0.210 | 0.210 |
| GFP | 0.313 | 0.278 | 0.247 | 0.323 | 0.243 | 0.282 |
| BFL | 1.010 | 0.975 | 0.945 | 1.020 | 0.941 | 0.980 |
| ALT | 3.299 | 3.798 | 3.233 | 3.609 | 3.400 | 3.689 |
| AAG | 1.352 | 0.858 | 1.335 | 1.139 | 1.260 | 1.037 |
| TL | 4.651 | 4.656 | 4.568 | 4.747 | 4.660 | 4.726 |
| TTL | 5.661 | 5.631 | 5.513 | 5.768 | 5.601 | 5.706 |
| TTL/(T1+T4+T6) | 4.197 | 2.788 | 3.020 | 3.612 | 3.037 | 3.255 |
| ALT/(T1+G23+G78) | 2.447 | 3.279 | 2.624 | 2.591 | 2.521 | 2.591 |
| (T5+T8+G12)/T1 | 1.551 | 1.343 | 1.052 | 1.590 | 1.192 | 0.966 |
| (T2+T3+T7+G78)/T1 | 1.898 | 1.746 | 1.269 | 1.178 | 1.633 | 2.023 |
| (T2+T3+T7+G67)/T6 | 3.290 | 1.562 | 2.319 | 1.470 | 1.843 | 2.035 |
| TL/(T1+T4+T6) | 3.448 | 2.305 | 2.502 | 2.973 | 2.527 | 2.696 |
| AAG/(G23+G34+G78) | 1.647 | 1.469 | 2.495 | 1.499 | 1.559 | 1.445 |
| (T5+T8+G45)/T4 | 3.040 | 1.272 | 1.192 | 5.961 | 1.395 | 2.305 |
| (T2+T3+T7+G12)/T4 | 3.268 | 1.512 | 1.692 | 3.569 | 1.558 | 4.999 |
| (T2+T3+T7+G56)/T8 | 3.488 | 2.239 | 3.188 | 1.120 | 2.902 | 4.412 |
| EFL/(T1+T4+T6) | 3.154 | 2.050 | 2.376 | 2.765 | 2.345 | 2.467 |
| BFL/(G23+G78) | 1.528 | 1.992 | 1.994 | 1.755 | 1.556 | 1.530 |
| (T5+T8+G67)/G23 | 2.794 | 2.862 | 3.068 | 3.253 | 3.800 | 1.767 |
| (T2+T3+T7+G45)/T5 | 1.867 | 3.062 | 2.934 | 2.167 | 2.295 | 4.605 |

FIG. 54

| Embodiment | 7th | 8th | 9th | 10th | 11th | 12th |
|---|---|---|---|---|---|---|
| EFL | 4.221 | 4.434 | 4.153 | 4.263 | 4.223 | 4.174 |
| T1 | 0.738 | 1.033 | 0.768 | 0.741 | 0.733 | 0.666 |
| G12 | 0.068 | 0.043 | 0.099 | 0.030 | 0.071 | 0.048 |
| T2 | 0.216 | 0.213 | 0.227 | 0.249 | 0.249 | 0.294 |
| G23 | 0.401 | 0.271 | 0.347 | 0.374 | 0.374 | 0.397 |
| T3 | 0.322 | 0.255 | 0.274 | 0.250 | 0.248 | 0.396 |
| G34 | 0.135 | 0.071 | 0.092 | 0.072 | 0.058 | 0.073 |
| T4 | 0.538 | 0.835 | 0.610 | 0.976 | 0.604 | 0.552 |
| G45 | 0.075 | 0.065 | 0.089 | 0.081 | 0.095 | 0.083 |
| T5 | 0.336 | 0.285 | 0.281 | 0.291 | 0.270 | 0.300 |
| G56 | 0.137 | 0.049 | 0.209 | 0.074 | 0.105 | 0.060 |
| T6 | 0.539 | 0.818 | 0.438 | 0.492 | 0.850 | 0.540 |
| G67 | 0.105 | 0.060 | 0.015 | 0.039 | 0.007 | 0.053 |
| T7 | 0.291 | 0.293 | 0.581 | 0.254 | 0.262 | 0.516 |
| G78 | 0.335 | 0.279 | 0.577 | 0.425 | 0.372 | 0.456 |
| T8 | 0.312 | 0.299 | 0.216 | 0.314 | 0.263 | 0.311 |
| G8F | 0.488 | 0.488 | 0.300 | 0.488 | 0.488 | 0.488 |
| TF | 0.210 | 0.210 | 0.210 | 0.210 | 0.210 | 0.210 |
| GFP | 0.241 | 0.235 | 0.121 | 0.247 | 0.262 | 0.179 |
| BFL | 0.939 | 0.933 | 0.631 | 0.945 | 0.959 | 0.877 |
| ALT | 3.293 | 4.031 | 3.394 | 3.567 | 3.480 | 3.574 |
| AAG | 1.256 | 0.837 | 1.428 | 1.095 | 1.082 | 1.169 |
| TL | 4.549 | 4.868 | 4.822 | 4.662 | 4.562 | 4.743 |
| TTL | 5.488 | 5.800 | 5.453 | 5.607 | 5.521 | 5.620 |
| TTL/(T1+T4+T6) | 3.022 | 2.160 | 3.003 | 2.537 | 2.524 | 3.198 |
| ALT/(T1+G23+G78) | 2.234 | 2.546 | 2.006 | 2.317 | 2.353 | 2.354 |
| (T5+T8+G12)/T1 | 0.971 | 0.607 | 0.776 | 0.856 | 0.826 | 0.990 |
| (T2+T3+T7+G78)/T1 | 1.576 | 1.007 | 2.160 | 1.589 | 1.543 | 2.496 |
| (T2+T3+T7+G67)/T6 | 1.732 | 1.004 | 2.501 | 1.609 | 0.901 | 2.330 |
| TL/(T1+T4+T6) | 2.505 | 1.812 | 2.656 | 2.110 | 2.086 | 2.699 |
| AAG/(G23+G34+G78) | 1.443 | 1.349 | 1.406 | 1.257 | 1.346 | 1.262 |
| (T5+T8+G45)/T4 | 1.344 | 0.777 | 0.961 | 0.702 | 1.041 | 1.257 |
| (T2+T3+T7+G12)/T4 | 1.667 | 0.962 | 1.936 | 0.802 | 1.376 | 2.271 |
| (T2+T3+T7+G56)/T8 | 3.091 | 2.708 | 5.979 | 2.632 | 3.282 | 4.071 |
| EFL/(T1+T4+T6) | 2.325 | 1.651 | 2.287 | 1.929 | 1.931 | 2.375 |
| BFL/(G23+G78) | 1.277 | 1.695 | 0.683 | 1.183 | 1.286 | 1.029 |
| (T5+T8+G67)/G23 | 1.880 | 2.376 | 1.475 | 1.722 | 1.447 | 1.671 |
| (T2+T3+T7+G45)/T5 | 2.692 | 2.899 | 4.165 | 2.870 | 3.157 | 4.290 |

FIG. 55

OPTICAL IMAGING LENS

CROSS-REFERENCE TO RELATED APPLICATIONS

This application claims priority to P.R.C. Patent Application No. 201711474803.0 titled "Optical Imaging Lens," filed Dec. 29, 2017, with the State Intellectual Property Office of the People's Republic of China (SIPO).

TECHNICAL FIELD

The present disclosure relates to an optical imaging lens, and particularly, relates to an optical imaging lens having, in some embodiments, eight lens elements.

BACKGROUND

As the specifications of mobile devices rapidly evolve, various types of key components, such as optical imaging lens, are developed. Desirable objectives for designing an optical imaging lens may not be limited to compact sizes and imaging quality, but may also include great apertures and view angles. However, traditional optical imaging lenses are usually bulky and heavy, or lack sufficient aperture and view angle.

In light of the above issues, designing an optical imaging lens with a shorter length may not be readily achieved by merely decreasing the size of each element proportionally. This is especially true for an optical imaging lens mounted with, for example, eight lens elements, in which the distance between an object-side surface of the first lens element and an imaging plane along an optical axis may be significant. Size reductions of an optical imaging lens may not be achieved simply by proportionally shrinking the size of each element therein. Various aspects of the optical imaging lens, such as production difficulty, yield, material property, etc. should be taken into consideration.

Therefore, production of a smaller sized optical imaging lens presents higher technical barriers and challenges than that of a conventional lens. Accordingly, achieving good optical characteristics in view of the various relevant considerations and technical barriers may be a challenge in the industry.

SUMMARY

The present disclosure provides for optical imaging lenses. By controlling the convex or concave shape of the surfaces of the lens elements, the length of the optical imaging lens may be shortened, the HFOV and aperture of the optical imaging lens may be broadened, and meanwhile good imaging quality and system functionality may be maintained.

In an example embodiment, an optical imaging lens may comprise eight lens elements, hereinafter referred to as first, second, third, fourth, fifth, sixth, seventh and eighth lens elements. These lens elements may be positioned sequentially from an object side to an image side along an optical axis. Each of the first, second, third, fourth, fifth, sixth, seventh and eighth lens elements may also have an object-side surface facing toward the object side and allowing imaging rays to pass through and an image-side surface facing toward the image side and allowing the imaging rays to pass through.

In the specification, parameters used here are defined as follows: a thickness of the first lens element along the optical axis is represented by T1, an air gap between the first lens element and the second lens element along the optical axis is represented by G12, a thickness of the second lens element along the optical axis is represented by T2, an air gap between the second lens element and the third lens element along the optical axis is represented by G23, a thickness of the third lens element along the optical axis is represented by T3, an air gap between the third lens element and the fourth lens element along the optical axis is represented by G34, a thickness of the fourth lens element along the optical axis is represented by T4, and an air gap between the fourth lens element and the fifth lens element along the optical axis is represented by G45. A thickness of the fifth lens element along the optical axis is represented by T5, an air gap between the fifth lens element and the sixth lens element along the optical axis is represented by G56, a thickness of the sixth lens element along the optical axis is represented by T6, an air gap between the sixth lens element and the seventh lens element along the optical axis is represented by G67, a thickness of the seventh lens element along the optical axis is represented by T7, an air gap between the seventh lens element and the eighth lens element along the optical axis is represented by G78, and a thickness of the eighth lens element along the optical axis is represented by T8. A distance from the image-side surface of the eighth lens element to the object-side surface of a filtering unit along the optical axis is represented by G8F, a thickness of the filtering unit along the optical axis is represented by TF, and an air gap between the image-side surface of the filtering unit and an image plane along the optical axis is represented by GFP. Furthermore, a focal length of the first lens element is represented by f1, a focal length of the second lens element is represented by f2, a focal length of the third lens element is represented by f3, a focal length of the fourth lens element is represented by f4, a focal length of the fifth lens element is represented by f5, a focal length of the sixth lens element is represented by f6, a focal length of the seventh lens element is represented by f7, and a focal length of the eighth lens element is represented by f8. The refractive index of the first lens element is represented by n1, the refractive index of the second lens element is represented by n2, the refractive index of the third lens element is represented by n3, the refractive index of the fourth lens element is represented by n4, the refractive index of the fifth lens element is represented by n5, the refractive index of the sixth lens element is represented by n6, the refractive index of the seventh lens element is represented by n7, and the refractive index of the eighth lens element is represented by n8. An abbe number of the first lens element is represented by V1, an abbe number of the second lens element is represented by V2, an abbe number of the third lens element is represented by V3, an abbe number of the fourth lens element is represented by V4, an abbe number of the fifth lens element is represented by V5, an abbe number of the sixth lens element is represented by V6, an abbe number of the seventh lens element is represented by V7, and an abbe number of the eighth lens element is represented by V8. An effective focal length of the optical imaging lens is represented by EFL or f, a distance from the object-side surface of the first lens element to the image-side surface of the eighth lens element along the optical axis is represented by TL, and a distance from the object-side surface of the first lens element to the image plane along the optical axis is represented by TTL. A sum of the thicknesses of all eight lens elements along the optical axis, i.e. a sum of T1, T2, T3, T4, T5, T6, T7 and T8 is represented by ALT, a sum of all seven air gaps from the first lens element to the eighth lens element along the optical axis, i.e. a sum of G12, G23, G34, G45, G56, G67 and G78 is represented by AAG, and a back focal length of the optical imaging lens, which is defined as the distance from the image-side surface of the eighth lens element to the image plane along the optical axis, i.e. a sum of G8F, TF and GFP is represented by BFL.

In an embodiment of the present disclosure, the first lens element of the optical imaging lens may have positive refracting power, the second lens element may have negative refracting power, an periphery region of the object-side surface of the third lens element may be concave, both the object-side surface and the image-side surface of the fourth lens element may be aspherical surfaces, and both the object-side surface and the image-side surface of the fifth lens element may be aspherical surfaces. An optical axis region of the object-side surface of the sixth lens element may be convex, an optical axis region of the image-side surface of the sixth lens element may be convex, both the object-side surface and the image-side surface of the seventh lens element may be aspherical surfaces, an optical axis region of the image-side surface of the eighth lens element may be concave, and the optical imaging lens may comprise no other lenses having refracting power beyond the eight lens elements.

In another embodiment of the present disclosure, the first lens element of the optical imaging lens may have positive refracting power, the second lens element may have negative refracting power, both the object-side surface and the image-side surface of the third lens element may be aspherical surfaces, and both the object-side surface and the image-side surface of the fourth lens element may be aspherical surfaces. A periphery region of the object-side surface of the fifth lens element may be concave, an optical axis region of the object-side surface of the sixth lens element may be convex, and an optical axis region of the image-side surface of the sixth lens element may be convex. Additionally, an optical axis region of the object-side surface of the seventh lens element may be convex, an optical axis region of the image-side surface of the eighth lens element may be concave, and the optical imaging lens may comprise no other lenses having refracting power beyond the eight lens elements.

In yet another embodiment of the present disclosure, the first lens element of the optical imaging lens may have positive refracting power, the second lens element may have negative refracting power, both the object-side surface and the image-side surface of the third lens element may be aspherical surfaces, and both the object-side surface and the image-side surface of the fourth lens element may be aspherical surfaces A periphery region of the object-side surface of the fifth lens element may be concave, an optical axis region of the object-side surface of the sixth lens element may be convex, and an optical axis region of the image-side surface of the sixth lens element may be convex. Additionally, an optical axis region of the image-side surface of the seventh lens element may be concave, an concave region of the image-side surface of the eighth lens element may be concave, and the optical imaging lens may comprise no other lenses having refracting power beyond the eight lens elements.

In another embodiment, other inequality(s), such as those relating to the ratio among parameters may be taken into consideration. For example:

$V1 > V2+V3$      Inequality (1);

$V4 > V2+V3$      Inequality (2);

$V6 > V2+V3$      Inequality (3);

$TTL/(T1+T4+T6) \leq 4.200$      Inequality (4);

$ALT/(T1+G23+G78) \leq 3.300$      Inequality (5);

$(T5+T8+G12)/T1 \leq 1.600$      Inequality (6);

$(T2+T3+T7+G78)/T1 \leq 2.500$      Inequality (7);

$(T2+T3+T7+G67)/T6 \leq 3.300$      Inequality (8);

$TL/(T1+T4+T6) \leq 3.600$      Inequality (9);

$AAG/(G23+G34+G78) \leq 2.500$      Inequality (10);

$(T5+T8+G45)/T4 \leq 6.000$      Inequality (11);

$(T2+T3+T7+G12)/T4 \leq 5.000$      Inequality (12);

$(T2+T3+T7+G56)/T8 \leq 6.000$      Inequality (13);

$EFL/(T1+T4+T6) \leq 3.300$      Inequality (14);

$BFL/(G23+G78) \leq 2.000$      Inequality (15);

$(T5+T8+G67)/G23 \leq 3.800$      Inequality (16); and/or $(T2+T3+T7+G45)/T5 \leq 4.900$      Inequality (17).

In some embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated into embodiments if no inconsistency occurs.

The above embodiments are not limiting and could be selectively incorporated in other embodiments described herein.

Through controlling the convex or concave shape of the surfaces and at lease one inequality, the optical imaging lens in the embodiments may achieve good imaging quality, the length of the optical imaging lens may be effectively shortened, and the HFOV and aperture of the optical imaging lens may be broadened.

BRIEF DESCRIPTION OF THE DRAWINGS

Example embodiments will be more readily understood from the following detailed description when read in conjunction with the appended drawings, in which:

FIG. 1 depicts a cross-sectional view of one example single lens element according to the present disclosure;

FIG. 2 depicts a cross-sectional view showing the example relation between the shape of a portion and the position where a collimated ray meets the optical axis according to the present disclosure;

FIG. 8 depicts a table of optical data for each lens element of a first embodiment of an optical imaging lens according to the present disclosure;

FIG. 9 depicts a table of aspherical data of a first embodiment of an optical imaging lens according to the present disclosure;

FIG. 12 depicts a table of optical data for each lens element of an optical imaging lens of a second embodiment of the present disclosure;

FIG. 13 depicts a table of aspherical data of a second embodiment optical imaging lens according to the present disclosure;

FIG. 16 depicts a table of optical data for each lens element of an optical imaging lens of a third embodiment of the present disclosure;

FIG. 17 depicts a table of aspherical data of a third embodiment of an optical imaging lens according to the present disclosure;

FIG. 20 depicts a table of optical data for each lens element of an optical imaging lens of a fourth embodiment of the present disclosure;

FIG. 21 depicts a table of aspherical data of a fourth embodiment of an optical imaging lens according to the present disclosure;

FIG. 24 depicts a table of optical data for each lens element of an optical imaging lens of a fifth embodiment of the present disclosure;

FIG. 25 depicts a table of aspherical data of a fifth embodiment of an optical imaging lens according to the present disclosure;

FIG. 28 depicts a table of optical data for each lens element of an optical imaging lens of a sixth embodiment of the present disclosure;

FIG. 29 depicts a table of aspherical data of a sixth embodiment of an optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of an optical imaging lens according to the present disclosure;

FIG. 36 depicts a table of optical data for each lens element of an optical imaging lens of an eighth embodiment of the present disclosure;

FIG. 37 depicts a table of aspherical data of an eighth embodiment of an optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of an optical imaging lens according to the present disclosure;

FIG. 44 depicts a table of optical data for each lens element of an optical imaging lens of a tenth embodiment of the present disclosure;

FIG. 45 depicts a table of aspherical data of a tenth embodiment of an optical imaging lens according to the present disclosure;

FIG. 48 depicts a table of optical data for each lens element of an optical imaging lens of an eleventh embodiment of the present disclosure;

FIG. 49 depicts a table of aspherical data of an eleventh embodiment of an optical imaging lens according to the present disclosure;

FIG. 52 depicts a table of optical data for each lens element of an optical imaging lens of a twelfth embodiment of the present disclosure;

FIG. 53 depicts a table of aspherical data of a twelfth embodiment of an optical imaging lens according to the present disclosure;

FIGS. 54 and 55 depicts a table for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of all twelve example embodiments.

DETAILED DESCRIPTION

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
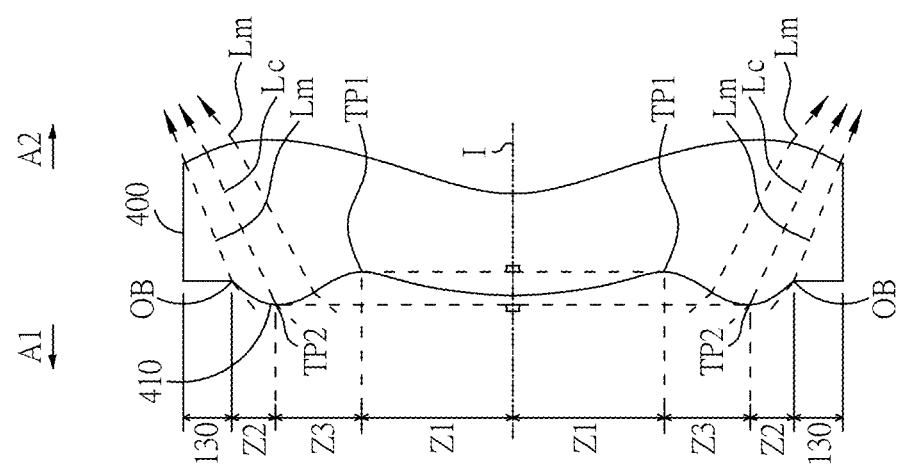
FIG. 4 depicts a cross-sectional view showing a second example of determining the shape of lens element regions and the boundaries of regions.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 3:
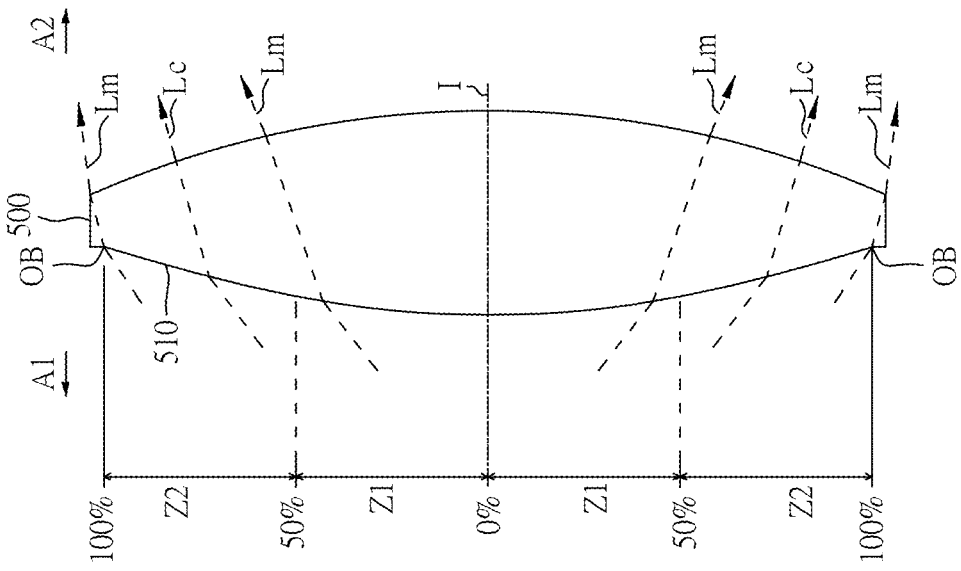
FIG. 3 depicts a cross-sectional view showing a first example of determining the shape of lens element regions and the boundaries of regions.
Figure 5:
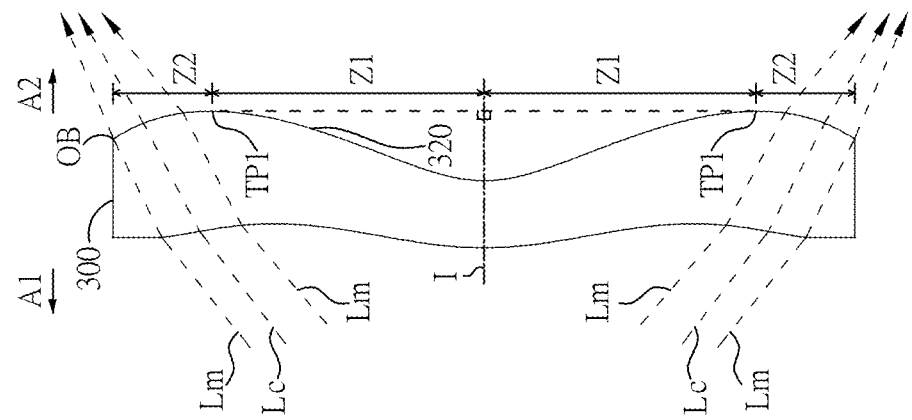
FIG. 5 depicts a cross-sectional view showing a third example of determining the shape of lens element regions and the boundaries of regions.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

In the present disclosure, examples of an optical imaging lens which is a prime lens are provided. Example embodiments of an optical imaging lens may comprise a first lens element, a second lens element, a third lens element, a fourth lens element, a fifth lens element, a sixth lens element, a seventh lens element and an eighth lens element. Each of the lens elements may comprise an object-side surface facing toward an object side and allowing imaging rays to pass through and an image-side surface facing toward an image side and allowing the imaging rays to pass through. These lens elements may be arranged sequentially from the object side to the image side along an optical axis, and example embodiments of the lens may comprise no other lenses having refracting power beyond the eight lens elements.

Through controlling the convex or concave shape of the surfaces and at lease one inequality, the optical imaging lens in the example embodiments may achieve good imaging quality, effectively shorten the length of the optical imaging lens and broaden the HFOV and aperture of the optical imaging lens.

In some embodiments, the lens elements are designed in light of the optical characteristics and the length of the optical imaging lens. For example, the positive refracting power of the first lens element may help collect light; the negative refracting power of the second lens element may help adjust the aberration generated at the first lens element. Further, with at least one feature as follows: (A) the concave periphery region formed on the object-side surface of the third lens element, (B) the concave periphery region formed on the object-side surface of the fifth lens element and the convex optical axis region formed on the object-side surface of the seventh lens element, or (C) the concave periphery region formed on the object-side surface of the fifth lens element and the concave optical axis region formed on the image-side surface of the seventh lens element, and together with the convex optical axis region formed on the object-side surface of the sixth lens element, the convex optical axis region formed on the image-side surface of the sixth lens element and the concave optical axis region formed on the image-side surface of the eighth lens element, the length of the optical axis may be shortened. For the aspherical object-side surfaces and image-side surfaces of the third, fourth and fifth lens element, optionally together with aspherical object-side surfaces and image-side surfaces of the seventh lens element, the aberration may be adjusted effectively.

Additionally, to keep values of the parameters of the optical imaging lens in a proper range and to design imaging lenses with good optical characteristics, short length and broad view angle, Inequality (1) to Inequality (17) are provided herein. To adjust chromatic aberration of the optical lens element, at least one of Inequalities (1)~(3) may be satisfied. The thicknesses of lens elements and the air gaps between adjacent lens elements may be shortened properly to shorten the length of the optical imaging lens and broaden the view angle thereof. However, in light of difficulties in the assembly process and imaging quality, the relation between the thicknesses of the lens elements and/or the air gaps between the lens elements may properly be defined. To properly configure the optical imaging lens, at least one of Inequalities (4)~(17) may be satisfied. To avoid from any excessive value of the parameters which may be unfavorable to adjust aberration of the whole system of the optical imaging lens and to avoid from any insufficient value of the parameters which may increase the production difficulty of the optical imaging lens, Inequality (14) may be satisfied. In some embodiments, desirable imaging quality may be achieved when Inequality (14) is satisfied and when $1.000 \leq EFL/(T1+T4+T6) \leq 2.000$ is also satisfied.

When at least one of Inequalities (4), (5), (6), (8), (9), (10), (11), (12), (13), (15), (16), (17) is satisfied, the relation between the thickness of each lens element and air gap between the lens elements may be sustained in a proper range, thereby any excessive value of the parameters which may be unfavorable to thicken the length of the whole system of the optical imaging lens or any insufficient value of the parameters which may increase the production difficulty of the optical imaging lens may be avoided. In some embodiments, even more desirable imaging quality may be achieved if at least one of the inequalities listed below is satisfied: $1.400 \leq TTL/(T1+T4+T6) \leq 4.200$, $1.200 \leq TL/(T1+T4+T6) \leq 3.600$, $1.100 \leq ALT/(T1+G23+G78) \leq 3.300$, $1.000 \leq AAG/(G23+G34+G78) \leq 2.500$, $0.650 \leq BFL/(G23+G78) \leq 2.000$, $0.600 \leq (T5+T8+G12)/T1 \leq 1.600$, $0.700 \leq (T5+T8+G45)/T4 \leq 6.000$, $1.200 \leq (T5+T8+G67)/G23 \leq 3.800$, $1.000 \leq (T2+T3+T7+G78)/T1 \leq 2.500$, $0.800 \leq (T2+T3+T7+G12)/T4 \leq 5.000$, $1.800 \leq (T2+T3+T7+G45)/T5 \leq 4.900$, $0.900 \leq (T2+T3+T7+G67)/T6 \leq 3.300$, or $1.100 \leq (T2+T3+T7+G56)/T8 \leq 6.000$.

In light of the unpredictability in an optical system, in the present disclosure, satisfying these inequalities listed above may result in shortening the length of the optical imaging lens, lowering the f-number, enlarging the shot angle, promoting the imaging quality and/or increasing the yield in the assembly process.

When implementing example embodiments, more details about the convex or concave surface or refracting power could be incorporated for one specific lens element or broadly for a plurality of lens elements to improve the control for the system performance and/or resolution, or promote the yield. For example, in an example embodiment, each lens element may be made from all kinds of transparent material, such as glass, plastic, resin, etc. It should be noted that the details listed here could be incorporated in the example embodiments if no inconsistency occurs.

Figure 6:
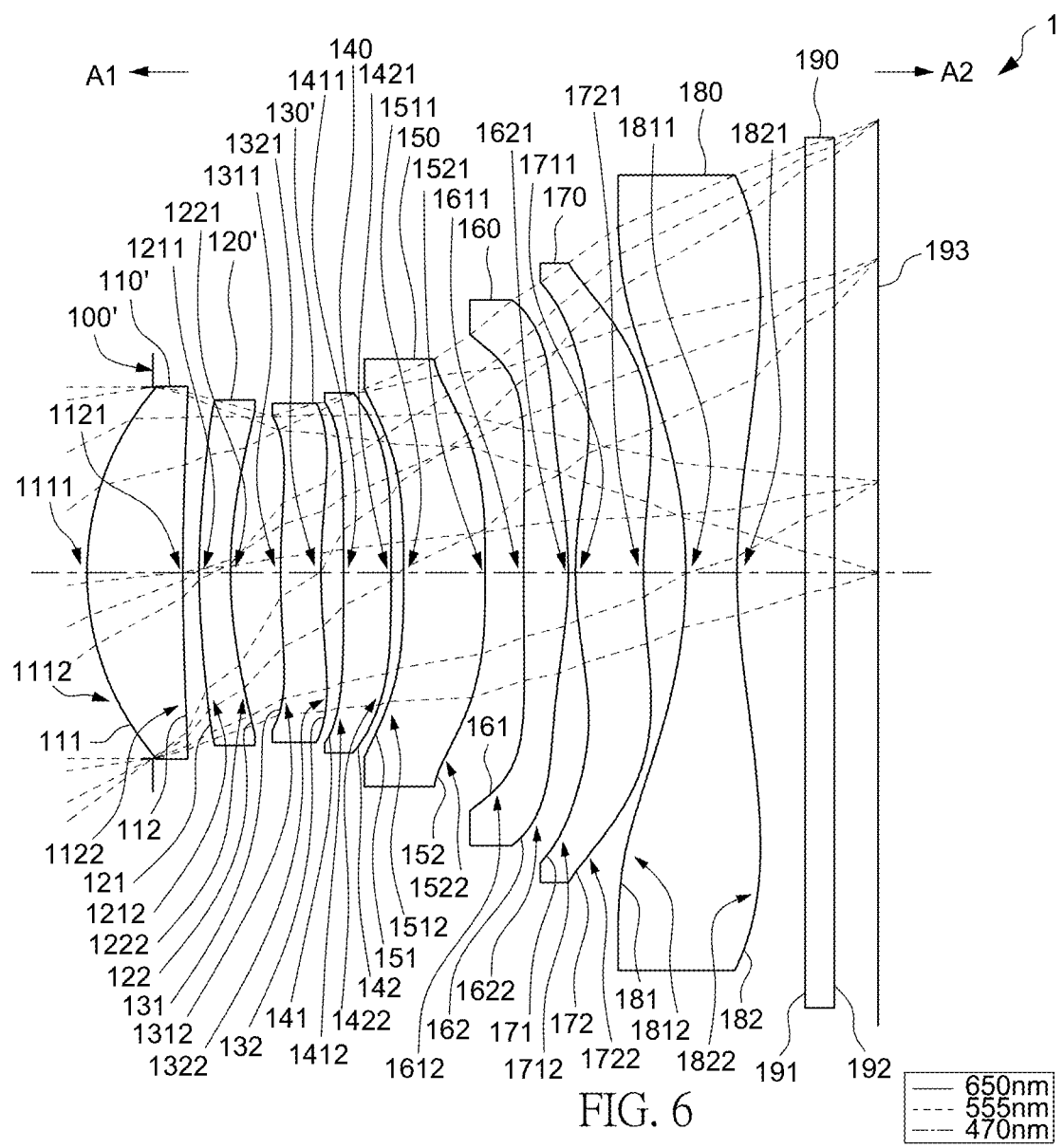
FIG. 6 depicts a cross-sectional view of a first embodiment of an optical imaging lens having eight lens elements according to the present disclosure.
Figure 7:
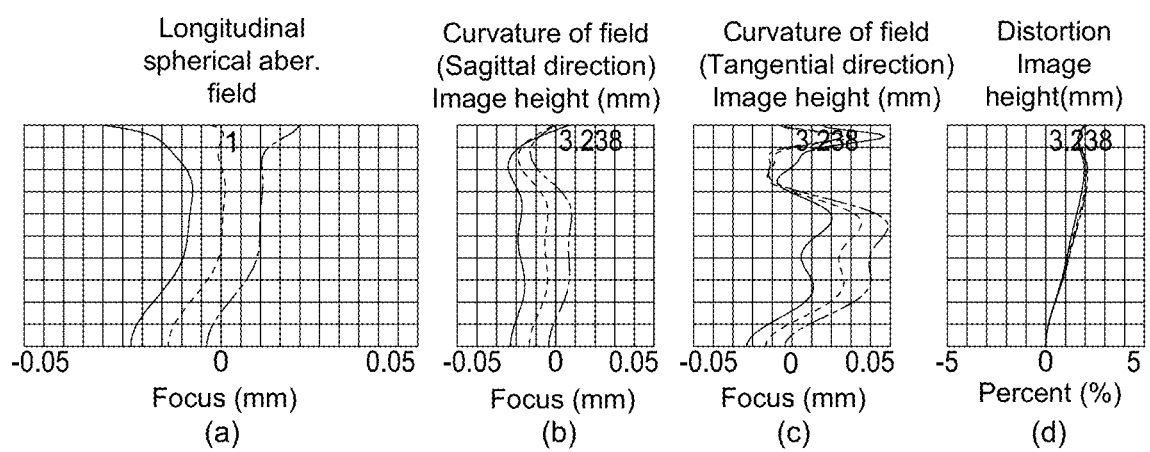
FIG. 7 depicts a chart of a longitudinal spherical aberration and other kinds of optical aberrations of a first embodiment of an optical imaging lens according to the present disclosure.

Several example embodiments and associated optical data will now be provided for illustrating example embodiments of an optical imaging lens with a short length, good optical characteristics, a wide view angle and/or a low f-number. Reference is now made to FIGS. 6-9. FIG. 6 illustrates an example cross-sectional view of an optical imaging lens 1 having eight lens elements of the optical imaging lens according to a first example embodiment. FIG. 7 shows example charts of a longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in the order from an object side A1 to an image side A2 along an optical axis, an aperture stop 100', a first lens element 110', a second lens element 120', a third lens element 130', a fourth lens element 140, a fifth lens element 150, a sixth lens element 160, a seventh lens element 170 and an eighth lens element 180. A filtering unit 190 and an image plane 193 of an image sensor may be positioned at the image side A2 of the optical lens 1. Each of the first, second, third, fourth, fifth, sixth, seventh and eighth lens elements 110', 120', 130', 140, 150, 160, 170, 180 and the filtering unit 190 may comprise an object-side surface 111/121/131/141/151/161/171/181/191 facing toward the object side A1 and an image-side surface 112/122/132/142/152/162/172/182/192 facing toward the image side A2. The filtering unit 190, positioned between the eighth lens element 180 and the image plane 193, may selectively absorb light with specific wavelength from the light passing optical imaging lens 1. The example embodiment of the filtering unit 190 which may selectively absorb light with specific wavelength from the light passing optical imaging lens 1 may be a IR cut filter (infrared cut filter). Then, IR light may be absorbed, and this may prohibit the IR light, which might not be seen by human eyes, from producing an image on the image plane 193.

Please note that during the normal operation of the optical imaging lens 1, the distance between any two adjacent lens elements of the first, second, third, fourth, fifth, sixth, seventh and eighth lens elements 110', 120', 130', 140, 150, 160, 170, 180 may be a unchanged value, i.e. the optical imaging lens 1 may be a prime lens.

Example embodiments of each lens element of the optical imaging lens 1, which may be constructed by glass, plastic, resin material or other transparent material, will now be described with reference to the drawings.

An example embodiment of the first lens element 110', which may be constructed by plastic material, may have positive refracting power. On the object-side surface 111, an optical axis region 1111 may be convex and a periphery region 1112 may be convex. On the image-side surface 112, an optical axis region 1121 may be concave and a periphery region 1122 may be concave.

An example embodiment of the second lens element 120', which may be constructed by plastic material, may have negative refracting power. On the object-side surface 121, an optical axis region 1211 may be convex and a periphery region 1212 may be convex. On the image-side surface 122, an optical axis region 1221 may be concave and a periphery region 1222 may be concave.

An example embodiment of the third lens element 130', which may be constructed by plastic material, may have negative refracting power. On the object-side surface 131, an optical axis region 1311 may be convex and a periphery region 1312 may be concave. On the image-side surface 132, an optical axis region 1321 may be concave and a periphery region 1322 may be convex.

An example embodiment of the fourth lens element 140, which may be constructed by plastic material, may have positive refracting power. On the object-side surface 141, an optical axis region 1411 may be convex and a periphery region 1412 may be concave. On the image-side surface 142, an optical axis region 1421 may be convex and a periphery region 1422 may be convex.

An example embodiment of the fifth lens element 150, which may be constructed by plastic material, may have negative refracting power. On the object-side surface 151, an optical axis region 1511 may be concave and a periphery region 1512 may be concave. On the image-side surface 152, an optical axis region 1521 may be convex and a periphery region 1522 may be convex.

An example embodiment of the sixth lens element 160, which may be constructed by plastic material, may have positive refracting power. On the object-side surface 161, an optical axis region 1611 may be convex and a periphery region 1612 may be concave. On the image-side surface 162, an optical axis region 1621 may be convex and a periphery region 1622 may be convex.

An example embodiment of the seventh lens element 170, which may be constructed by plastic material, may have positive refracting power. On the object-side surface 171, an optical axis region 1711 may be convex and a periphery region 1712 may be concave. On the image-side surface 172, an optical axis region 1721 may be concave and a periphery region 1722 may be convex.

An example embodiment of the eighth lens element 180, which may be constructed by plastic material, may have negative refracting power. On the object-side surface 181, an optical axis region 1811 may be concave and a periphery region 1812 may be concave. On the image-side surface 182, an optical axis region 1821 may be concave and a periphery region 1822 may be convex.

In example embodiments, air gaps may exist between each pair of adjacent lens elements, as well as between the eighth lens element 180 and the filtering unit 190, and the filtering unit 190 and the image plane 193 of the image sensor. Please note, in other embodiments, any of the aforementioned air gaps may or may not exist. For example, the profiles of opposite surfaces of any two adjacent lens elements may align with each other, and in such situations, the air gap might not exist.

FIG. 8 depicts the optical characteristics of each lens elements in the optical imaging lens 1 of the present embodiment. Please also refer to FIG. 54 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 corresponding to the present embodiment.

The aspherical surfaces, including the object-side surface 111 and the image-side surface 112 of the first lens element 110', the object-side surface 121 and the image-side surface 122 of the second lens element 120', the object-side surface 131 and the image-side surface 132 of the third lens element 130', the object-side surface 141 and the image-side surface 142 of the fourth lens element 140, the object-side surface 151 and the image-side surface 152 of the fifth lens element 150, the object-side surface 161 and the image-side surface 162 of the sixth lens element 160, the object-side surface 171 and the image-side surface 172 of the seventh lens element 170 and the object-side surface 181 and the image-side surface 182 of the eighth lens element 180 may all be defined by the following aspherical formula:

$$Z(Y) = \frac{Y^2}{R} \Bigg/ \left(1 + \sqrt{1 - (1+K)\frac{Y^2}{R^2}}\right) + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and $a_i$ represents an aspherical coefficient of $i^{th}$ level. The values of each aspherical parameter are shown in FIG. 9.

Referring to FIG. 7(a), a longitudinal spherical aberration of the optical imaging lens in the present embodiment is shown in coordinates in which the horizontal axis represents focus and the vertical axis represents field of view. FIG. 7(b) shows curvature of field of the optical imaging lens in the present embodiment in the sagittal direction in coordinates in which the horizontal axis represents focus and the vertical axis represents image height. FIG. 7(c) shows the curvature of field in the tangential direction of the optical imaging lens in the present embodiment in coordinates in which the horizontal axis represents focus and the vertical axis represents image height. And FIG. 7(d) shows distortion aberration of the optical imaging lens in the present embodiment in coordinates in which the horizontal axis represents percentage and the vertical axis represents image height.

The curves of different wavelengths (470 nm, 555 nm, 650 nm) may be close to each other. This represents that off-axis light with respect to these wavelengths may be focused around an image point. From the vertical deviation of each curve shown therein, the offset of the off-axis light relative to the image point may be within about ±0.04 mm. Therefore, the present embodiment may improve the longitudinal spherical aberration with respect to different wavelengths. For curvature of field in the sagittal direction, the focus variation with respect to the three wavelengths in the whole field may fall within about ±0.03 mm, for curvature of field in the tangential direction, the focus variation with respect to the three wavelengths in the whole field may fall within about ±0.05 mm, and the variation of the distortion aberration may be within about ±3%.

According to the value of the aberrations, it is shown that the optical imaging lens 1 of the present embodiment, with the length as short as about 5.661 mm, HFOV as great as about 36.607 degrees and the Fno as small as about 1.6, may provide good imaging quality as well as good optical characteristics.

Figure 10:
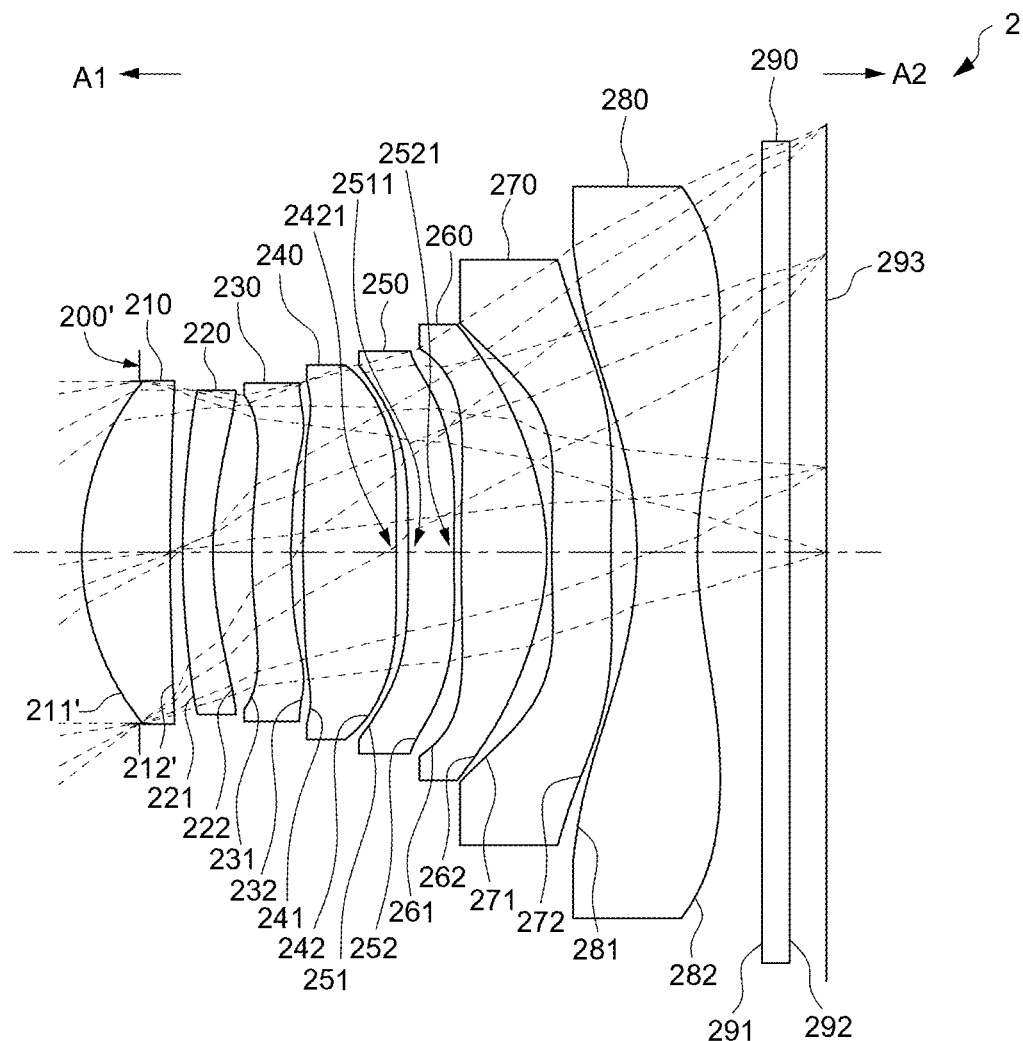
FIG. 10 depicts a cross-sectional view of a second embodiment of an optical imaging lens having eight lens elements according to the present disclosure.
Figure 11:
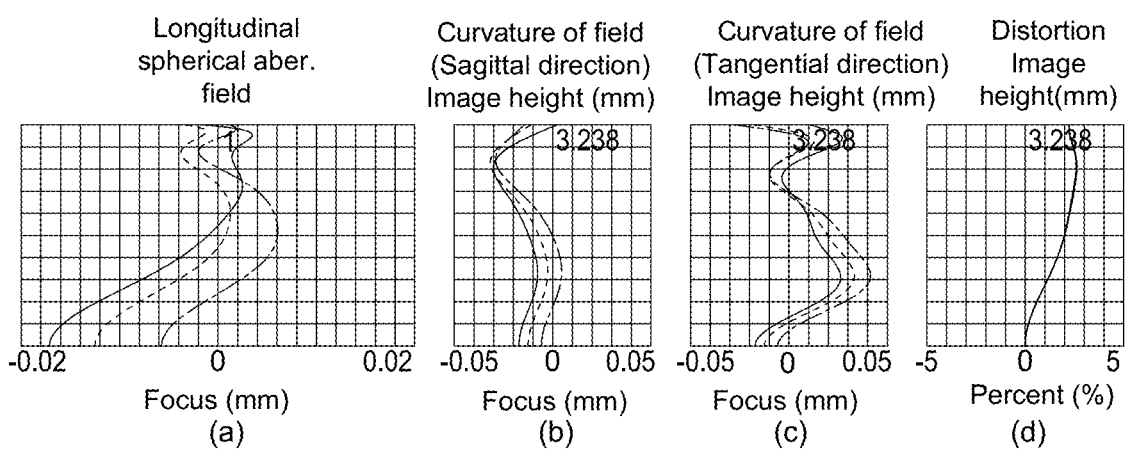
FIG. 11 depicts a chart of a longitudinal spherical aberration and other kinds of optical aberrations of a second embodiment of an optical imaging lens according to the present disclosure.

Reference is now made to FIGS. 10-13, FIG. 10 illustrates an example cross-sectional view of an optical imaging lens 2 having eight lens elements of the optical imaging lens according to a second example embodiment. FIG. 11 shows example charts of a longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise an aperture stop 200', a first lens element 210, a second lens element 220, a third lens element 230, a fourth lens element 240, a fifth lens element 250, a sixth lens element 260, a seventh lens element 270 and an eighth lens element 280.

The differences between the second embodiment and the first embodiment may include the radius of curvature, the thickness of each lens element, the value of each air gap, aspherical data, related optical parameters such as back focal length, and the configuration of the concave/convex shape of the object-side surface 251 and the image-side surfaces 242, 252. But the configuration of the concave/convex shape of surfaces comprising the object-side surfaces 211', 221, 231, 241, 261, 271, 281 facing the object side A1 and the image-side surfaces 212', 222, 232, 262, 272, 282 facing the image side A2, and positive or negative configuration of the refracting power of each lens element may be similar to those in the first embodiment. Here and in the embodiments hereinafter, to clearly show the drawings of the present embodiment, only the surface shapes of the optical axis region or the periphery region which are different from that in the first embodiment may be labeled. Specifically, the differences of configuration of surface shape may include: on the image-side surface 242 of the fourth lens element 240, an optical axis region 2421 may be concave, on the object-side surface 251 of the fifth lens element 250, an optical axis region 2511 may be convex, and on the image-side surface 252 of the fifth lens element 250, an optical axis region 2521 may be concave. Please refer to FIG. 12 for the optical characteristics of each lens elements in the optical imaging lens 2 of the present embodiment, and please refer to FIG. 54 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 11($a$), the offset of the off-axis light relative to the image point may be within about ±0.02 mm. As the curvature of field in the sagittal direction shown in FIG. 11($b$), the focus variation with regard to the three wavelengths in the whole field may fall within about ±0.04 mm. As the curvature of field in the tangential direction shown in FIG. 11($c$), the focus variation with regard to the three wavelengths in the whole field may fall within about ±0.05 mm. As shown in FIG. 11($d$), the variation of the distortion aberration may be within about ±3%. Compared with the first embodiment, the longitudinal spherical aberration of the optical imaging lens 2 may be less.

According to the value of the aberrations, it is shown that the optical imaging lens 2 of the present embodiment, with the length as short as about 5.631, the HFOV as large as about 37.287 degrees and the Fno as small as about 1.6, may provide good imaging quality. Compared with the optical imaging lens 1 of the first embodiment, the length of the optical imaging lens 2 of the present embodiment is shorter.

Figure 14:
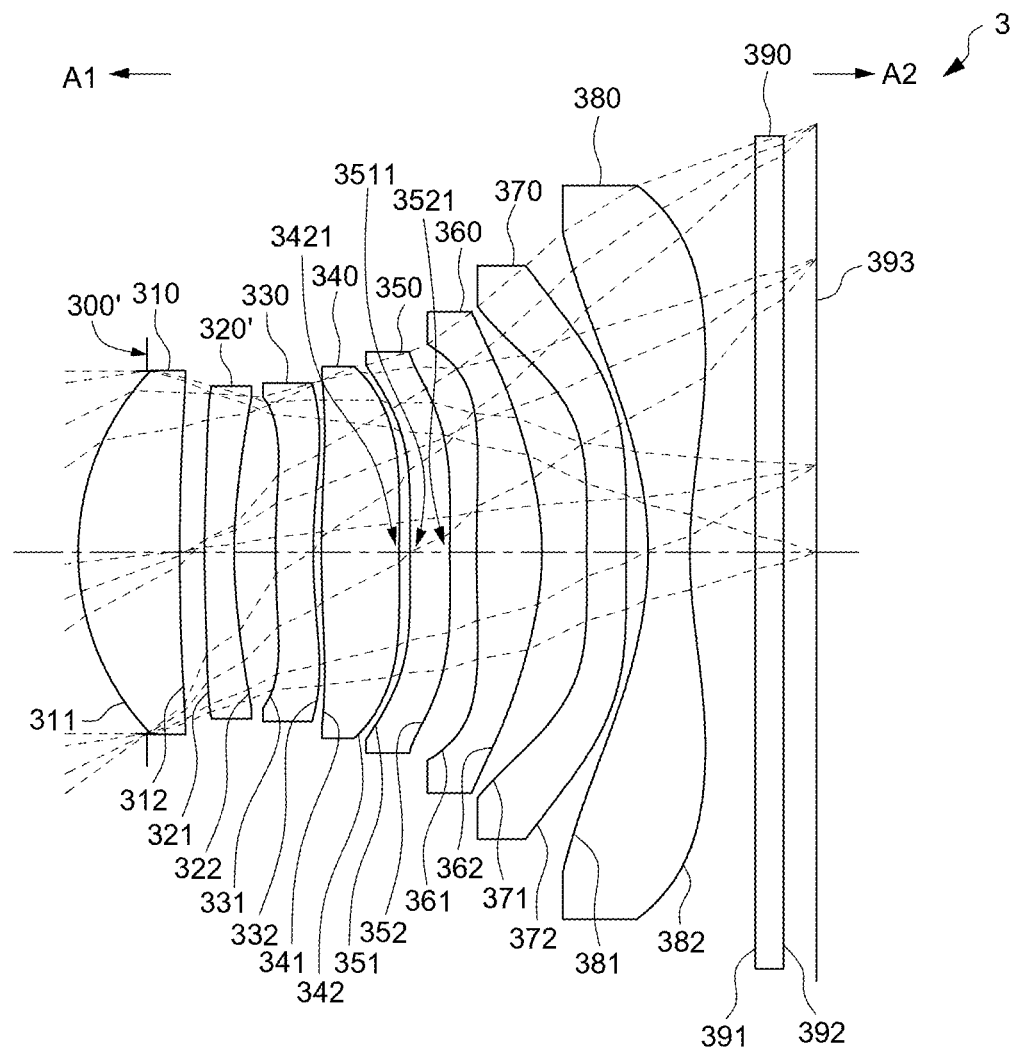
FIG. 14 depicts a cross-sectional view of a third embodiment of an optical imaging lens having eight lens elements according to the present disclosure.
Figure 15:
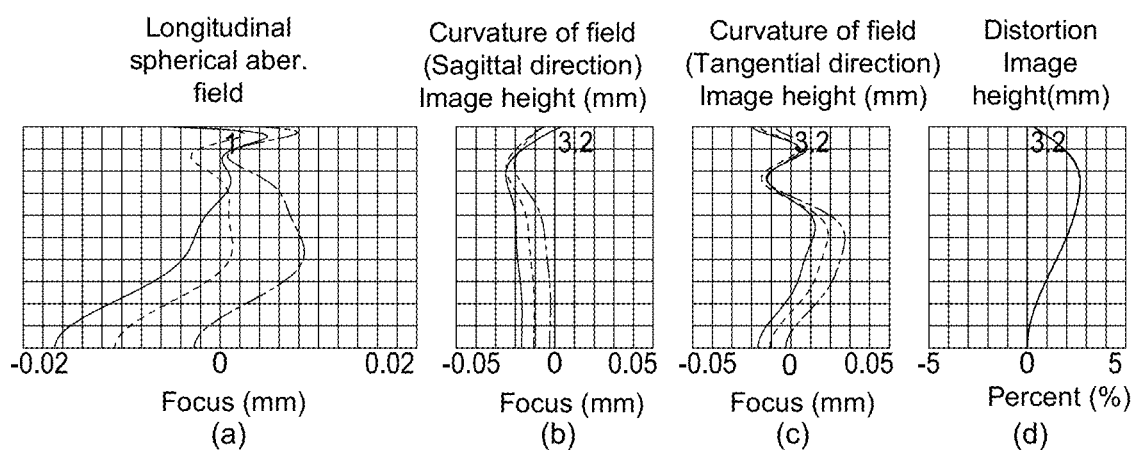
FIG. 15 depicts a chart of a longitudinal spherical aberration and other kinds of optical aberrations of a third embodiment of an optical imaging lens according to the present disclosure.

Reference is now made to FIGS. 14-17. FIG. 14 illustrates an example cross-sectional view of an optical imaging lens 3 having eight lens elements of the optical imaging lens according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise an aperture stop 300', a first lens element 310, a second lens element 320', a third lens element 330, a fourth lens element 340, a fifth lens element 350, a sixth lens element 360, a seventh lens element 370 and an eighth lens element 380.

The differences between the third embodiment and the first embodiment may include the radius of curvature and the thickness of each lens element, the value of each air gap, aspherical data, related optical parameters such as back focal length, and the configuration of the concave/convex shape of the object-side surface 351 and the image-side surfaces 342, 352. But the configuration of the concave/convex shape of surfaces, comprising the object-side surfaces 311, 321, 331, 341, 361, 371, 381 facing the object side A1 and the image-side surfaces 312, 322, 332, 362, 372, 382 facing the image side A2, and positive or negative configuration of the refracting power of each lens element may be similar to those in the first embodiment. Specifically, the differences of configuration of surface shape may include: on the image-side surface 342 of the fourth lens element 340, an optical axis region 3421 may be concave, on the object-side surface 351 of the fifth lens element 350, an optical axis region 3511 may be convex, and on the image-side surface 352 of the fifth lens element 350, an optical axis region 3521 may be concave. Please refer to FIG. 16 for the optical characteristics of each lens elements in the optical imaging lens 3 of the present embodiment, and please refer to FIG. 54 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 15(a), the offset of the off-axis light relative to the image point may be within about ±0.02 mm. As the curvature of field in the sagittal direction shown in FIG. 15(b), the focus variation with regard to the three wavelengths in the whole field may fall within about ±0.03 mm. As the curvature of field in the tangential direction shown in FIG. 15(c), the focus variation with regard to the three wavelengths in the whole field may fall within about ±0.03 mm. As shown in FIG. 15(d), the variation of the distortion aberration may be within about ±3%. Compared with the optical imaging lens 1 of the first embodiment, the longitudinal spherical aberration and curvature of field in the tangential direction of the optical imaging lens 3 of the present embodiment are less.

According to the value of the aberrations, it is shown that the optical imaging lens 3 of the present embodiment, with the length as short as about 5.513 mm, the HFOV as large as about 36.219 degrees and the Fno as small as about 1.6, may provide good imaging quality. Compared with the optical imaging lens 1 of the first embodiment, the length of the optical imaging lens 3 of the present embodiment may be shorter.

Figure 18:
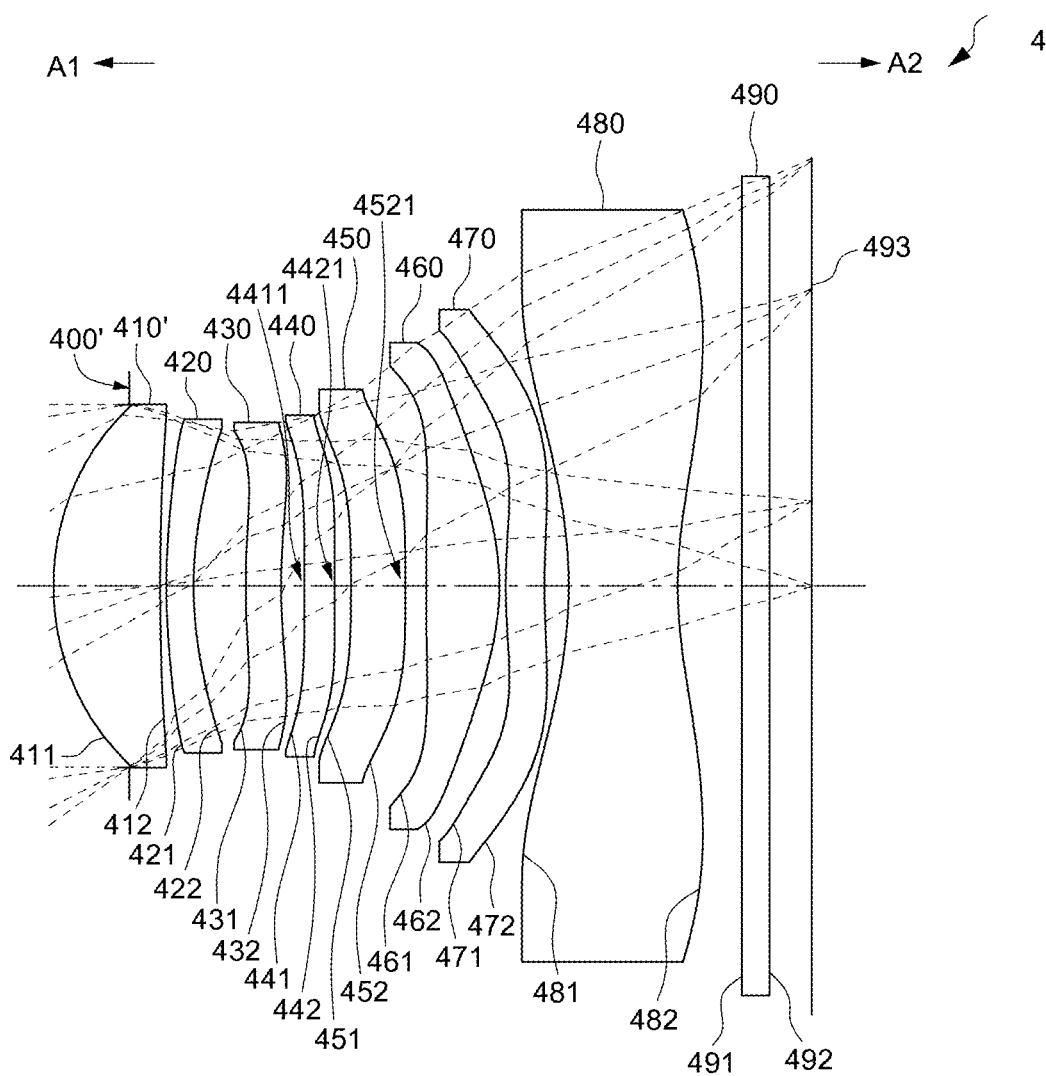
FIG. 18 depicts a cross-sectional view of a fourth embodiment of an optical imaging lens having eight lens elements according to the present disclosure.
Figure 19:
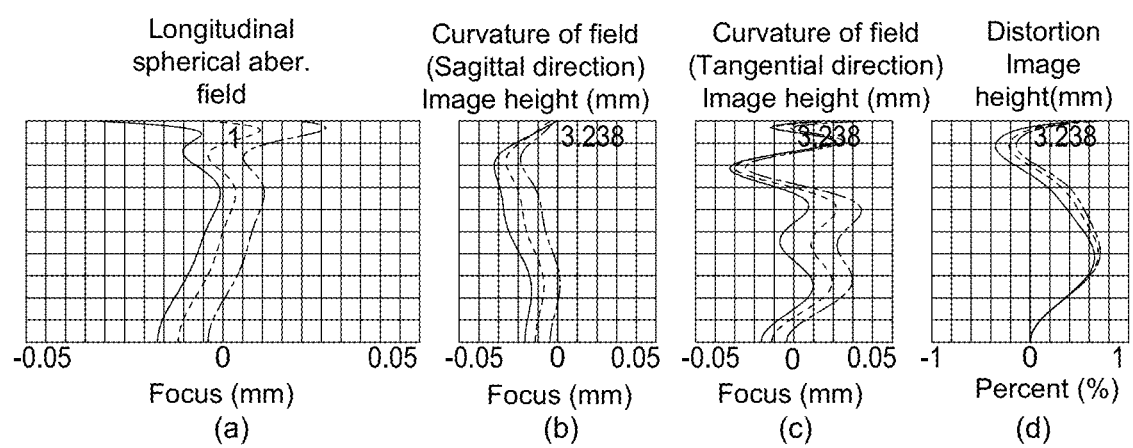
FIG. 19 depicts a chart of a longitudinal spherical aberration and other kinds of optical aberrations of a fourth embodiment of an optical imaging lens according the present disclosure.

Reference is now made to FIGS. 18-21. FIG. 18 illustrates an example cross-sectional view of an optical imaging lens 4 having eight lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise an aperture stop 400', a first lens element 410', a second lens element 420, a third lens element 430, a fourth lens element 440, a fifth lens element 450, a sixth lens element 460, a seventh lens element 470 and an eighth lens element 480.

The differences between the fourth embodiment and the first embodiment may include the radius of curvature and the thickness of each lens element, the value of each air gap, aspherical data, related optical parameters, such as back focal length, and the configuration of the concave/convex shape of the object-side surface 441 and the image-side surfaces 442, 452. But the configuration of the concave/convex shape of surfaces, comprising the object-side surfaces 411, 431, 441, 451, 461, 471 facing the object side A1 and the image-side surfaces 422, 432, 452, 462, 472 facing the image side A2, and positive or negative configuration of the refracting power of the first, second, third, fifth, sixth, seventh and eighth lens elements 410', 420, 430, 450, 460, 470, 480 may be similar to those in the first embodiment. The fourth lens element 440 may have negative refracting power. Specifically, the differences of configuration of surface shape may include: on the object-side surface 441 of the fourth lens element 440, an optical axis region 4411 may be concave, on the image-side surface 442 of the fourth lens element 440, an optical axis region 4421 may be concave, and on the image-side surface 452 of the fifth lens element 450, an optical axis region 4521 may be concave. Please refer to FIG. 20 for the optical characteristics of each lens elements in the optical imaging lens 4 of the present embodiment, please refer to FIG. 54 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 19(a), the offset of the off-axis light relative to the image point may be within about ±0.04 mm. As the curvature of field in the sagittal direction shown in FIG. 19(b), the focus variation with regard to the three wavelengths in the whole field may fall within about ±0.04 mm. As the curvature of field in the tangential direction shown in FIG. 19(c), the focus variation with regard to the three wavelengths in the whole field may fall within about ±0.04 mm. As shown in FIG. 19(d), the variation of the distortion aberration may be within about ±0.8%. Compared with the first embodiment, the curvature of field in the tangential direction and distortion aberration of the optical imaging lens 4 may be less.

According to the value of the aberrations, it may be shown that the optical imaging lens 4 of the present embodiment, with the length as short as about 5.768 mm, the HFOV as large as about 35.989 degrees and the Fno as small as about 1.6, may provide good imaging quality. Compared with the optical imaging lens 1 of the first embodiment, the optical imaging lens 4 of the present embodiment may be easier to make and may provide better yield.

Figure 22:
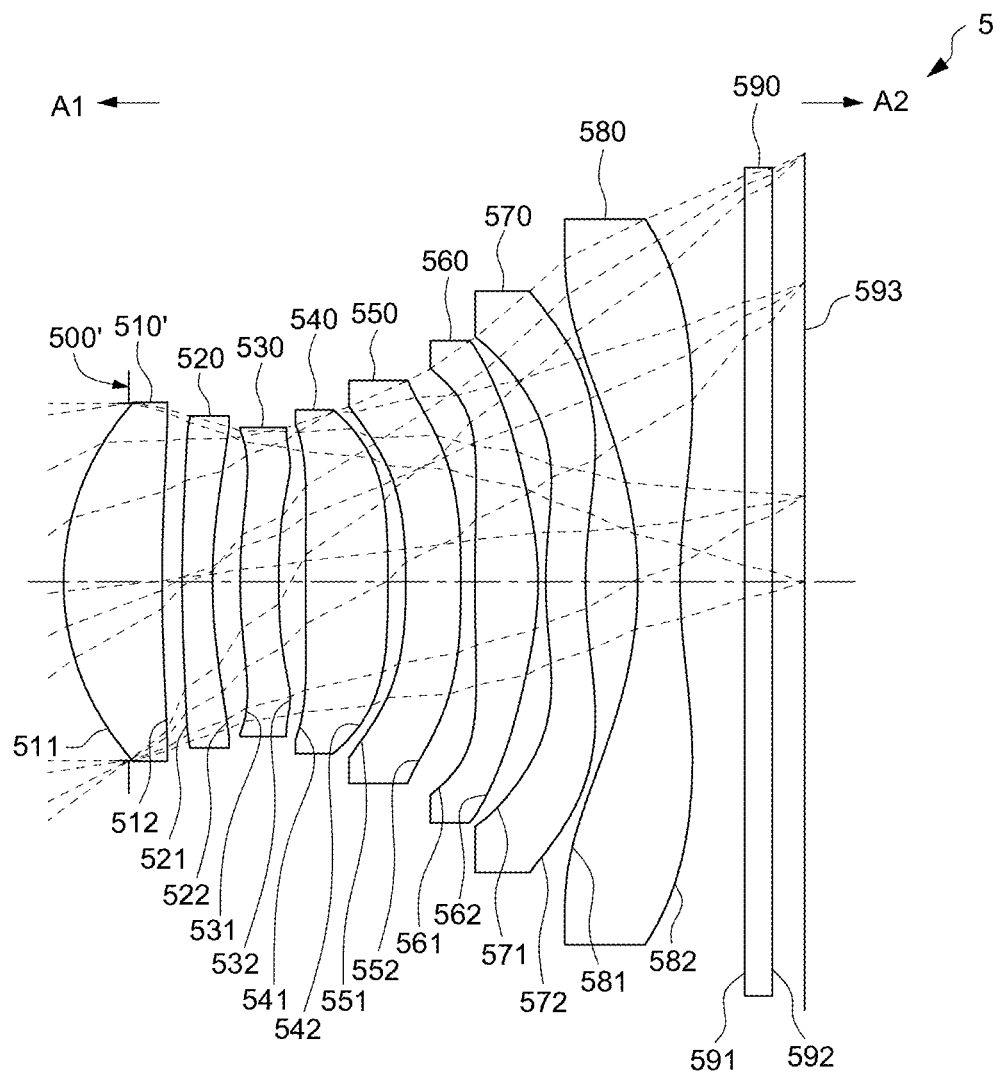
FIG. 22 depicts a cross-sectional view of a fifth embodiment of an optical imaging lens having eight lens elements according to the present disclosure.
Figure 23:
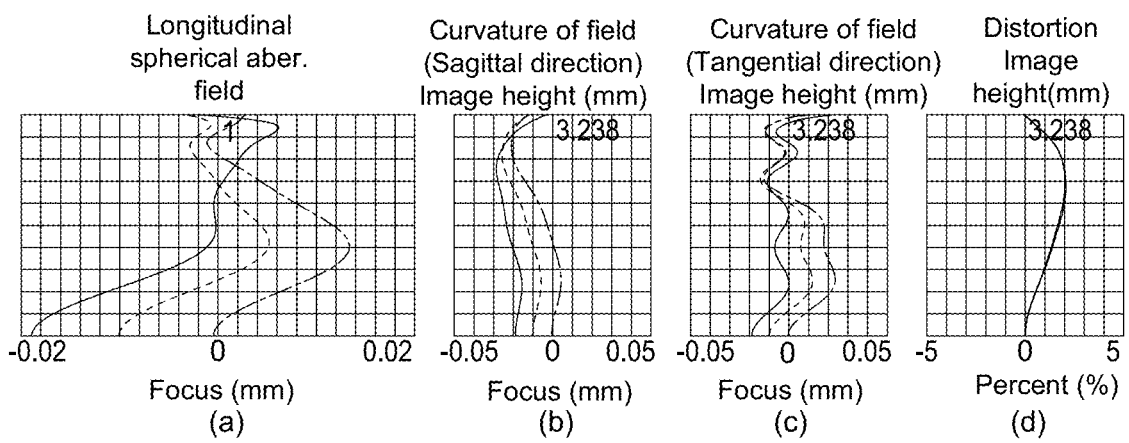
FIG. 23 depicts a chart of a longitudinal spherical aberration and other kinds of optical aberrations of a fifth embodiment of an optical imaging lens according to the present disclosure.

Reference is now made to FIGS. 22-25. FIG. 22 illustrates an example cross-sectional view of an optical imaging lens 5 having eight lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise an aperture stop 500', a first lens element 510', a second lens element 520, a third lens element 530, a fourth lens element 540, a fifth lens element 550, a sixth lens element 560, a seventh lens element 570 and an eighth lens element 580.

The differences between the fifth embodiment and the first embodiment may include the radius of curvature and the thickness of each lens element, the value of each air gap, aspherical data and related optical parameters, such as back focal length But the configuration of the concave/convex shape of surfaces, comprising the object-side surfaces 511, 521, 531, 541, 551, 561, 571, 581 facing the object side A1 and the image-side surfaces 512, 522, 532, 542, 552, 562, 572, 582 facing the image side A2, and positive or negative configuration of the refracting power of the first, second, fourth, fifth, sixth and eighth lens elements 510, 520, 540, 550, 560, 580 may be similar to those in the first embodiment. The third lens element 530 may have positive refracting power and the seventh lens element 570 may have negative refracting power. Please refer to FIG. 24 for the optical characteristics of each lens elements in the optical imaging lens 5 of the present embodiment, please refer to FIG. 54 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 23(a), the offset of the off-axis light relative to the image point may be within about ±0.02 mm. As the curvature of field in the sagittal direction shown in FIG. 23(b), the focus variation with regard to the three wavelengths in the whole field may fall within about ±0.03 mm. As the curvature of field in the tangential direction shown in FIG. 23(c), the focus variation with regard to the three wavelengths in the whole field may fall within about ±0.03 mm. As shown in FIG. 23(d), the variation of the distortion aberration may be within about ±3%. Compared with the first embodiment, the longitudinal spherical aberration and curvature of field in the tangential direction of the optical imaging lens 5 are less.

According to the value of the aberrations, it is shown that the optical imaging lens 5 of the present embodiment, with the length as short as about 5.601 mm, the HFOV as large as about 36.719 degrees and the Fno as small as about 1.6, may provide good imaging quality. Compared with the optical imaging lens 1 of the first embodiment, the length of the optical imaging lens 5 of the present embodiment may be shorter and the HFOV may be larger.

Figure 26:
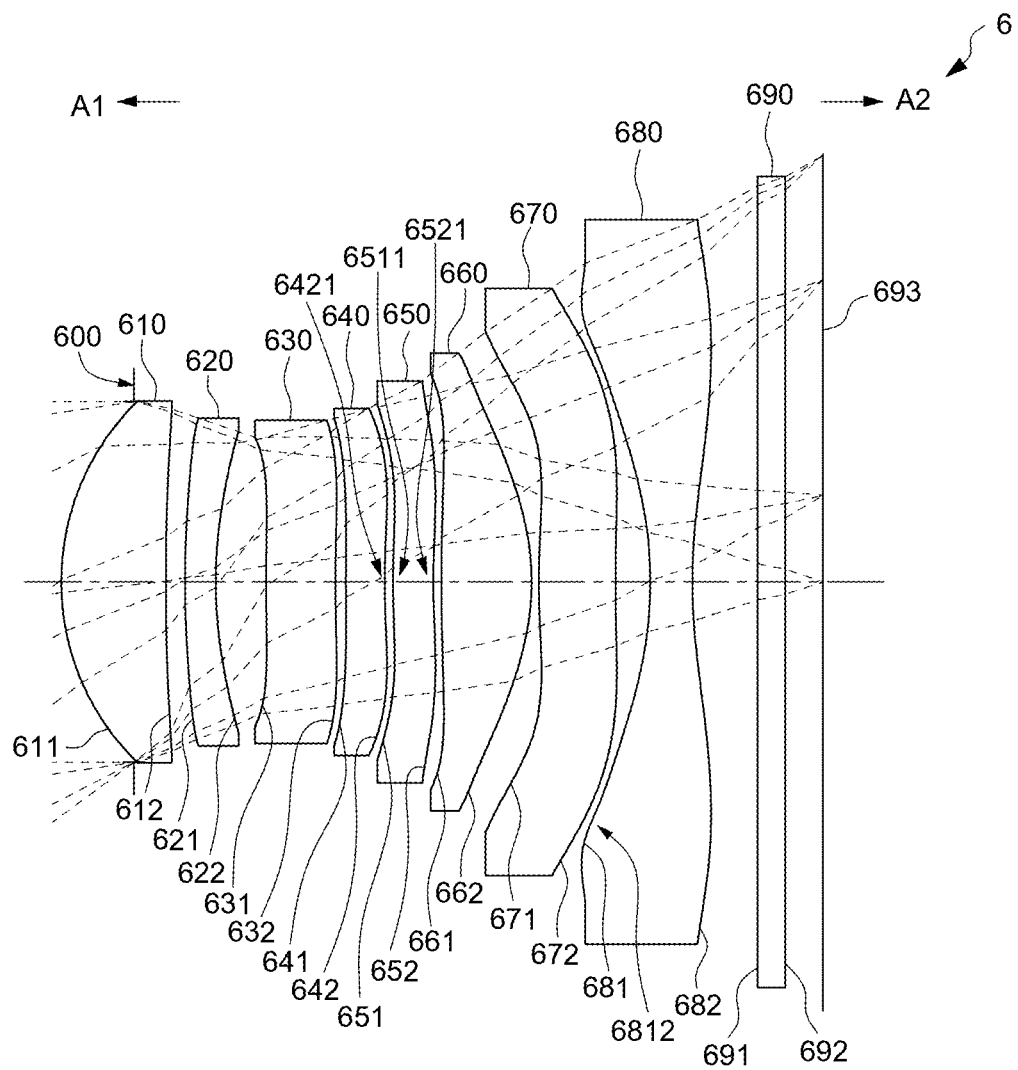
FIG. 26 depicts a cross-sectional view of a sixth embodiment of an optical imaging lens having eight lens elements according to the present disclosure.
Figure 27:
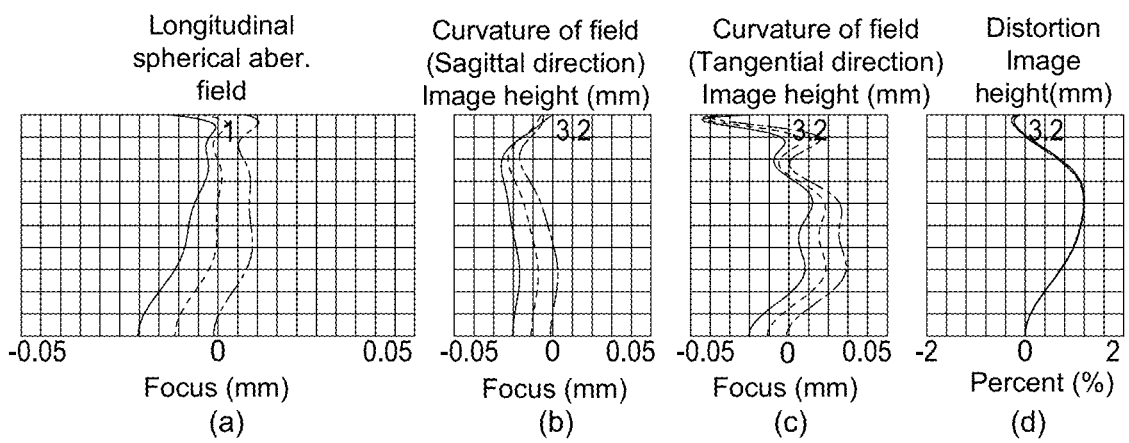
FIG. 27 depicts a chart of a longitudinal spherical aberration and other kinds of optical aberrations of a sixth embodiment of an optical imaging lens according to the present disclosure.

Reference is now made to FIGS. 26-29. FIG. 26 illustrates an example cross-sectional view of an optical imaging lens 6 having eight lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650, a sixth lens element 660, a seventh lens element 670 and an eighth lens element 680.

The differences between the sixth embodiment and the first embodiment may include the radius of curvature and the thickness of each lens element, the value of each air gap, aspherical data, related optical parameters, such as back focal length, and the configuration of the concave/convex shape of the object-side surfaces 651, 681 and the image-side surfaces 642, 652 But the configuration of the concave/convex shape of surfaces, comprising the object-side surfaces 611, 621, 631, 641, 661, 671 facing the object side A1 and the image-side surfaces 612, 622, 632, 662, 672, 682 facing the image side A2, and positive or negative configuration of the refracting power of the first, second, third, fifth, sixth, seventh and eighth lens elements 610, 620, 630, 650, 660, 670, 680 are similar to those in the first embodiment. The fourth lens element 640 may have negative refracting power. Specifically, the difference of configuration of surface shape may include: on the image-side surface 642 of the fourth lens element 640, an optical axis region 6421 may be concave, on the object-side surface 651 of the fifth lens element 650, an optical axis region 6511 may be convex, on the image-side surface 652 of the fifth lens element 650, an optical axis region 6521 may be concave, and on the object-side surface 681 of the eighth lens element 680, a periphery region 6812 may be convex. Please refer to FIG. 28 for the optical characteristics of each lens elements in the optical imaging lens 6 of the present embodiment, please refer to FIG. 54 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 27(a), the offset of the off-axis light relative to the image point may be within about ±0.03 mm. As the curvature of field in the sagittal direction shown in FIG. 27(b), the focus variation with regard to the three wavelengths in the whole field may fall within about ±0.03 mm. As the curvature of field in the tangential direction shown in FIG. 27(c), the focus variation with regard to the three wavelengths in the whole field may fall within about ±0.05 mm. As shown in FIG. 27(d), the variation of the distortion aberration may be within about ±1.2%. Compared with the first embodiment, the longitudinal spherical aberration and distortion aberration shown in the present embodiment are less.

According to the value of the aberrations, it is shown that the optical imaging lens 6 of the present embodiment, with the length as short as about 5.706 mm, the HFOV as large as about 36.443 degrees and the Fno as small as about 1.6, may provide better imaging quality. Compared with the optical imaging lens 1 of the first embodiment, the optical imaging lens 6 of the present embodiment may be easier to make and may provide better yield.

Figure 30:
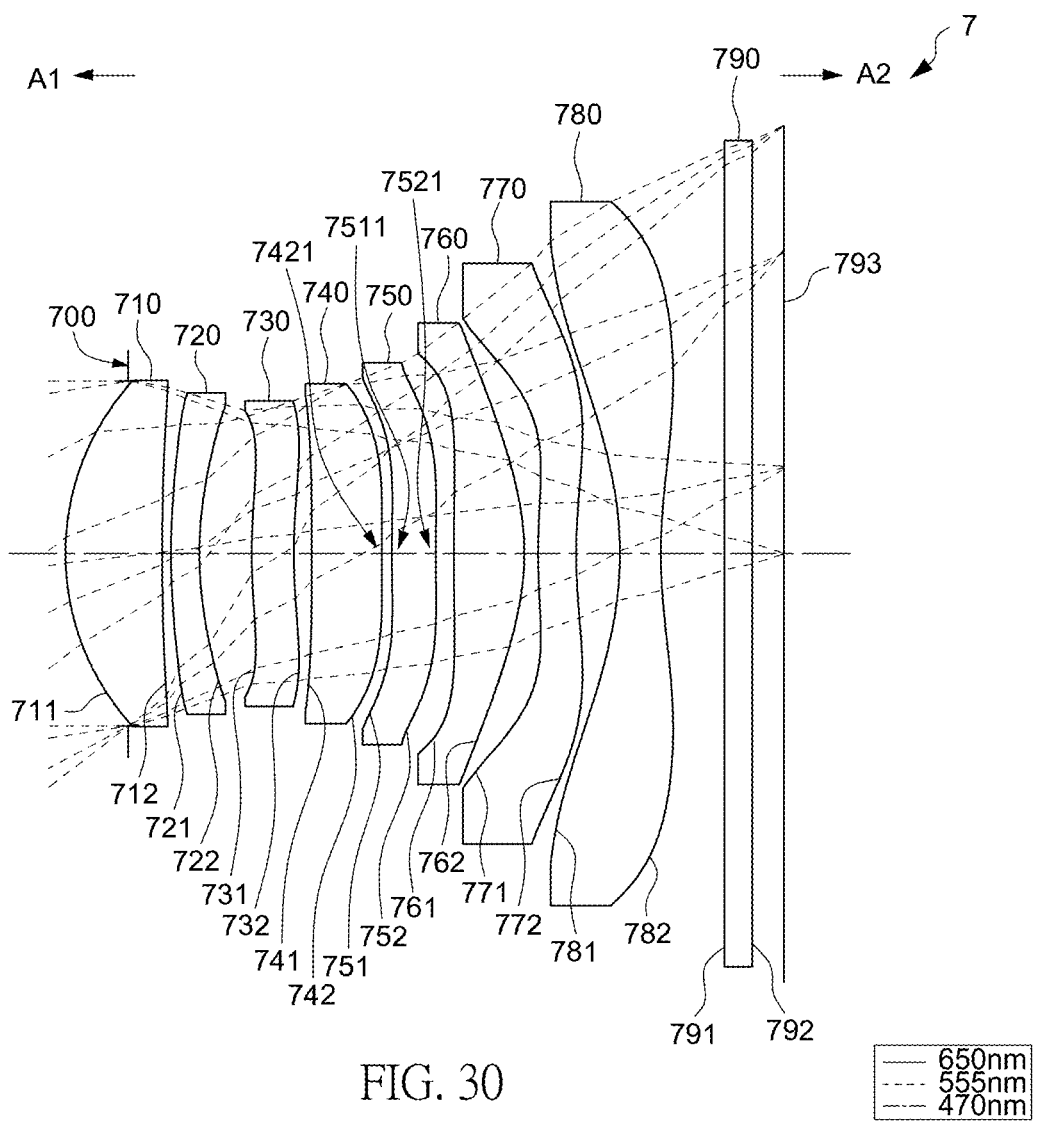
FIG. 30 depicts a cross-sectional view of a seventh embodiment of an optical imaging lens having eight lens elements according to the present disclosure.
Figure 31:
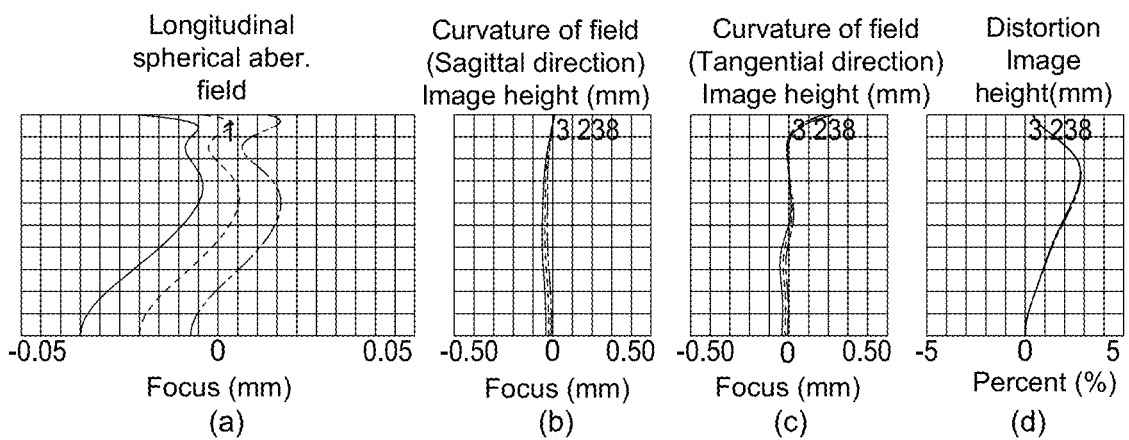
FIG. 31 depicts a chart of a longitudinal spherical aberration and other kinds of optical aberrations of a seventh embodiment of an optical imaging lens according to the present disclosure.

Reference is now made to FIGS. 30-33. FIG. 30 illustrates an example cross-sectional view of an optical imaging lens 7 having eight lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, a fourth lens element 740, a fifth lens element 750, a sixth lens element 760, a seventh lens element 770 and an eighth lens element 780.

The differences between the seventh embodiment and the first embodiment may include the radius of curvature and the thickness of each lens element, the value of each air gap, aspherical data, related optical parameters, such as back focal length, and the configuration of the concave/convex shape of the object-side surface 751 and the image-side surfaces 742, 752. But the configuration of the concave/convex shape of surfaces, comprising the object-side surfaces 711, 731, 741, 751, 761, 771 facing the object side A1 and the image-side surfaces 722, 732, 742, 752, 762, 772 facing the image side A2, and positive or negative configuration of the refracting power of the first, second, sixth and eighth lens elements 710, 720, 760, 780 are similar to those in the first embodiment. The third lens element 730 may have positive refracting power, the fourth lens element 740 may have negative refracting power, the fifth lens element 750 may have positive refracting power and the seventh lens element 770 may have negative refracting power. Specifically, the difference of configuration of surface shape may include: on the image-side surface 742 of the fourth lens element 740, an optical axis region 7421 may be concave, on the object-side surface 451 of the fifth lens element 450, an optical axis region 4511 may be convex, and on the image-side surface 452 of the fifth lens element 450, an optical axis region 4521 may be concave. Please refer to FIG. 32 for the optical characteristics of each lens elements in the optical imaging lens 7 of the present embodiment, please refer to FIGURE for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 31(a), the offset of the off-axis light relative to the image point may be within about ±0.04 mm. As the curvature of field in the sagittal direction shown in FIG. 31(b), the focus variation with regard to the three wavelengths in the whole field may fall within about ±0.1 mm. As the curvature of field in the tangential direction shown in FIG. 31(c), the focus variation with regard to the three wavelengths in the whole field may fall within about ±0.3 mm. As shown in FIG. 31(d), the variation of the distortion aberration may be within about ±3%. Compared with the first embodiment, the longitudinal spherical aberration shown in the present embodiment may be less.

According to the value of the aberrations, it is shown that the optical imaging lens 7 of the present embodiment, with the length as short as about 5.488 mm, the HFOV as large as about 37.167 degrees and the Fno as small as about 1.6, may provide good imaging quality. Compared with the optical imaging lens 1 of the first embodiment, the length of the optical imaging lens 7 of the present embodiment may be shorter and the HFOV may be larger.

Figure 34:
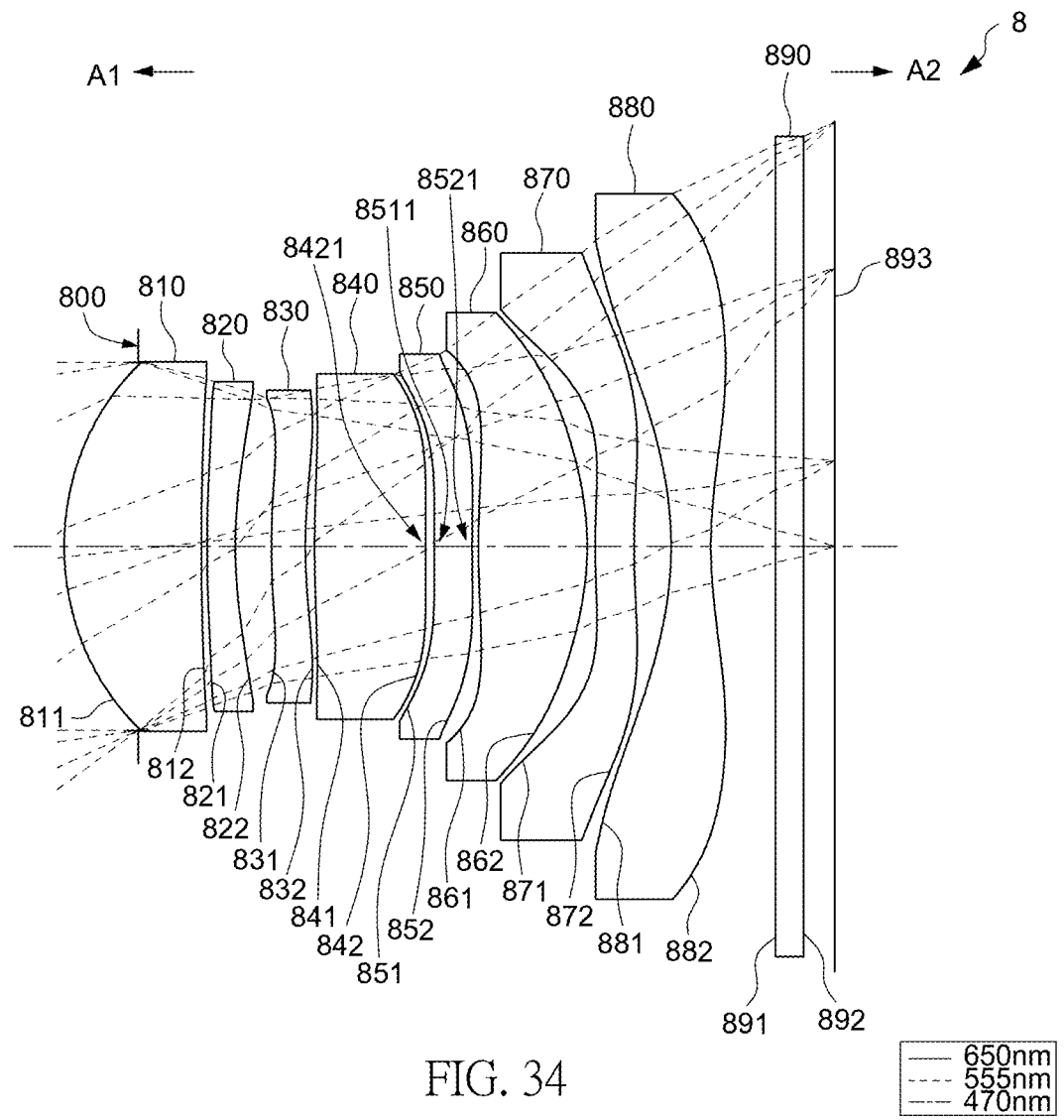
FIG. 34 depicts a cross-sectional view of an eighth embodiment of an optical imaging lens having eight lens elements according to the present disclosure.
Figure 35:
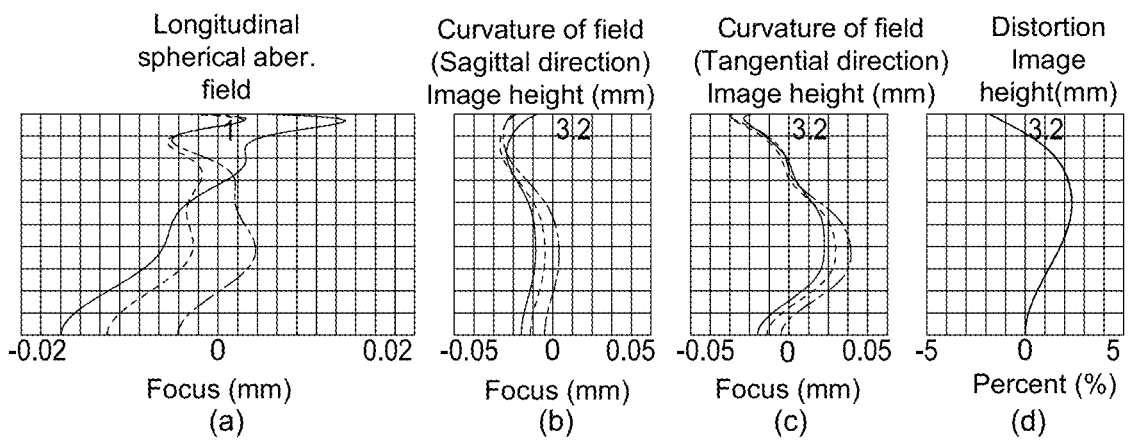
FIG. 35 depicts a chart of a longitudinal spherical aberration and other kinds of optical aberrations of an eighth embodiment of an optical imaging lens according to the present disclosure.

Reference is now made to FIGS. 34-37. FIG. 34 illustrates an example cross-sectional view of an optical imaging lens 8 having eight lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850, a sixth lens element 860, a seventh lens element 870 and an eighth lens element 880.

The differences between the eighth embodiment and the first embodiment may include the radius of curvature and the thickness of each lens element, the value of each air gap, aspherical data, related optical parameters, such as back focal length, and the configuration of the concave/convex shape of the object-side surface 851 and the image-side surfaces 842, 852 But the configuration of the concave/convex shape of surfaces, comprising the object-side surfaces 811, 821, 831, 841, 861, 871, 881 facing the object side A1 and the image-side surfaces 812, 822, 832, 862, 872, 882 facing the image side A2, and positive or negative configuration of the refracting power of each lens element are similar to those in the first embodiment. Specifically, the differences of configuration of surface shape may include: on the image-side surface 842 of the fourth lens element 840, an optical axis region 8421 may be concave, on the object-side surface 851 of the fifth lens element 850, an optical axis region 8511 may be convex, and on the image-side surface 852 of the fifth lens element 850, an optical axis region 8521 may be concave. Please refer to FIG. 36 for the optical characteristics of each lens elements in the optical imaging lens 8 of the present embodiment, please refer to FIG. 55 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 35(a), the offset of the off-axis light relative to the image point may be within about ±0.02 mm. As the curvature of field in the sagittal direction shown in FIG. 35(b), the focus variation with regard to the three wavelengths in the whole field may fall within about ±0.03 mm. As the curvature of field in the tangential direction shown in FIG. 35(c), the focus variation with regard to the three wavelengths in the whole field may fall within about ±0.04 mm. As shown in FIG. 35(d), the variation of the distortion aberration may be within about ±3%. Compared with the first embodiment, the longitudinal spherical aberration and curvature of field in the tangential direction shown in the present embodiment are less.

According to the value of the aberrations, it is shown that the optical imaging lens 8 of the present embodiment, with the length as short as about 5.800 mm, the HFOV as large as about 36.188 degrees and the Fno as small as about 1.6, may provide better imaging quality. Compared with the optical imaging lens 1 of the first embodiment, the optical imaging lens 8 of the present embodiment may be easier to make and may provide better yield.

Figure 38:
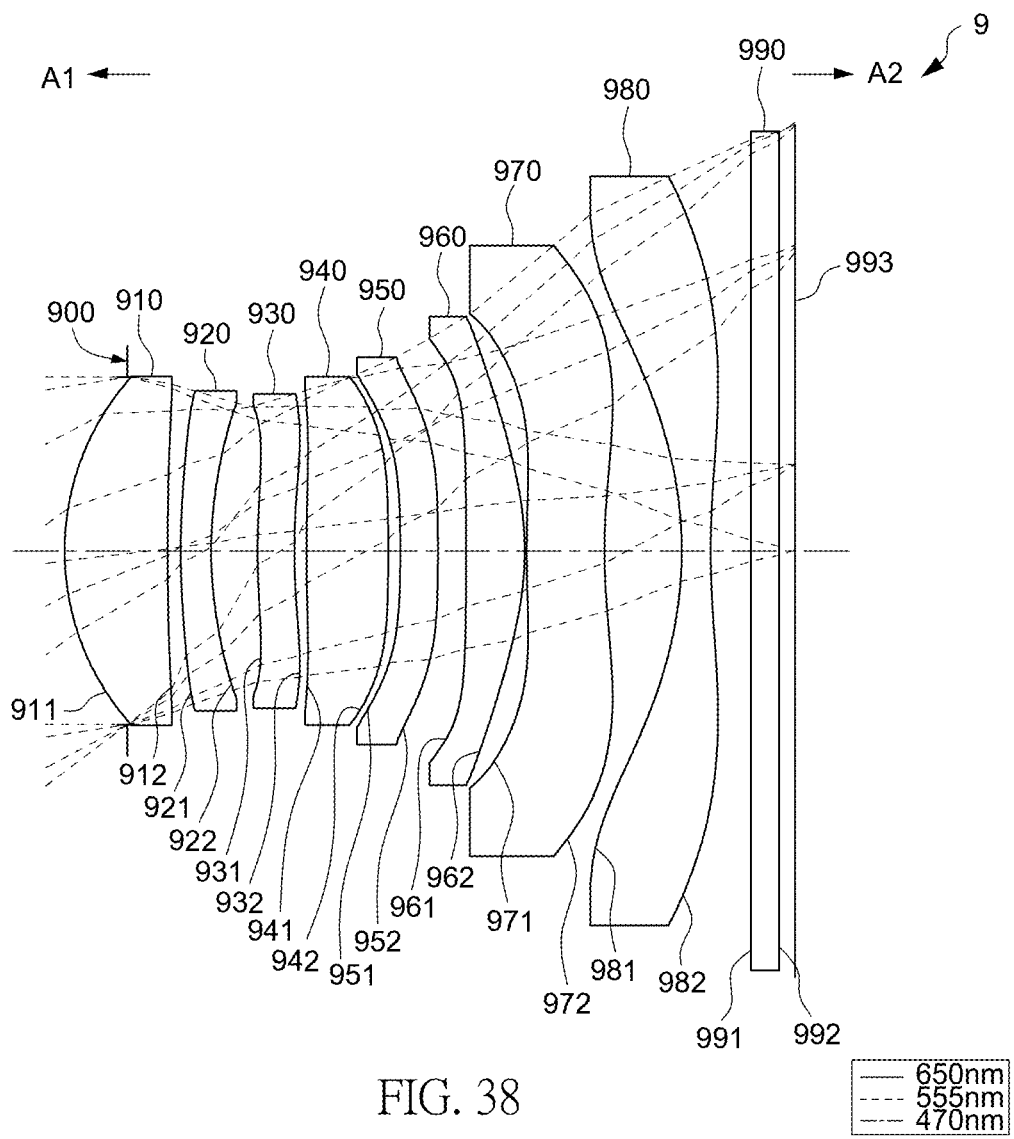
FIG. 38 depicts a cross-sectional view of a ninth embodiment of an optical imaging lens having eight lens elements according to the present disclosure.
Figure 39:
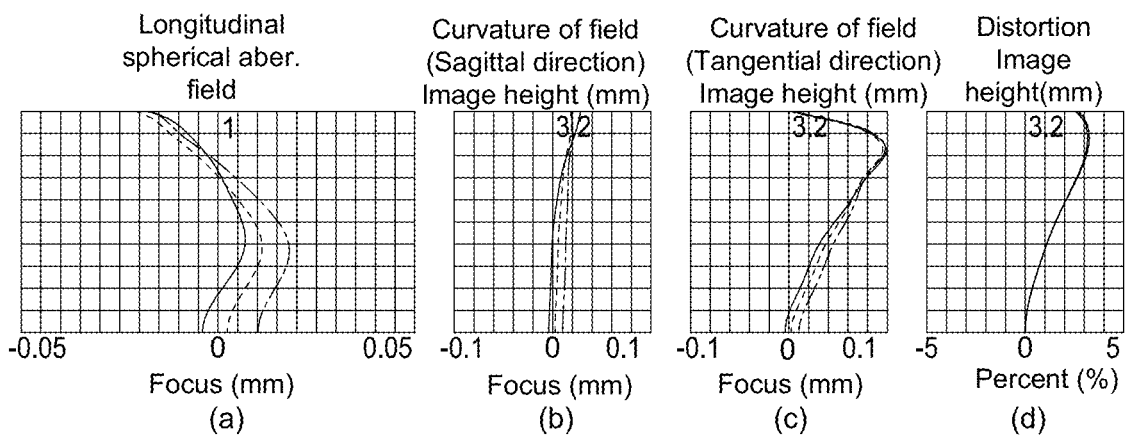
FIG. 39 depicts a chart of a longitudinal spherical aberration and other kinds of optical aberrations of a ninth embodiment of an optical imaging lens according to the present disclosure.

Reference is now made to FIGS. 38-41. FIG. 38 illustrates an example cross-sectional view of an optical imaging lens 9 having eight lens elements of the optical imaging lens according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise an aperture stop 900, a first lens element 910, a second lens element 920, a third lens element 930, a fourth lens element 940, a fifth lens element 950, a sixth lens element 960, a seventh lens element 970 and an eighth lens element 980.

The differences between the ninth embodiment and the first embodiment may include the radius of curvature and the thickness of each lens element, the value of each air gap, aspherical data and related optical parameters, such as back focal length. But the configuration of the concave/convex shape of surfaces, comprising the object-side surfaces 911, 921, 931, 941, 951, 961, 971, 981 facing the object side A1 and the image-side surfaces 912, 922, 932, 942, 952, 962, 972, 982 facing the image side A2, and positive or negative configuration of the refracting power of the first, second, third, fourth, fifth, sixth and eighth lens elements 910, 920, 930, 940, 950, 960, 980 may be similar to those in the first embodiment. The seventh lens element 970 may have negative refracting power. Please refer to FIG. 40 for the optical characteristics of each lens elements in the optical imaging lens 9 of the present embodiment, please refer to FIG. 55 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 39(a), the offset of the off-axis light relative to the image point may be within about ±0.02 mm. As the curvature of field in the sagittal direction shown in FIG. 39(b), the focus variation with regard to the three wavelengths in the whole field may fall within about ±0.02 mm. As the curvature of field in the tangential direction shown in FIG. 39(c), the focus variation with regard to the three wavelengths in the whole field may fall within about ±0.1 mm. As shown in FIG. 39(d), the variation of the distortion aberration may be within about ±4%. Compared with the first embodiment, the longitudinal spherical aberration and curvature of field in the sagittal direction shown in the present embodiment are less.

According to the value of the aberrations, it is shown that the optical imaging lens 9 of the present embodiment, with the length as short as about 5.453 mm, the HFOV as large as about 36.939 degrees and the Fno as small as about 1.6, may provide good imaging quality. Compared with the optical imaging lens 1 of the first embodiment, the length of the optical imaging lens 9 of the present embodiment may be shorter and the HFOV may be greater.

Figure 42:
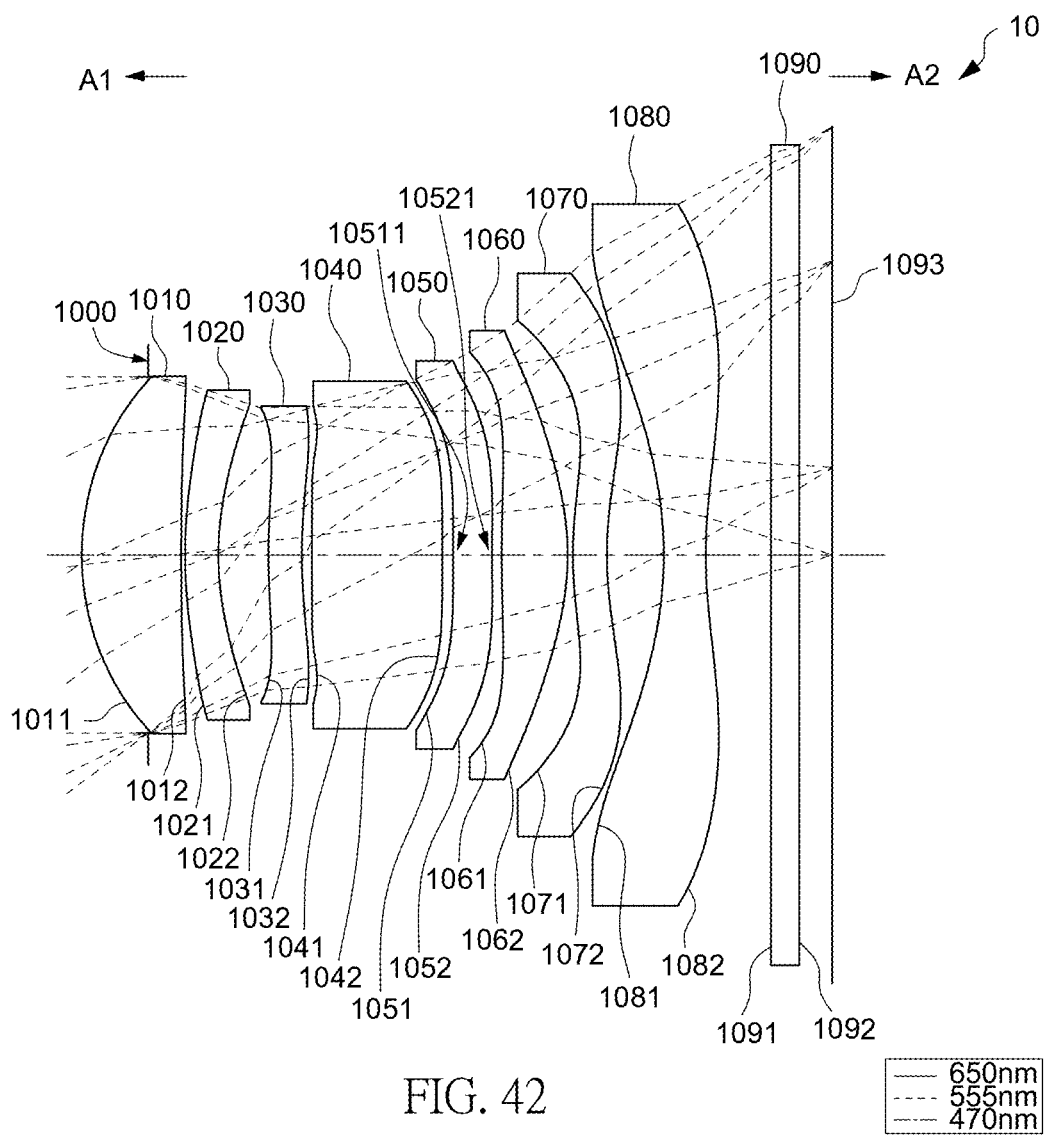
FIG. 42 depicts a cross-sectional view of a tenth embodiment of an optical imaging lens having eight lens elements according to the present disclosure.
Figure 43:
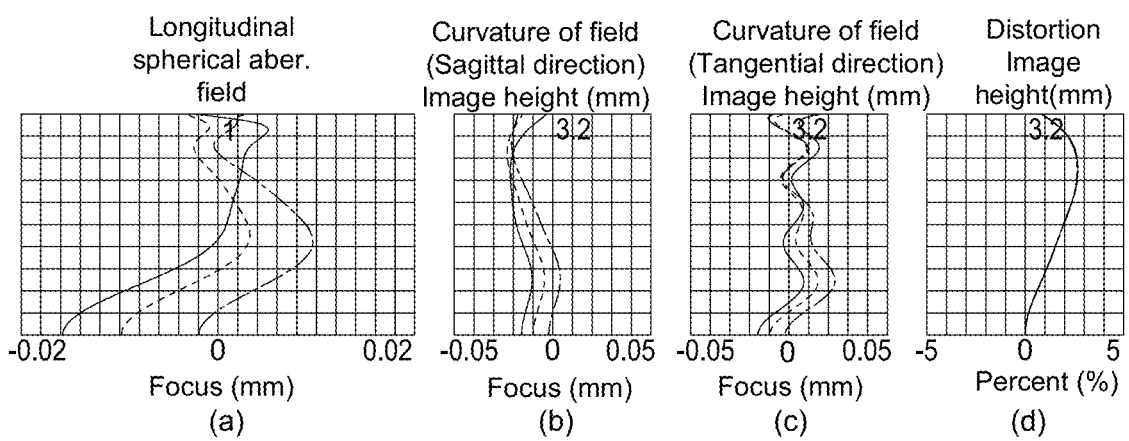
FIG. 43 depicts a chart of a longitudinal spherical aberration and other kinds of optical aberrations of a tenth embodiment of an optical imaging lens according to the present disclosure.

Reference is now made to FIGS. 42-45. FIG. 42 illustrates an example cross-sectional view of an optical imaging lens 10 having eight lens elements of the optical imaging lens according to a tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment, in an order from an object side A1 to an image side A2 along an optical axis, may comprise a first lens element 1010, an aperture stop 1000, a second lens element 1020, a third lens element 1030, a fourth lens element 1040, a fifth lens element 1050, a sixth lens element 1060, a seventh lens element 1070 and an eighth lens element 1080.

The differences between the tenth embodiment and the first embodiment may include the radius of curvature and the thickness of each lens element, the value of each air gap, aspherical data, related optical parameters, such as back focal length, and the configuration of the concave/convex shape of the object-side surface 1051 and the image-side surface 1052 But the configuration of the concave/convex shape of surfaces, comprising the object-side surfaces 1011, 121, 1031, 1041, 1061, 1071, 1081 facing the object side A1 and the image-side surfaces 1012, 1022, 1032, 1042, 1062, 1072, 1082 facing the image side A2, and positive or negative configuration of the refracting power of the first, second, third, fourth, fifth, sixth and eighth lens elements 1010, 1020, 1030, 1040, 1050, 1060, 1080 may be similar to those in the first embodiment. The seventh lens element 1070 may have negative refracting power. Specifically, the difference of configuration of surface shape may include: on the object-side surface 1051 of the fifth lens element 1050, an optical axis region 10511 may be convex, and on the image-side surface 1052 of the fifth lens element 1050, an optical axis region 10521 may be concave. Please refer to FIG. 44 for the optical characteristics of each lens elements in the optical imaging lens 10 of the present embodiment, and please refer to FIG. 55 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/

(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 43(a), the offset of the off-axis light relative to the image point may be within about ±0.02 mm. As the curvature of field in the sagittal direction shown in FIG. 43(b), the focus variation with regard to the three wavelengths in the whole field may fall within about ±0.03 mm. As the curvature of field in the tangential direction shown in FIG. 43(c), the focus variation with regard to the three wavelengths in the whole field may fall within about ±0.03 mm. As shown in FIG. 43(d), the variation of the distortion aberration may be within about ±3%. Compared with the first embodiment, the longitudinal spherical aberration and curvature of field in the tangential direction shown in the present embodiment are less.

According to the value of the aberrations, it is shown that the optical imaging lens 10 of the present embodiment, with the length as short as about 5.607 mm, the HFOV as large as about 36.572 degrees and the Fno as small as about 1.6, may provide good imaging quality. Compared with the optical imaging lens 1 of the first embodiment, the length of the optical imaging lens 10 of the present embodiment may be shorter.

Figure 46:
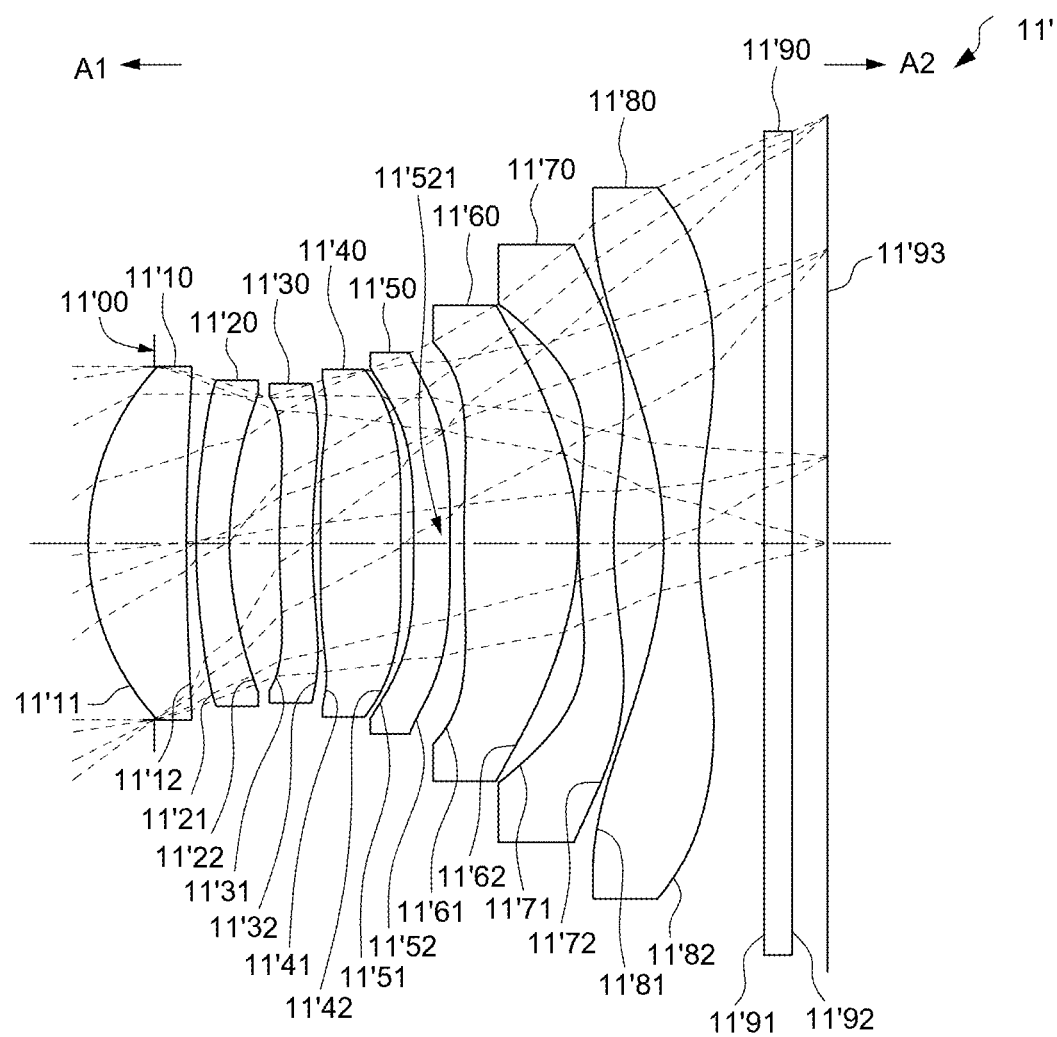
FIG. 46 depicts a cross-sectional view of an eleventh embodiment of an optical imaging lens having eight lens elements according to the present disclosure.
Figure 47:
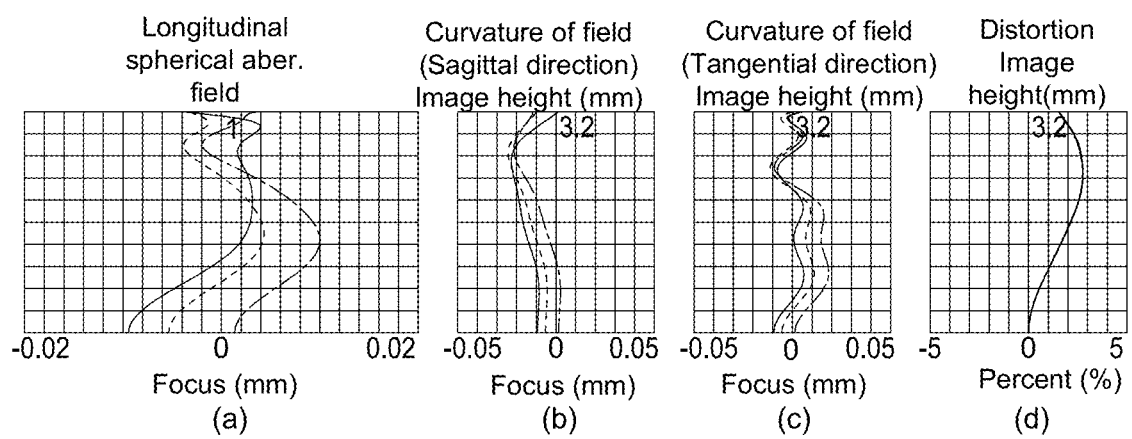
FIG. 47 depicts a chart of a longitudinal spherical aberration and other kinds of optical aberrations of an eleventh embodiment of an optical imaging lens according to the present disclosure.

Reference is now made to FIGS. 46-49. FIG. 46 illustrates an example cross-sectional view of an optical imaging lens 11' having eight lens elements of the optical imaging lens according to an eleventh example embodiment. FIG. 47 shows example charts of longitudinal spherical aberration and other kinds of optical aberrations of the optical imaging lens 11' according to the eleventh embodiment. FIG. 48 shows an example table of optical data of each lens element of the optical imaging lens 11' according to the eleventh example embodiment. FIG. 49 shows an example table of aspherical data of the optical imaging lens 11' according to the eleventh example embodiment. The reference numbers labeled in the present embodiment are similar to those in the first embodiment for the similar elements, but here the reference numbers are initialed with 11', for example, reference number 11'31 for labeling the object-side surface of the third lens element 11'30, reference number 11'32 for labeling the image-side surface of the third lens element 11'30, etc.

As shown in FIG. 46, the optical imaging lens 11' of the present embodiment, in an order from an object side A1 to an image side A2 along an optical axis, may comprise an aperture stop 11'00, a first lens element 11'10, a second lens element 11'20, a third lens element 11'30, a fourth lens element 11'40, a fifth lens element 11'50, a sixth lens element 11'60, a seventh lens element 11'70 and an eighth lens element 11'80.

The differences between the eleventh embodiment and the first embodiment may include the radius of curvature and the thickness of each lens element, the value of each air gap, aspherical data and related optical parameters, such as back focal length, and the configuration of the concave/convex shape of the image-side surface 11'52 But the configuration of the concave/convex shape of surfaces, comprising the object-side surfaces 11'11, 11'21, 11'31, 11'41, 11'51, 11'61, 11'71, 11'81 facing the object side A1 and the image-side surfaces 11'12, 11'22, 11'32, 11'42, 11'62, 11'72, 11'82 facing the image side A2, and positive or negative configuration of the refracting power of the first, second, third, fourth, fifth, sixth and eighth lens elements 11'10, 11'20, 11'30, 11'40, 11'50, 11'60, 11'80 may be similar to those in the first embodiment. The seventh lens element 11'70 may have negative refracting power. Specifically, the differences of configuration of surface shape may include: on the image-side surface 11'52 of the fifth lens element 11'50, an optical axis region 11'521 may be concave. Please refer to FIG. 48 for the optical characteristics of each lens elements in the optical imaging lens 11' of the present embodiment, please refer to FIG. 55 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 47(a), the offset of the off-axis light relative to the image point may be within about ±0.02 mm. As the curvature of field in the sagittal direction shown in FIG. 47(b), the focus variation with regard to the three wavelengths in the whole field may fall within about ±0.03 mm. As the curvature of field in the tangential direction shown in FIG. 47(c), the focus variation with regard to the three wavelengths in the whole field may fall within about ±0.02 mm. As shown in FIG. 47(d), the variation of the distortion aberration may be within about ±3%. Compared with the optical imaging lens 1 of the first embodiment, the longitudinal spherical aberration and curvature of field in the tangential direction of the optical imaging lens 11' of the present embodiment are less.

According to the value of the aberrations, it is shown that the optical imaging lens 11' of the present embodiment, with the length as short as about 5.521 mm, the HFOV as large as about 36.678 degrees and the Fno as small as about 1.6, may provide good imaging quality. Compared with the optical imaging lens 1 of the first embodiment, the length of the optical imaging lens 11' of the present embodiment may be shorter and the HFOV may be larger.

Figure 50:
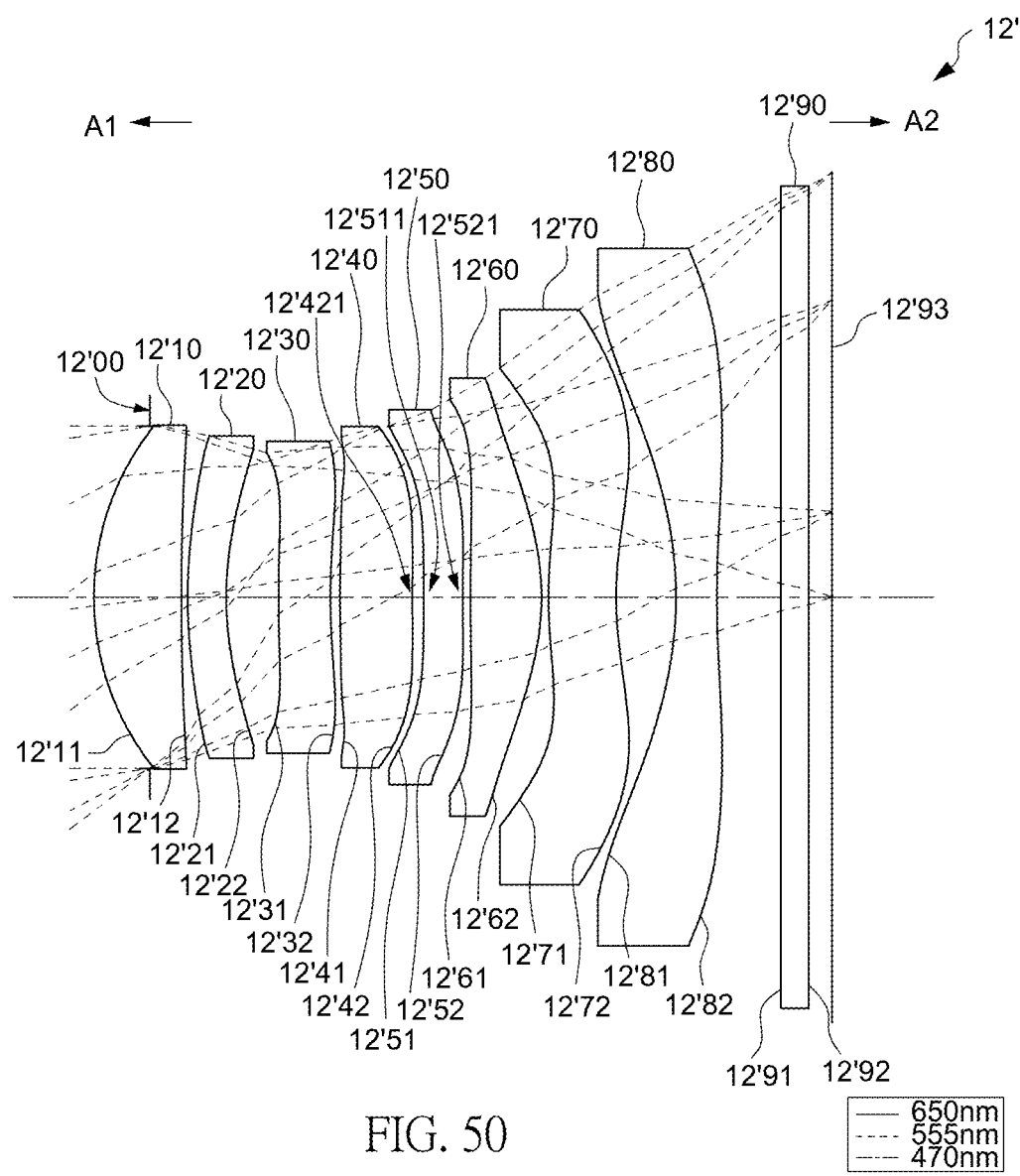
FIG. 50 depicts a cross-sectional view of a twelfth embodiment of an optical imaging lens having eight lens elements according to the present disclosure.
Figure 51:
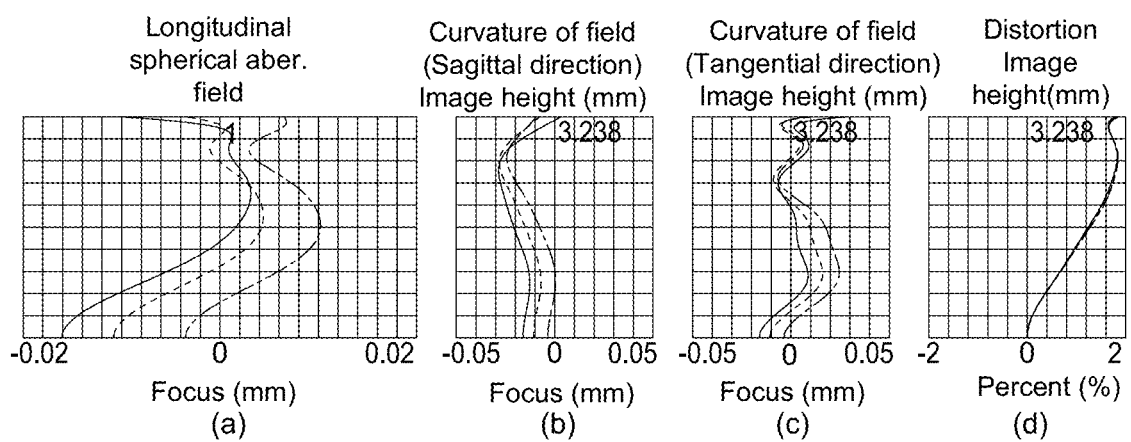
FIG. 51 depicts a chart of longitudinal spherical aberration and other kinds of optical aberrations of a twelfth embodiment of an optical imaging lens according to the present disclosure.

Reference is now made to FIGS. 50-53. FIG. 50 illustrates an example cross-sectional view of an optical imaging lens 12' having eight lens elements of the optical imaging lens according to a twelfth example embodiment. FIG. 51 shows example charts of longitudinal spherical aberration and other kinds of optical aberrations of the optical imaging lens 12' according to the twelfth embodiment. FIG. 52 shows an example table of optical data of each lens element of the optical imaging lens 12' according to the twelfth example embodiment. FIG. 53 shows an example table of aspherical data of the optical imaging lens 12' according to the twelfth example embodiment. The reference numbers labeled in the present embodiment are similar to those in the first embodiment for the similar elements, but here the reference numbers are initialed with 12', for example, reference number 12'31 for labeling the object-side surface of the third lens element 12'30, reference number 12'32 for labeling the image-side surface of the third lens element 12'30, etc.

As shown in FIG. 50, the optical imaging lens 12' of the present embodiment, in an order from an object side A1 to an image side A2 along an optical axis, may comprise an aperture stop 12'00, a first lens element 12'10, a second lens element 12'20, a third lens element 12'30, a fourth lens element 12'40, a fifth lens element 12'50, a sixth lens element 12'60, a seventh lens element 12'70 and an eighth lens element 12'80.

The differences between the twelfth embodiment and the first embodiment may include the radius of curvature and the thickness of each lens element, the value of each air gap, aspherical data and related optical parameters, such as back focal length, and the configuration of the concave/convex shape of the object-side surface 12'51 and the image-side surfaces 12'42, 12'52 But the configuration of the concave/convex shape of surfaces, comprising the object-side surfaces 12'11, 12'21, 12'31, 12'41, 12'61, 12'71, 12'81 facing the object side A1 and the image-side surfaces 12'12, 12'22, 12'32, 12'62, 12'72, 12'82 facing the image side A2, and positive or negative configuration of the refracting power of the first, second, third, fourth, fifth, sixth and eighth lens elements 12'10, 12'20, 12'30, 12'40, 12'50, 12'60, 12'80 may be similar to those in the first embodiment. The seventh lens element 12'70 may have negative refracting power. Specifically, the differences of configuration of surface shape may include: on the image-side surface 12'42 of the fourth lens element 12'40, an optical axis region 12'421 may be concave, on the object-side surface 12'51 of the fifth lens element 12'50, an optical axis region 12'511 may be convex, and on the image-side surface 12'52 of the fifth lens element 12'50, an optical axis region 12'521 may be concave. Please refer to FIG. 52 for the optical characteristics of each lens elements in the optical imaging lens 12' of the present embodiment, and please refer to FIG. 55 for the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of the present embodiment.

As the longitudinal spherical aberration shown in FIG. 51(a), the offset of the off-axis light relative to the image point may be within about ±0.02 mm. As the curvature of field in the sagittal direction shown in FIG. 51(b), the focus variation with regard to the three wavelengths in the whole field may fall within about ±0.03 mm. As the curvature of field in the tangential direction shown in FIG. 51(c), the focus variation with regard to the three wavelengths in the whole field may fall within about ±0.03 mm. As shown in FIG. 51(d), the variation of the distortion aberration may be within about ±2%. Compared with the optical imaging lens 1 of the first embodiment, the longitudinal spherical aberration, the curvature of field in the tangential direction and distortion aberration of the optical imaging lens 12' of the present embodiment may be less.

According to the value of the aberrations, it is shown that the optical imaging lens 12' of the present embodiment, with the length as short as about 5.620 mm, the HFOV as large as about 37.197 degrees and the Fno as small as about 1.6, may provide good imaging quality. Compared with the optical imaging lens 1 of the first embodiment, the length of the optical imaging lens 12' of the present embodiment may be shorter and the HFOV may be larger.

Please refer to FIG. 54 and FIG. 55, which show the values of TTL/(T1+T4+T6), ALT/(T1+G23+G78), (T5+T8+G12)/T1, (T2+T3+T7+G78)/T1, (T2+T3+T7+G67)/T6, TL/(T1+T4+T6), AAG/(G23+G34+G78), (T5+T8+G45)/T4, (T2+T3+T7+G12)/T4, (T2+T3+T7+G56)/T8, EFL/(T1+T4+T6), BFL/(G23+G78), (T5+T8+G67)/G23 and (T2+T3+T7+G45)/T5 of all twelve embodiments, and it may be clear that the optical imaging lens of the present disclosure may satisfy at least one of the inequalities (1)~(17). Further, any range which upper and lower limits defined by the values discloses in all of the embodiments shown here may be implemented in the present embodiments.

According to above illustration, the longitudinal spherical aberration, curvature of field in both the sagittal direction and tangential direction and distortion aberration in all embodiments may meet the use requirements of a related product in the market. The off-axis light with regard to three different wavelengths (470 nm, 555 nm, 650 nm) may be focused around an image point and the offset of the off-axis light relative to the image point may be well controlled with suppression for the longitudinal spherical aberration, curvature of field in both the sagittal direction and tangential direction and distortion aberration. The curves of different wavelengths may be close to each other, and this represents that the focusing for light having different wavelengths may be good to suppress chromatic dispersion. In summary, lens elements are designed and matched for achieving good imaging quality.

While various embodiments in accordance with the disclosed principles are described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages. Further, all of the numerical ranges including the maximum and minimum values and the values therebetween which are obtained from the combining proportion relation of the optical parameters disclosed in each embodiment of the present disclosure are implementable.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:
1. An optical imaging lens, comprising a first element, a second element, a third element, a fourth element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through and an image-side surface facing toward the image side and allowing the imaging rays to pass through, wherein:
the first lens element has positive refracting power;
the second lens element has negative refracting power;
a periphery region of the object-side surface of the third lens element is concave, wherein a collimated ray passing through the periphery region of the object-side surface of the third lens element diverges;
both of the object-side surface and the image-side surface of the fourth lens element are aspherical surfaces;
both of the object-side surface and the image-side surface of the fifth lens element are aspherical surfaces;

an optical axis region of the object-side surface of the sixth lens element is convex, and an optical axis region of the image-side surface of the sixth lens element is convex;

both of the object-side surface and the image-side surface of the seventh lens element are aspherical surfaces;

an optical axis region of the image-side surface of the eighth lens element is concave; and the optical imaging lens comprises no other lenses having refracting power beyond the eight lens elements and the optical imaging lens is a prime lens.

2. The optical imaging lens according to claim 1, wherein an abbe number of the first lens element is represented by V1, an abbe number of the second lens element is represented by V2, an abbe number of the third lens element is represented by V3, and V1, V2 and V2 satisfy the inequality:

$V1>V2+V3$.

3. The optical imaging lens according to claim 1, wherein a distance from the object-side surface of the first lens element to an image plane along the optical axis is represented by TTL, a thickness of the first lens element along the optical axis is represented by T1, a thickness of the fourth lens element along the optical axis is represented by T4, a thickness of the sixth lens element along the optical axis is represented by T6, and TTL, T1, T4 and T6 satisfy the inequality:

$TTL/(T1+T4+T6) \leq 4.200$.

4. The optical imaging lens according to claim 1, wherein a sum of the thicknesses of all eight lens elements along the optical axis is represented by ALT, a thickness of the first lens element along the optical axis is represented by T1, an air gap between the second lens element and the third lens element along the optical axis is represented by G23, an air gap between the seventh lens element and the eighth lens element along the optical axis is represented by G78, and ALT, T1, G23 and G78 satisfy the inequality:

$ALT/(T1+G23+G78) \leq 3.300$.

5. The optical imaging lens according to claim 1, wherein a thickness of the fifth lens element along the optical axis is represented by T5, a thickness of the eighth lens element along the optical axis is represented by T8, an air gap between the first lens element and the second lens element along the optical axis is represented by G12, a thickness of the first lens element along the optical axis is represented by T1, and T5, T8, G12 and T1 satisfy the inequality:

$(T5+T8+G12)/T1 \leq 1.600$.

6. The optical imaging lens according to claim 1, wherein a thickness of the second lens element along the optical axis is represented by T2, a thickness of the third lens element along the optical axis is represented by T3, a thickness of the seventh lens element along the optical axis is represented by T7, an air gap between the seventh lens element and the eighth lens element along the optical axis is represented by G78, a thickness of the first lens element along the optical axis is represented by T1, and T2, T3, T7, G78 and T1 satisfy the inequality:

$(T2+T3+T7+G78)/T1 \leq 2.500$.

7. The optical imaging lens according to claim 1, wherein a thickness of the second lens element along the optical axis is represented by T2, a thickness of the third lens element along the optical axis is represented by T3, a thickness of the seventh lens element along the optical axis is represented by T7, an air gap between the sixth lens element and the seventh lens element along the optical axis is represented by G67, a thickness of the sixth lens element along the optical axis is represented by T6, and T2, T3, T7, G67 and T6 satisfy the inequality:

$(T2+T3+T7+G67)/T6 \leq 3.300$.

8. An optical imaging lens, comprising a first element, a second element, a third element, a fourth element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through and an image-side surface facing toward the image side and allowing the imaging rays to pass through, wherein:

the first lens element has positive refracting power;

the second lens element has negative refracting power;

both of the object-side surface and the image-side surface of the third lens element are aspherical surfaces;

both of the object-side surface and the image-side surface of the fourth lens element are aspherical surfaces;

a periphery region of the object-side surface of the fifth lens element is concave;

an optical axis region of the object-side surface of the sixth lens element is convex, and an optical axis region of the image-side surface of the sixth lens element is convex;

an optical axis region of the object-side surface of the seventh lens element is convex;

an optical axis region of the image-side surface of the eighth lens element is concave; and the optical imaging lens comprises no other lenses having refracting power beyond the eight lens elements.

9. The optical imaging lens according to claim 8, wherein an abbe number of the fourth lens element is represented by V4, an abbe number of the second lens element is represented by V2, an abbe number of the third lens element is represented by V3, and V4, V2 and V3 satisfy the inequality:

$V4>V2+V3$.

10. The optical imaging lens according to claim 8, wherein a distance from the object-side surface of the first lens element to the image-side surface of the eighth lens element along the optical axis is represented by TL, a thickness of the first lens element along the optical axis is represented by T1, a thickness of the fourth lens element along the optical axis is represented by T4, a thickness of the sixth lens element along the optical axis is represented by T6, and TL, T1, T4 and T6 satisfy the inequality:

$TL/(T1+T4+T6) \leq 3.600$.

11. The optical imaging lens according to claim 8, wherein a sum of seven air gaps from the first lens element to the eighth lens element along the optical axis is represented by AAG, an air gap between the second lens element and the third lens element along the optical axis is represented by G23, an air gap between the third lens element and the fourth lens element along the optical axis is represented by G34, an air gap between the seventh lens element and the eighth lens element along the optical axis is represented by G78, and AAG, G23, G34 and G78 satisfy the inequality:

$AAG/(G23+G34+G78) \leq 2.500$.

12. The optical imaging lens according to claim 8, wherein a thickness of the fifth lens element along the optical axis is represented by T5, a thickness of the eighth lens element along the optical axis is represented by T8, an air gap between the fourth lens element and the fifth lens element along the optical axis is represented by G45, a thickness of the fourth lens element along the optical axis is represented by T4, and T5, T8, G45 and T4 satisfy the inequality:

$(T5+T8+G45)/T4 \leq 6.000$.

13. The optical imaging lens according to claim 8, wherein a thickness of the second lens element along the optical axis is represented by T2, a thickness of the third lens element along the optical axis is represented by T3, a thickness of the seventh lens element along the optical axis is represented by T7, an air gap between the first lens element and the second lens element along the optical axis is represented by G12, a thickness of the fourth lens element along the optical axis is represented by T4, and T2, T3, T7, G12 and T4 satisfy the inequality:

$(T2+T3+T7+G12)/T4 \leq 5.000$.

14. The optical imaging lens according to claim 8, wherein a thickness of the second lens element along the optical axis is represented by T2, a thickness of the third lens element along the optical axis is represented by T3, a thickness of the seventh lens element along the optical axis is represented by T7, an air gap between the fifth lens element and the sixth lens element along the optical axis is represented by G56, a thickness of the eighth lens element along the optical axis is represented by T8, and T2, T3, T7, G56 and T8 satisfy the inequality:

$(T2+T3+T7+G56)/T8 \leq 6.000$.

15. An optical imaging lens, comprising a first element, a second element, a third element, a fourth element, a fifth lens element, a sixth lens element, a seventh lens element and an eighth lens element sequentially from an object side to an image side along an optical axis, each of the first, second, third, fourth, fifth, sixth, seventh and eighth lens elements having an object-side surface facing toward the object side and allowing imaging rays to pass through and an image-side surface facing toward the image side and allowing the imaging rays to pass through, wherein:

the first lens element has positive refracting power;
the second lens element has negative refracting power;
both of the object-side surface and the image-side surface of the third lens element are aspherical surfaces;
both of the object-side surface and the image-side surface of the fourth lens element are aspherical surfaces;
a periphery region of the object-side surface of the fifth lens element is concave;
an optical axis region of the object-side surface of the sixth lens element is convex, and an optical axis region of the image-side surface of the sixth lens element is convex;
an optical axis region of the image-side surface of the seventh lens element is concave;
an optical axis region of the image-side surface of the eighth lens element is concave; and
the optical imaging lens comprises no other lenses having refracting power beyond the eight lens elements.

16. The optical imaging lens according to claim 15, wherein an abbe number of the sixth lens element is represented by V6, an abbe number of the second lens element is represented by V2, an abbe number of the third lens element is represented by V3, and V6, V2 and V3 satisfy the inequality:

$V6 > V2+V3$.

17. The optical imaging lens according to claim 15, wherein an effective focal length of the optical imaging lens is represented by EFL, a thickness of the first lens element along the optical axis is represented by T1, a thickness of the fourth lens element along the optical axis is represented by T4, a thickness of the sixth lens element along the optical axis is represented by T6, and EFL, T1, T4 and T6 satisfy the inequality:

$EFL/(T1+T4+T6) \leq 3.300$.

18. The optical imaging lens according to claim 15, wherein a distance from the image-side surface of the eighth lens element to an image plane along the optical axis is represented by BFL, an air gap between the second lens element and the third lens element along the optical axis is represented by G23, an air gap between the seventh lens element and the eighth lens element along the optical axis is represented by G78, and BFL, G23 and G78 satisfy the inequality:

$BFL/(G23+G78) \leq 2.000$.

19. The optical imaging lens according to claim 15, wherein a thickness of the fifth lens element along the optical axis is represented by T5, a thickness of the eighth lens element along the optical axis is represented by T8, an air gap between the sixth lens element and the seventh lens element along the optical axis is represented by G67, an air gap between the second lens element and the third lens element along the optical axis is represented by G23, and T5, T8, G67 and G23 satisfy the inequality:

$(T5+T8+G67)/G23 \leq 3.800$.

20. The optical imaging lens according to claim 15, wherein a thickness of the second lens element along the optical axis is represented by T2, a thickness of the third lens element along the optical axis is represented by T3, a thickness of the seventh lens element along the optical axis is represented by T7, an air gap between the fourth lens element and the fifth lens element along the optical axis is represented by G45, a thickness of the fifth lens element along the optical axis is represented by T5, and T2, T3, T7, G45 and T5 satisfy the inequality:

$(T2+T3+T7+G45)/T5 \leq 4.900$.

\* \* \* \* \*